United States Patent
Ko et al.

(10) Patent No.: US 11,320,944 B2
(45) Date of Patent: May 3, 2022

(54) TOUCH SENSOR AND METHOD OF DRIVING THE SAME

(71) Applicant: Samsung Display Co., Ltd., Yongin-si (KR)

(72) Inventors: Gwang Bum Ko, Yongin-si (KR); Ga Young Kim, Yongin-si (KR); Sang Hyun Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/030,376

(22) Filed: Sep. 24, 2020

(65) Prior Publication Data

US 2021/0318779 A1    Oct. 14, 2021

(30) Foreign Application Priority Data

Apr. 8, 2020    (KR) .......................... 10-2020-0042876

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01); *G06F 3/0448* (2019.05); *G06F 2203/04103* (2013.01)

(58) Field of Classification Search
CPC .... G06F 3/0445; G06F 3/0412; G06F 3/0448; G06F 2203/04103
See application file for complete search history.

(56) References Cited

U.S. PATENT DOCUMENTS

| | | | |
|---|---|---|---|
| 10,564,743 B2 | 2/2020 | Kang | |
| 2015/0227225 A1* | 8/2015 | Park | G06F 1/1616 345/173 |
| 2015/0286312 A1 | 10/2015 | Kang et al. | |
| 2016/0048213 A1* | 2/2016 | Zafiris | G06F 3/0445 345/174 |
| 2016/0085334 A1* | 3/2016 | Hashimoto | G06F 3/0448 345/174 |
| 2016/0124554 A1* | 5/2016 | Lewis | G06F 3/0443 345/174 |
| 2017/0308200 A1* | 10/2017 | Mugiraneza | G02F 1/134336 |

FOREIGN PATENT DOCUMENTS

| | | |
|---|---|---|
| KR | 10-2015-0115104 | 10/2015 |
| KR | 10-2016-0117719 | 10/2016 |
| KR | 10-1767461 | 8/2017 |
| KR | 10-1786119 | 10/2017 |
| WO | 2010/099132 | 9/2010 |

\* cited by examiner

*Primary Examiner* — Amit Chatly
(74) *Attorney, Agent, or Firm* — H.C. Park & Associates, PLC

(57) ABSTRACT

A touch sensor includes: a sensing area including a first sensing area positioned in a center portion and a second sensing area positioned outwardly therefrom in an edge portion; first sensor electrodes disposed in the first sensing area; and second sensor electrodes disposed in the second sensing area, the second sensor electrodes being configured to be separately activated from the first sensor electrodes. The first sensor electrodes are drivable to detect a touch input generated in the first sensing area in a first mode and the second sensor electrodes are drivable to detect a touch input generated in the second sensing area in a second mode.

25 Claims, 39 Drawing Sheets

(Mode 1, Mutual)

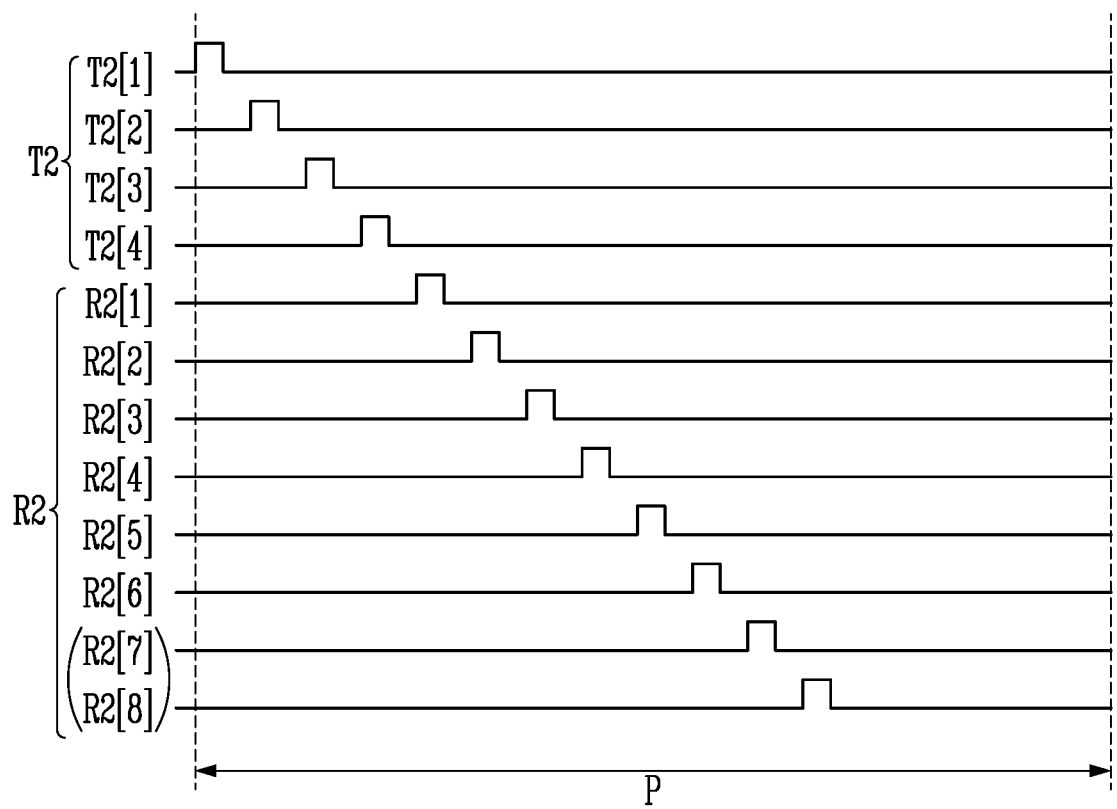

(Mode 1, Mutual)

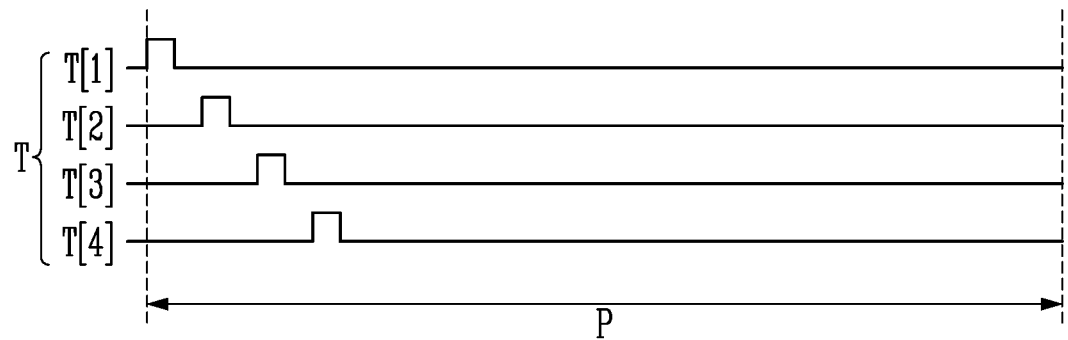

TOUCH SENSOR AND METHOD OF DRIVING THE SAME

CROSS-REFERENCE TO RELATED APPLICATION

This application claims priority from and the benefit of Korean Patent Application No. 10-2020-0042876, filed on Apr. 8, 2020, which is hereby incorporated by reference for all purposes as if fully set forth herein.

BACKGROUND

Field

Exemplary implementations of the invention relate generally to a touch sensor and a method of driving the same, more specifically, to a touch sensor having sensing areas with different shapes.

Discussion of the Background

A touch sensor is widely used as an input device of various electronic devices including a display device. For example, the touch sensor may be provided in the display device and include sensor electrodes disposed in a sensing area overlapping a display area. The touch sensor may sense a touch input generated in the sensing area using the sensor electrodes.

The above information disclosed in this Background section is only for understanding of the background of the inventive concepts, and, therefore, it may contain information that does not constitute prior art.

SUMMARY

Applicant discovered that when a touch sensor has a circular sensing area the touch sensing sensitivity is reduced at the edge nodes due to sensor area loss, which degrades the signal-to-noise ratio (SNR) of the touch sensor. While the touch sensing sensitivity and the SNR of the touch sensor may be improved by increasing sampling rate, the increased sampling rate may detrimentally increase the power consumption of the touch sensor.

Touch sensors constructed according to the principles and some exemplary implementations of the invention minimize or prevent sensor area loss in the edge node of the sensing area, thereby producing high touch sensing sensitivity and high SNR, and low power consumption. For example, the sensing area of the touch sensor may be circular, and the touch sensor may include sensor electrodes having a pattern shape and arrangement optimized for the circular sensing area. Accordingly, a high SNR may be secured even in the edge portion of the sensing area, and the power consumption of the touch sensor may be reduced by lowering sampling number of times for touch driving.

Touch sensors constructed according to the principles and some exemplary implementations of the invention may drive the sensing areas partially or completely to lower power consumption. For example, the touch sensor may include first and second sensing areas that may be driven independently of each other, with the first and second sensing areas being selectively driven in correspondence with a predetermined mode. Power consumption of the touch sensor may be reduced through such a partial driving method.

Additional features of the inventive concepts will be set forth in the description which follows, and in part will be apparent from the description, or may be learned by practice of the inventive concepts.

According to an aspect of the invention, a touch sensor includes a sensing area including a first sensing area positioned in a center portion and a second sensing area positioned outwardly therefrom in an edge portion; first sensor electrodes disposed in the first sensing area; and second sensor electrodes disposed in the second sensing area, the second sensor electrodes being configured to be separately activated from the first sensor electrodes, wherein the first sensor electrodes are drivable to detect a touch input generated in the first sensing area in a first mode and the second sensor electrodes are drivable to detect a touch input generated in the second sensing area in a second mode.

The second sensing area may be deactivated in the first mode, and the first sensing area may be deactivated in the second mode.

The first sensor electrodes may include first electrodes and second electrodes disposed in the first sensing area, and the second sensor electrodes may include third electrodes and fourth electrodes disposed in the second sensing area.

The first electrodes and the second electrodes in the first sensing area may be separated from the third electrodes and the fourth electrodes of the second sensing area, and wherein: the first electrodes in the first sensing area and the third electrodes in the second sensing area may be driving electrodes, and the second electrodes in the first sensing area and the fourth electrodes in the second sensing area may be sensing electrodes.

The first electrodes may be disposed in quadrants of the first sensing area and the first electrodes in a same quadrant may be connected to each other to form a single first electrode, and the third electrodes may be disposed in quadrants of the second sensing area and the third electrodes in a same quadrant of the second sensing area may be connected to each other to form a single third electrode.

In the first mode, a mutual capacitive sensing method or a self-capacitive sensing method using the first electrodes and the second electrodes in the first sensing area may detects whether a touch input is received in the first sensing area.

In the first mode, a self-capacitive sensing method using the first electrodes in the first sensing area may detect whether a touch input is received in the first sensing area.

In the first mode, a self-capacitive sensing method using the second electrodes in the first sensing area may detect whether a touch input is received in the first sensing area.

In the second mode, a mutual capacitive sensing method using the third electrodes and the fourth electrodes in the second sensing area may detect whether a touch input is received in the second sensing area.

In the second mode, a self-capacitive sensing method using the third electrodes and the fourth electrodes in the second sensing area may detect whether a touch input is received and its position in the second sensing area.

The sensing area may have a generally circular shape.

The first sensing area may include a concentric area having a radius smaller than a radius of the sensing area having the generally circular shape, and the second sensing area may include an annular area surrounding the first sensing area.

The first sensor electrodes in the first sensing area may include: a generally circular-shaped center electrode positioned at a center of the first sensing area; first partial annular-shaped electrodes including a single electrode pattern or a plurality of electrode patterns dispersed in at least one annular-shaped area disposed at a predetermined distance and/or interval from the generally circular-shaped center electrode, with each of the plurality of electrode patterns having a partial annular shape; and second partial annular-shaped electrodes disposed in an annular-shaped area between the generally circular-shaped center electrode and the first partial annular-shaped electrodes and/or an annular-shaped area between the first partial annular-shaped electrodes having different radii.

The second partial annular-shaped electrodes may include: a first-first electrode positioned in a first quadrant of the first sensing area and including a single electrode pattern or a plurality of electrode patterns having a partial annular shape; a first-second electrode positioned in a second quadrant of the first sensing area and including a single electrode pattern or a plurality of electrode patterns having a partial annular shape; a first-third electrode positioned in a third quadrant of the first sensing area and including a single electrode pattern or a plurality of electrode patterns having a partial annular shape; and a first-fourth electrode positioned in a fourth quadrant of the first sensing area and including a single electrode pattern or a plurality of electrode patterns having a partial annular shape.

Each of the first partial annular-shaped electrodes may include a plurality of electrode patterns dispersed in the first to fourth quadrants of the first sensing area, the first partial annular-shaped electrodes may be sequentially arranged in a clockwise direction in the first and third quadrants of the first sensing area, and the first partial annular-shaped electrodes may be sequentially arranged in a counterclockwise direction in the second and fourth quadrants of the first sensing area.

The second sensor electrodes may include: third partial annular-shaped electrodes including a single electrode pattern or a plurality of electrode patterns dispersed in an annular-shaped area spaced a predetermined distance from the first sensing area, each of the plurality of electrode patterns having a partial annular shape; and fourth partial annular-shaped electrodes disposed in an annular-shaped area of an inside and/or an outside of the second partial annular-shaped electrodes.

The fourth partial annular-shaped electrodes may include: a second-first electrode positioned in a first quadrant of the second sensing area and including a single electrode pattern or a plurality of electrode patterns having a partial annular shape; a second-second electrode positioned in a second quadrant of the second sensing area and including a single electrode pattern or a plurality of electrode patterns having a partial annular shape; a second-third electrode positioned in a third quadrant of the second sensing area and including a single electrode pattern or a plurality of electrode patterns having a partial annular shape; and a second-fourth electrode positioned in a fourth quadrant of the second sensing area and including a single electrode pattern or a plurality of electrode patterns having a partial annular shape.

Each of the third partial annular-shaped electrodes may include a plurality of electrode patterns dispersed in the first to fourth quadrants of the second sensing area, the third partial annular-shaped electrodes are sequentially arranged in a clockwise direction in the first and third quadrants of the second sensing area, and the third partial annular-shaped electrodes are sequentially arranged in a counterclockwise direction in the second and fourth quadrants of the second sensing area.

The second sensor electrodes may further include an annular-shaped or partial annular-shaped outermost electrode disposed in an outermost area of the sensing area to surround the fourth partial annular-shaped electrodes.

According to another aspect of the invention, a method of driving a touch sensor having a first sensing area and a second sensing area disposed in an edge portion outwardly from the first sensing area includes: in a first mode, driving at least some of first sensor electrodes in the first sensing area in a mutual or self-capacitive sensing method to detect whether a touch input is received in the first sensing area: and in a second mode, driving at least some of second sensor electrodes in the second sensing area in a mutual or self-capacitive sensing method to detect whether a touch input is received and its position in the second sensing area.

The first sensor electrodes may include first electrodes and second electrodes disposed in the first sensing area and, in the first mode, the first electrodes and the second electrodes may detect whether the touch input is received in the second sensing area.

The first sensor electrodes may include first electrodes and second electrodes disposed in the first sensing area and, in the first mode, the self-capacitive sensing method uses the first electrodes to detect whether the touch input is received in the first sensing area.

The first sensor electrodes may include first electrodes and second electrodes disposed in the first sensing area, and, in the first mode, the self-capacitive sensing method may use the second electrodes to detect whether the touch input is received in the first sensing area.

The second sensor electrodes may include third electrodes and fourth electrodes disposed in the second sensing area and, in the second mode, the mutual capacitive sensing method may use the third electrodes and the fourth electrodes to detect whether the touch input is received in the second sensing area.

In the second mode, the self-capacitive sensing method may use the third electrodes and the fourth electrodes to detect whether the touch input is received and its position in the second sensing area.

The first mode may be a standby mode and the second mode may be an active mode.

The second sensing area may be deactivated in the first mode, and the first sensing area may be deactivated in the second mode.

The method may further include, in a third mode, activating substantially all the first and second sensor electrodes in the first and second sensing areas.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIGS. 8C to 8H are timing diagrams illustrating exemplary embodiments of a method of driving the first and second sensor electrodes of the touch sensor of FIGS. 8A and 8B.

FIGS. 12C to 12H are timing diagrams illustrating exemplary embodiments of a method of driving the first and second sensor electrodes of the touch sensor of FIGS. 12A and 12B.

DETAILED DESCRIPTION

Figure 1A:
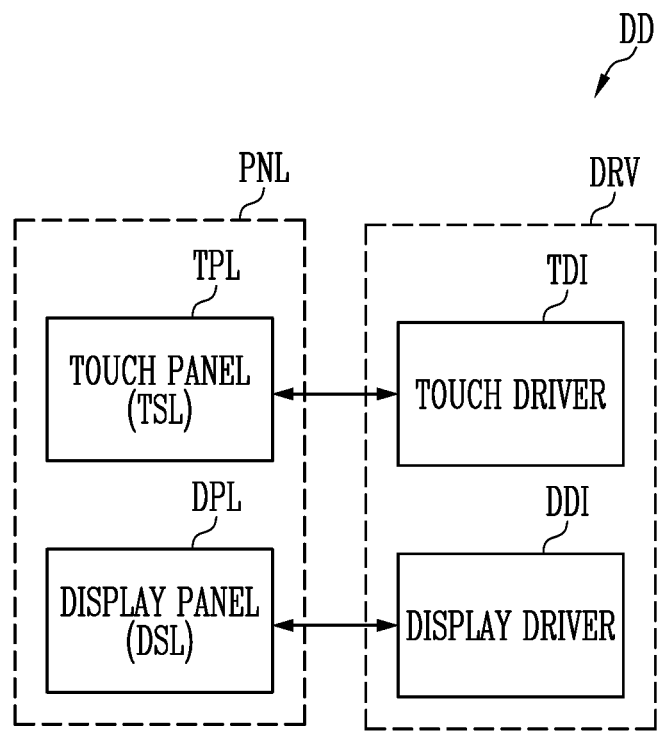
FIG. 1A is a schematic view of an exemplary embodiment of a display device constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1B:
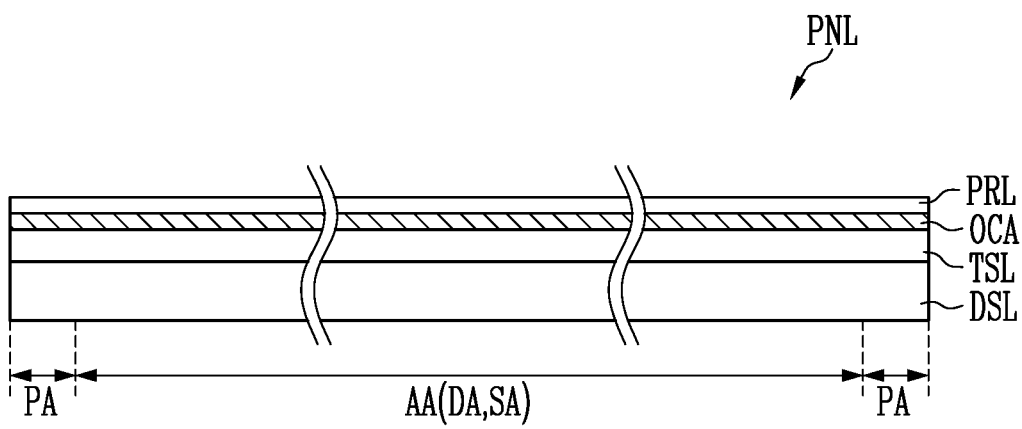
FIG. 1B is a cross-section view of a panel unit of the display device of FIG. 1A.

FIG. 1A is a schematic view of an exemplary embodiment of a display device constructed according to the principles of the invention. FIG. 1B is a cross-section view of a panel unit of the display device of FIG. 1A. For example, FIG. 1A illustrates an overall configuration diagram of the display device DD, and FIG. 1B illustrates an exemplary embodiment of a cross-section of a panel unit PNL of FIG. 1A.

Referring to FIGS. 1A and 1B, the display device DD includes the panel unit PNL and a driving circuit DRV. The panel unit PNL includes a screen of the display device DD to display images and information, and the driving circuit DRV controls operation of the panel unit PNL.

The panel unit PNL includes a display panel DPL and a touch panel TLP. In an exemplary embodiment, the display panel DPL and the touch panel TLP may be integrally manufactured and/or provided. For example, the touch panel TLP may be formed inside the display panel DPL together with pixels, or may be formed directly on at least one surface (for example, an upper surface and/or a lower surface) of the display panel DPL. In another exemplary embodiment, the display panel DPL and the touch panel TLP may be non-integrally manufactured and/or provided. For example, the touch panel TPL may be manufactured separately from the display panel DPL, and may be attached to at least one surface of the display panel DPL by a transparent adhesive or the like.

The panel unit PNL may include an active area AA and a peripheral area PA. The active area AA may be an area including a display area DA and a sensing area SA. The display area DA may be an area in which an image is displayed by the display panel DPL, and the sensing area SA may be an area in which a touch input may be sensed by the touch panel TPL. The peripheral area PA may be an area other than the active area AA. For example, the peripheral area PA may be an outer area surrounding the display area DA and/or the sensing area SA. Lines and/or pads connected to the pixels of the display area DA and/or sensor electrodes of the sensing area SA may be disposed in the peripheral area PA.

In an exemplary embodiment, the display area DA and the sensing area SA may overlap vertically in the thickness direction of the panel unit PNL. For example, at least one area of the display area DA may be set as the sensing area SA. However, the exemplary embodiments are not limited thereto. For example, in another exemplary embodiment, the sensing area SA may be positioned in a non-display area.

The display panel DPL includes a display element layer DSL including the pixels. The display element layer DSL may be formed with multiple layers including components (for example, circuit elements and/or a light emitting elements included in a pixel circuit) of the pixels. The pixels may be disposed in the display area DA of the display element layer DSL, and may be driven by a display driver DDI. Accordingly, an image may be displayed in the display area DA.

The touch panel TLP may include a touch sensor layer TSL including the sensor electrodes. The touch sensor layer TSL may be formed as a single layer or multiple layers including the sensor electrodes and/or lines (also referred herein to as "sensor lines") connected thereto. The sensor electrodes may be disposed in the sensing area SA of the touch sensor layer TSL and may be driven by a touch driver TDI. When the sensor electrodes are driven, a touch input generated in the sensing area SA may be detected. Here, the touch input may comprehensively refer to a touch input generated by actual contact with the display screen and a touch input generated by hovering without actual contact with the display screen.

The touch sensor layer TSL may be formed and/or provided integrally or non-integrally with the display element layer DSL. In an exemplary embodiment, the touch sensor layer TSL may be disposed on one surface of the display element layer DSL to overlap the display element layer DSL. For example, the touch sensor layer TSL may be disposed on an upper surface of the display element layer DSL. However, the position of the touch sensor layer TSL may be variously changed according to exemplary embodiments. For example, in another exemplary embodiment, the touch sensor layer TSL may be disposed on a lower surface or both surfaces of the display element layer DSL.

The panel unit PNL may further include an additional component in addition to the display panel DPL and the touch panel TLP. For example, the panel unit PNL may include a protective layer PRL disposed on the uppermost layer. In an exemplary embodiment, the protective layer PRL may be formed of a material for protecting the panel unit PNL from a physical and/or electrical impact, and may be a window or other functional film. The protective layer PRL may be provided integrally or non-integrally with the display panel DPL and/or the touch panel TLP. For example, the non-integral protective layer PRL may be attached on the display element layer DSL of the display panel DPL and/or the touch sensor layer TSL of the touch panel TLP by a transparent adhesive member OCA or the like.

The driving circuit DRV includes the display driver DDI and the touch driver TDI. The display driver DDI and the touch driver TDI may be implemented as an integrated circuit including circuit elements for driving the display panel DPL and the touch panel TLP, respectively. According to an exemplary embodiment, the display driver DDI and the touch driver TDI may be manufactured in a form of separate chips or may be integrated into a single chip.

In FIG. 1A, the panel unit PNL and the driving circuit DRV are shown as separate components, but exemplary embodiments are not limited thereto. For example, according to an exemplary embodiment, at least a portion of the driving circuit DRV may be integrally manufactured with the panel unit PNL. For example, a scan driver generating a scan signal may be formed on the display panel DPL together with the pixels.

The display driver DDI may include a driving circuit for supplying a driving signal to the pixels of the display panel DPL. For example, the display driver DDI may include the scan driver and a data driver for supplying the scan signal and a data signal to the pixels, respectively. The display driver DDI may form a display module DSM together with the display panel DPL.

The touch driver TDI may supply a driving signal to the sensor electrodes of the touch panel TLP and receive a sensing signal output from the sensor electrodes by the driving signal. The touch driver TDI may detect whether a touch input is generated and/or a position of the touch input by analyzing a sensing signal. The touch driver TDI may form a sensor module (e.g., a touch sensor TS) together with the touch panel TLP.

In an exemplary embodiment, the touch sensor TS may be a touch sensor operating according to a capacitive sensing method. For example, the touch sensor TS may be a touch sensor of a mutual capacitive sensing method or a self-capacitive sensing method. In another exemplary embodiment, the touch sensor TS may be a capacitive touch sensor of a hybrid sensing method, which is selectively driven in a mutual capacitive sensing method or a self-capacitive sensing method according to a driving mode or the like. In addition, the touch sensor TS may be touch sensors of various known types in addition to the touch sensor of the capacitive sensing method.

Figure 2:
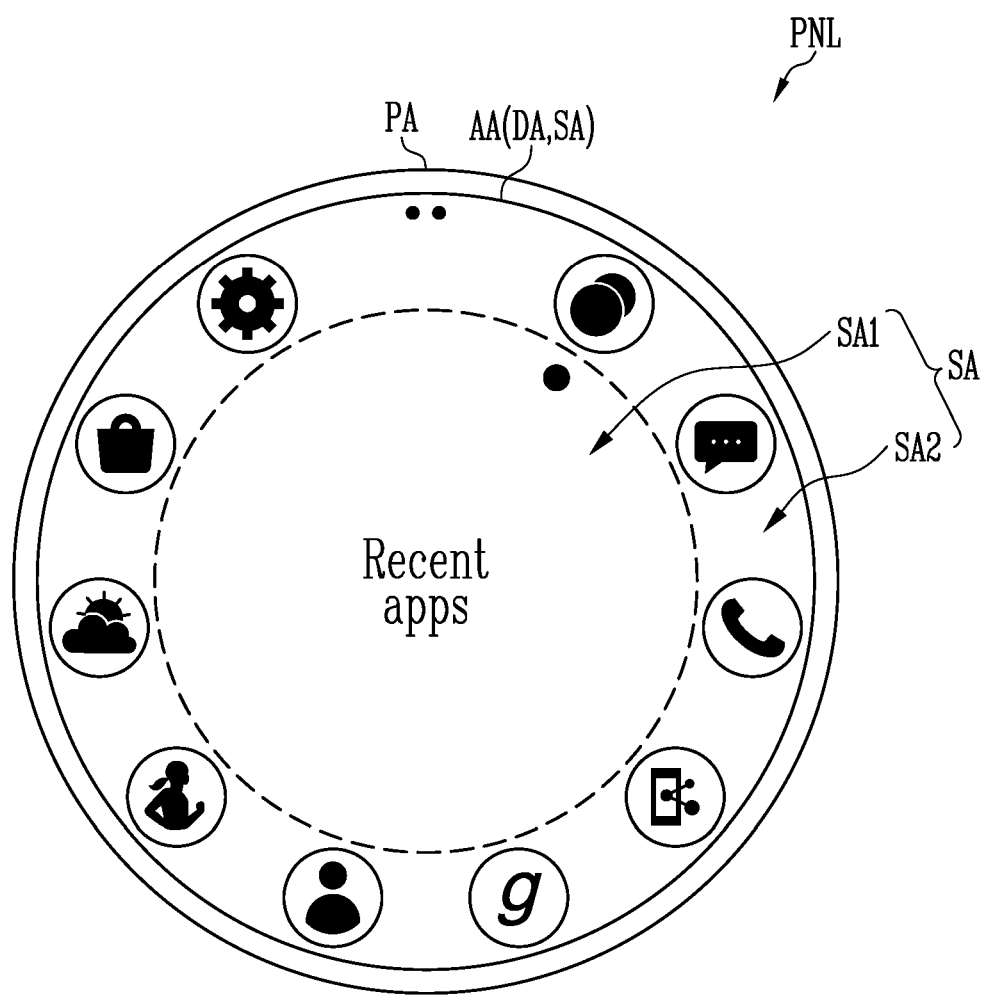
FIG. 2 is a plan view of the panel unit of FIG. 1B.

FIG. 2 illustrates the panel unit PNL of the display device according to an exemplary embodiment. According to an exemplary embodiment, FIG. 2 shows a generally circular-shaped panel unit PNL that may be applied to a watch or the like, but a shape of the panel unit PNL is not limited thereto.

Referring to FIG. 2, the panel unit PNL includes the active area AA and the peripheral area PA surrounding the active area AA. In an exemplary embodiment, the active area AA may be a generally circular-shaped area, and the peripheral area PA may be a generally ring-shaped (annular) area surrounding the generally circular-shaped active area AA.

The active area AA may include the display area DA and the sensing area SA. In an exemplary embodiment, the substantially entire active area AA may be set as the display area DA and the sensing area SA but is not limited thereto.

In an exemplary embodiment, the sensing area SA may be divided into a plurality of sub-areas that may be driven independently of each other, and Tx channels and/or Rx channels may be separated for each sub-area to independently drive each sub-area. For example, the sensing area SA may be partially driven by dividing the sensing area SA into a plurality of sub-areas and separating the Tx channels and/or the Rx channels corresponding to each sub-area. Here, the Tx channels may be touch driving channels corresponding to each Tx electrode, and the Rx channels may be touch sensing channels corresponding to each Rx electrode.

According to an exemplary embodiment, the sensing area SA may be divided into at least a center portion and an edge portion, which are independently driven. For example, the sensing area SA may include a first sensing area SA1 positioned at a center portion of the active area AA and a second generally annular sensing area SA2 positioned at an edge portion of the active area AA to surround the first sensing area SA1. In addition, according to another exemplary embodiment, the sensing area SA may be divided into at least three sub-areas. In addition, Tx electrodes (also referred to as "driving electrodes") and/or Rx electrodes (also referred to as "sensing electrodes") may be separated from each other for each divided sub-area.

In an exemplary embodiment, the sensing area SA may have a generally circular shape. In addition, the first sensing area SA1 may have a radius smaller than that of the generally circular-shaped sensing area SA, and may be set as a concentric circle area having the same center as the sensing area SA, and the second sensing area SA2 may be a generally ring-shaped area corresponding to the edge portion of the sensing area SA and surround the first sensing area SA1.

According to an exemplary embodiment, the first sensing area SA1 may correspond to a center area of a screen on which main information, a standby screen, or the like is displayed, and the second sensing area SA2 may correspond to a wheel area of the screen on which a plurality of icons are displayed. The first sensing area SA1 and the second sensing area SA2 may be selectively activated according to a driving mode.

For example, in the first mode (for example, a standby mode), the first sensing area SA1 may be activated, and the second sensing area SA2 may be deactivated. Conversely, in the second mode (for example, a wheel mode), the second sensing area SA2 may be activated, and the first sensing area SA1 may be deactivated. For example, according to the driving mode, only a portion (for example, the first sensing area SA1 or the second sensing area SA2) of the sensing area SA may be selectively activated to detect a touch input provided to a corresponding area. As described above, when only a portion of the sensing area SA is selectively activated to drive, the power consumption of the touch sensor TS may be reduced.

Further, all first and second sensing areas SA1 and SA2 may be activated to detect the touch input in the entire sensing area SA. For example, when it is desired to detect the touch input in the entire screen, the touch sensor TS may be driven in a third mode. In the third mode, the entire sensing area SA may be activated to detect the touch input generated in the first and/or second sensing areas SA1 and SA2.

Figure 3:
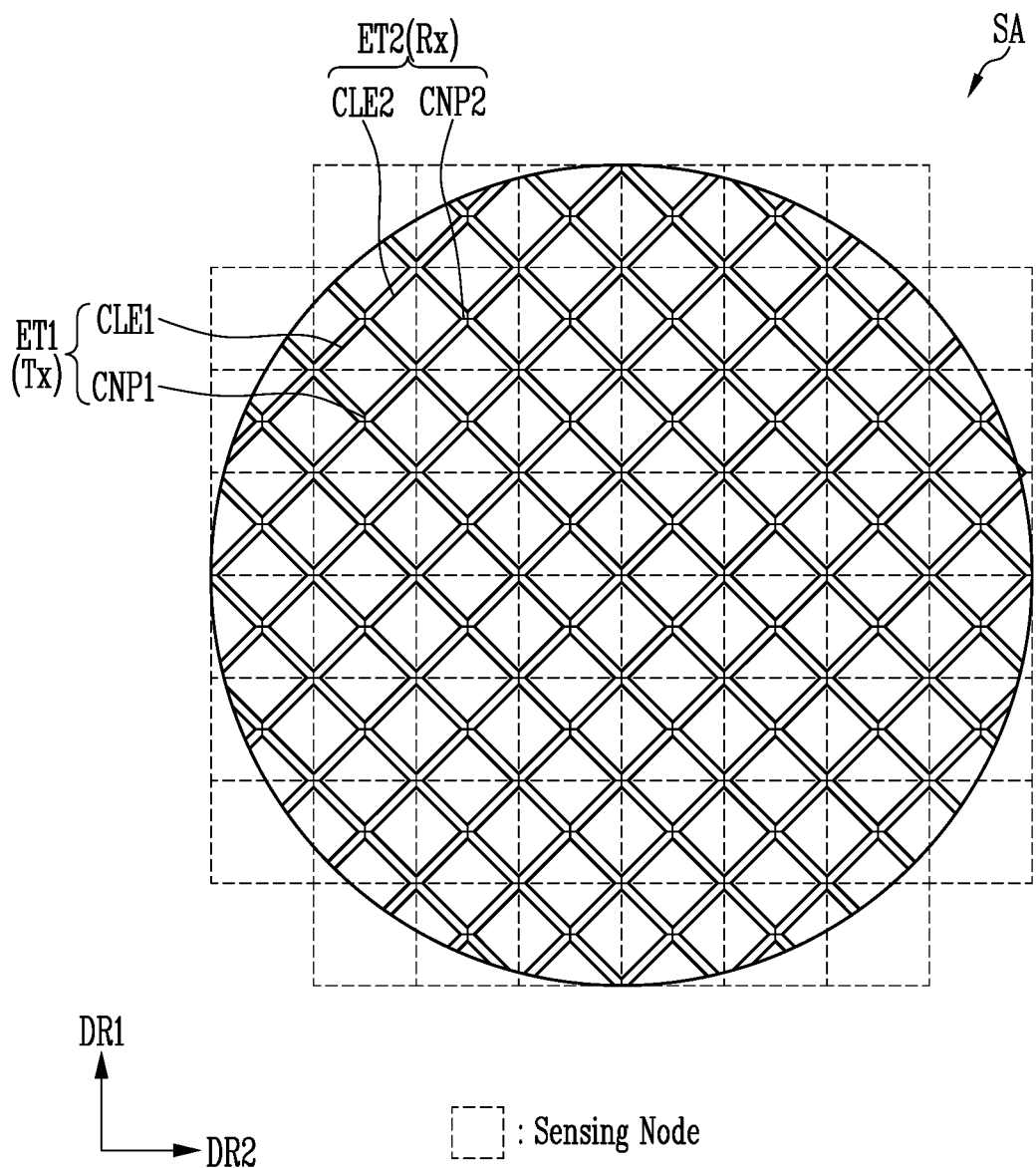
FIG. 3 is a plan view of a typical example of sensor electrodes disposed in a generally circular-shaped sensing area.

FIG. 3 is a plan view of a typical example of sensor electrodes in a generally circular-shaped sensing area. FIG. 3 illustrates an example of sensor electrodes ET1 and ET2 that may be disposed in the generally circular-shaped sensing area SA.

Referring to FIG. 3, the sensing area SA includes first electrodes ET1 and second electrodes ET2 extending along different directions. For example, each first electrode ET1 may extend along a first direction DR1 (for example, a Y-axis direction), and each second electrode ET2 may extend along a second direction DR2 (for example, an X-axis direction). In addition, the first electrodes ET1 may be sequentially arranged along the second direction DR2, and the second electrodes ET2 may be sequentially arranged along the first direction DR1. A capacitance may be formed between the first and second electrodes ET1 and ET2 adjacent to each other, and each unit node (hereinafter, referred to as a "sensing node") of the touch sensor TS may be formed by the first and second electrodes ET1 and ET2.

Each first electrode ET1 may include first cell electrodes CLE1 arranged along the first direction DR1 and first connection portions CNP1 connecting the first cell electrodes CLE1 along the first direction DR1. The first cell electrodes CLE1 and the first connection portions CNP1 forming one first electrode ET1 may be integrally or non-integrally connected to each other.

Each second electrode ET2 may include second cell electrodes CLE2 arranged along the second direction DR2 and second connection portions CNP2 connecting the second cell electrodes CLE2 along the second direction DR2. The second cell electrodes CLE2 and the second connection portions CNP2 forming one second electrode ET2 may be integrally or non-integrally connected to each other.

In an exemplary embodiment, the first and second electrodes ET1 and ET2 may be driven in a mutual capacitive sensing method. For example, during a period in which the sensing area SA is activated, a driving signal may be sequentially supplied to the first electrodes ET1 by the touch driver TDI. In addition, a sensing signal output from the second electrodes ET2 by the driving signal may be input to the touch driver TDI. Then, the touch driver TDI detects the touch input based on the sensing signal. In this case, the first electrodes ET1 may be driving electrodes (hereinafter, referred to as "Tx electrodes") of the touch sensor TS, and the second electrodes ET2 may be sensing electrodes (hereinafter, referred to as "Rx electrodes") of the touch sensor TS. For example, the first electrodes ET1 may be transmitting electrodes of the touch sensor TS, and the second electrodes ET2 may be receiving electrodes of the touch sensor TS. In another exemplary embodiment, the first electrodes ET1 may be the Rx electrodes outputting the sensing signal, and the second electrodes ET2 may be the Tx electrodes receiving the driving signal. In still another exemplary embodiment, the first and second electrodes ET1 and ET2 may be driven in a self-capacitive sensing method. For example, the touch input may be detected by simultaneously or sequentially supplying the driving signal to each of the first electrodes ET1 and the second electrodes ET2 and by using the sensing signal output from each of the first electrodes ET1 and the second electrodes ET2.

When the sensing area SA has a generally circular shape, the first and second cell electrodes CLE1 and CLE2 positioned at both ends of each of the first and second electrodes ET1 and ET2 may have a smaller size than that of the remaining first and second cell electrodes CLE1 and CLE2. For example, two first cell electrodes CLE1 positioned at the first and last of each first electrode ET1 and two second cell electrodes CLE2 positioned at the first and last of each second electrode ET2 may have a smaller size than that of remaining first and second cell electrodes CLE1 and CLE2. Accordingly, sensor area loss may occur in sensing nodes (e.g., edge nodes) positioned at the outermost area of the sensing area SA. For example, the edge nodes may be formed by the first and second cell electrodes CLE1 and CLE2 positioned at both ends of each of the first and second electrodes ET1 and ET2. The sensor area loss in the edge nodes may reduce the signal-to-noise ratio (hereinafter, referred to as an "SNR") of the touch sensor TS, and thus touch sensing sensitivity may be reduced.

For example, when sampling rate of the touch sensor TS (for example, the number of pulses of the driving signal supplied to each Tx electrode during a unit time) is increased, the SNR of the touch sensor TS may be improved. Thus, when good touch sensing sensitivity in the edge portion of the sensing area SA is required (e.g., in the wheel mode), the SNR of the touch sensor TS may be obtained by increasing the sampling rate of the touch sensor TS. However, when the sampling rate of the touch sensor TS is increased, the power consumption of the touch sensor TS is increased as charge/discharge rate of the first and second electrodes ET1 and ET2 is increased.

In addition, in a case of the configuration of FIG. 3, in order to detect the touch input generated in the sensing area SA, the first and second electrodes ET1 and ET2 are required to be completely driven regardless of the driving mode. Accordingly, for example, even in the standby mode in which only detection of a simple touch input such as knock or click on the center portion is required, it is necessary to wait for the touch input by repeatedly charging/discharging the first and second electrodes ET1 and ET2 throughout the sensing area SA. Accordingly, the power efficiency of the touch sensor TS may be reduced.

Therefore, hereinafter, various exemplary embodiments capable of improving the SNR of the touch sensor TS by preventing or minimizing the sensor area loss even in the generally circular-shaped sensing area SA, and capable of increasing the power efficiency of the touch sensor TS by partially or entirely driving the sensing area SA will be described.

Figure 4A:
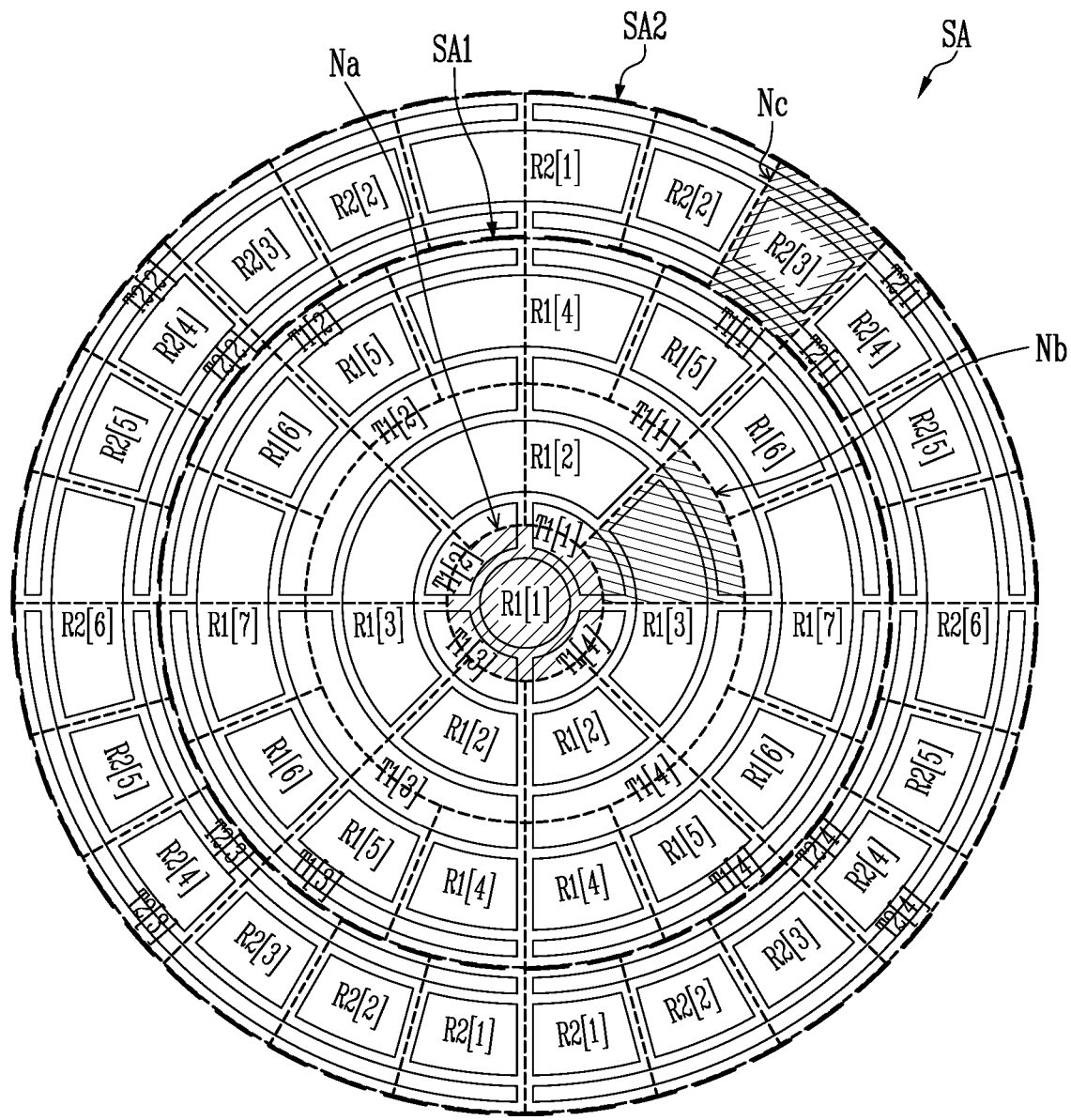
FIGS. 4A and 4B are plan views of exemplary embodiments of first and second sensor electrodes of a touch sensor of the panel unit of FIG. 1B in the sensing area.
Figure 4B:
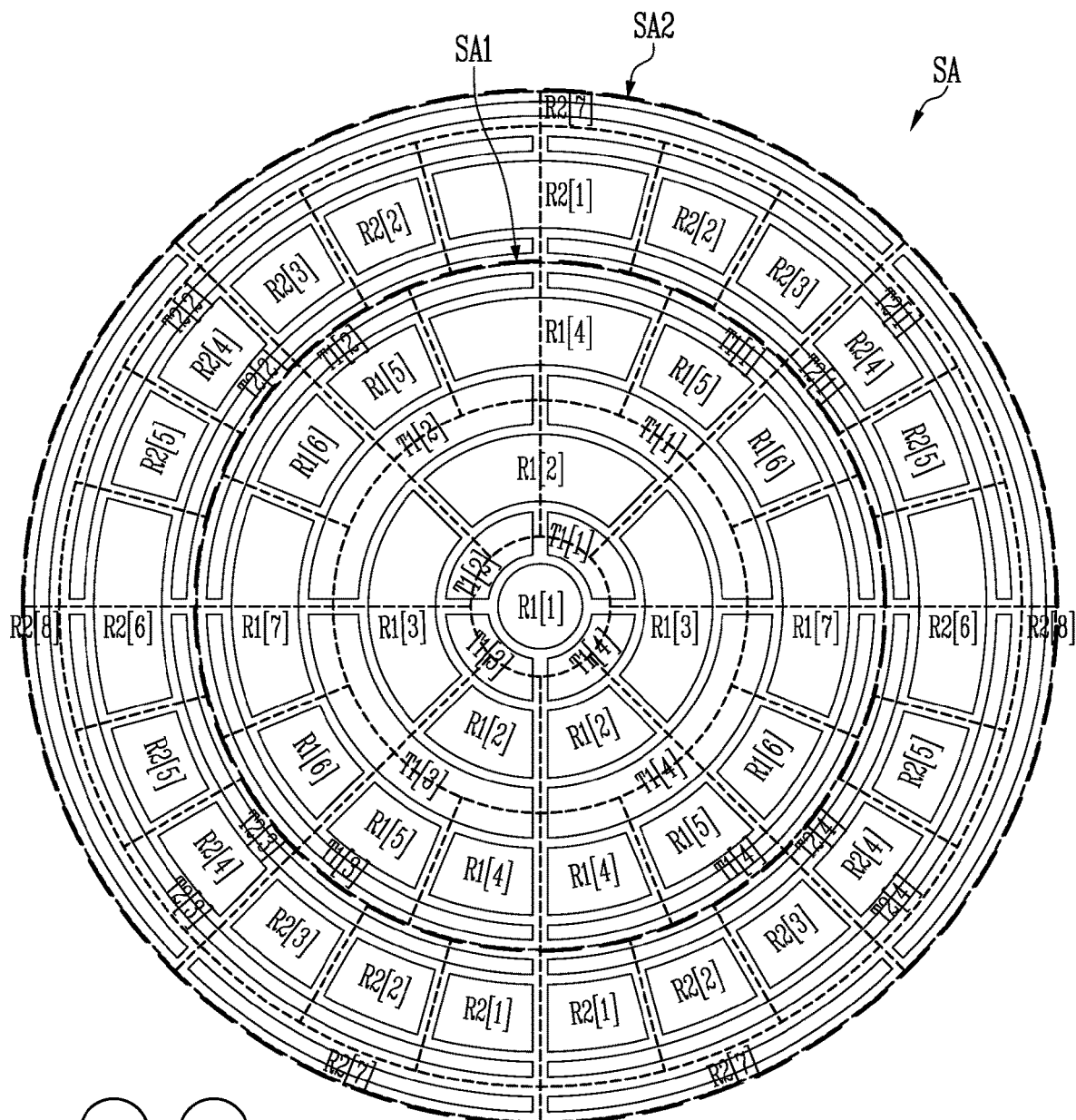

FIGS. 4A and 4B are plan views of exemplary embodiments of first and second sensor electrodes of a touch sensor of the panel unit of FIG. 1B in the sensing area. FIGS. 4A and 4B respectively illustrate the touch sensor TS according to an exemplary embodiment, and particularly illustrate different exemplary embodiments of a structure (for example, a pattern shape and/or an arrangement structure of the sensor electrodes) of a sensor pattern disposed in the sensing area SA.

Referring to FIG. 4A, the sensing area SA may include the first sensing area SA1 positioned at the center portion thereof and the second sensing area SA2 positioned at the edge portion thereof. According to an exemplary embodiment, the sensing area SA may have a generally circular shape. In addition, the first sensing area SA1 may be set as an inner concentric area having a radius smaller than that of the generally circular-shaped sensing area SA, and the second sensing area SA2 may be set as a ring-shaped outer area surrounding the first sensing area SA1.

The first sensing area SA1 and the second sensing area SA2 may be driven independently of each other. To this end, the first sensing area SA1 and the second sensing area SA2 may include separate sensor patterns. For example, the first sensing area SA1 and the second sensing area SA2 may include first sensor electrodes SE1 and second sensor electrodes SE2 separated from each other. For example, when it is assumed that the first sensor electrodes SE1 include a plurality of first Tx electrodes T1 and first Rx electrodes R1 disposed in the first sensing area SA1, and the second sensor electrodes SE2 include a plurality of second Tx electrodes T2 and second Rx electrodes R2 disposed in the second sensing area SA2, the first Tx electrodes T1 and the first Rx electrodes R1 may be separated from the second Tx electrodes T2 and the second Rx electrodes R2, respectively.

According to an exemplary embodiment, the first sensor electrodes SE1 and the second sensor electrodes SE2 may be curved electrodes including a curved circumference optimized for the generally circular-shaped sensing area SA. For example, each of the first sensor electrode SE1 and the second sensor electrode SE2 may include a generally circular-shaped or partial ring-shaped electrode pattern, and the electrode pattern may be formed from a single pattern or a plurality of patterns.

For example, the first and second sensor electrodes SE1 and SE2 may include a generally circular-shaped center electrode R1[1] disposed at the center of the sensing area SA, and a plurality of partial ring-shaped TX electrodes and Rx electrodes alternately disposed in a plurality of ring-shaped areas radially extending from the center electrode R1[1] at the center of the first sensing area SA1. Accordingly, the sensor area loss in the edge portion of the generally circular-shaped sensing area SA is prevented or minimized, and thus the SNR of the touch sensor TS may be improved.

The cross-sectional structure, material, and/or the like of the first and second sensor electrodes SE1 and SE2 are/is not particularly limited. For example, each of the first and second sensor electrodes SE1 and SE2 may have a single-layer or multi-layer structure and may be formed as a generally plate-shaped or mesh-shaped electrode. In addition, each of the first and second sensor electrodes SE1 and SE2 may have conductivity by including at least one of various known conductive materials, and may be transparent, opaque, or translucent.

The first sensor electrodes SE1 may include the first Tx electrodes T1 and the first Rx electrodes R1 that are regularly disposed in the first sensing area SA1. For example, the first Tx electrodes T1 and the first Rx electrodes R1 may be alternately disposed in a radial direction in the first sensing area SA1.

Generally circular-shaped or partial ring-shaped first sensing nodes Na and Nb may be formed in the first sensing area SA1 by the first Tx electrodes T1 and the first Rx electrodes R1 adjacent to each other. For example, in the center of the first sensing area SA1, the generally circular-shaped first sensing node Na may be formed by the generally circular-shaped center electrode R1[1] and the electrode patterns of the first Tx electrodes T1 immediately adjacent to the center electrode R1[1], and a plurality of partial ring-shaped first sensing nodes Nb may be formed by the electrode patterns of the first Tx electrodes T1 and the Rx electrodes R1 adjacent to each other at a radial position centered on the generally circular-shaped first sensing node Na.

According to an exemplary embodiment, the first Tx electrodes T1 may have substantially the same or similar areas, and the first Rx electrodes R1 may have substantially the same or similar areas. Accordingly, the capacitance of the first sensing nodes Na and Nb may be substantially uniform.

In an exemplary embodiment, the first Tx electrodes T1 may be divided and disposed in each quadrant of the first sensing area SA1, and each of the first Rx electrodes R1 may include at least one electrode pattern disposed in each of first to fourth quadrants. Accordingly, positions of each of the first sensing nodes Na and Nb may be defined. For example, a quadrant in which each of the first sensing nodes Na and Nb is positioned may be divided by the first Tx electrodes T1, and the positions (for example, coordinates) of each of the first sensing nodes Na and Nb may be determined in detail in a corresponding quadrant by the first Rx electrodes R1. For example, the positions of each of the first sensing nodes Na and Nb may be defined by an orthogonal coordinate system or a polar coordinate system.

The first sensor electrodes SE1 may include a generally circular-shaped center electrode R1[1] positioned at the center of the first sensing area SA1, first partial ring-shaped Rx electrodes R1[2] to R1[7] dispersed and disposed in at least one ring-shaped area according to a predetermined distance and/or interval from the center electrode R1[1], and first Tx electrodes T1[1] to T1[4] disposed in a ring-shaped area between the center electrode R1[1] and the first partial ring-shaped Rx electrodes R1[2] to R1[7] and/or a ring-shaped area between the first partial ring-shaped Rx electrodes R1[2] to R1[7] of which radii are different.

In the exemplary embodiment of FIG. 4A, the center electrode R1[1] may be the Rx electrode but is not limited thereto. For example, in another exemplary embodiment, a generally circular-shaped Tx electrode may be disposed at the center of the first sensing area SA1.

Each of the first partial ring-shaped Rx electrodes R1[2] to R1[7] and the first Tx electrodes T1[1] to T1[4] may include a single partial ring-shaped electrode pattern or a plurality of partial ring-shaped electrode patterns. In addition, each of the first Tx electrodes T1[1] to T1[4] may be divided and disposed in a predetermined quadrant, and the first partial ring-shaped Rx electrodes R1[2] to R1[7] may be divided into a plurality of electrode patterns such that at least one is arranged in each quadrant according to a predetermined rule.

In FIG. 4A, among the electrode patterns forming the first Tx electrodes T1[1] to T1[4] and the first partial ring-shaped Rx electrodes R1[2] to R1[7], the electrode patterns denoted by the same reference numeral may be connected to each other to form one first Tx electrode T1 or one first Rx electrode R1. In addition, when the first sensing area SA1 has a generally circular shape, each quadrant of the first sensing area SA1 may correspond to a quarter circle.

The first Tx electrodes T1[1] to T1[4] may include a first-first Tx electrode T1[1] positioned in a first quadrant of the first sensing area SA1, a first-second Tx electrode T1[2] positioned in a second quadrant of the first sensing area SA1, a first-third Tx electrode T1[3] positioned in a third quadrant of the first sensing area SA1, and a first-fourth Tx electrode T1[4] positioned in a fourth quadrant of the first sensing area SA1. Each of the first-first to first-fourth Tx electrodes T1[1] to T1[4] may include a single partial ring-shaped electrode pattern or a plurality of partial ring-shaped electrode patterns. For example, each of the first-first to first-fourth Tx electrodes T1[1] to T1[4] may be regularly dispersed between the first partial ring-shaped Rx electrodes R1[2] to R1[7] divided into a plurality of electrode patterns and disposed in a corresponding quadrant.

The first partial ring-shaped Rx electrodes R1[2] to R1[7] may include a plurality of electrode patterns, each of which is dispersed in the first to fourth quadrants of the first sensing area SA1. For example, each of the first partial ring-shaped Rx electrodes R1[2] to R1[7] may include a first electrode pattern disposed in the first quadrant, a second electrode pattern disposed in the second quadrant, a third electrode pattern disposed in the third quadrant, and a fourth electrode pattern disposed in the fourth quadrant. The first to fourth electrode patterns forming the same first Rx electrode R1 may be connected to each other by an integrated type or non-integrated type line.

According to an exemplary embodiment, the first partial ring-shaped Rx electrodes R1[2] to R1[7] may be regularly arranged along a direction defined for each quadrant in each ring-shaped area. For example, the first partial ring-shaped Rx electrodes R1[2] to R1[7] may be sequentially arranged along a third direction DR3 in each Rx partial ring area positioned in the first and third quadrants and may be sequentially arranged along a fourth direction DR4 opposite to the third direction DR3 in each Rx partial ring area positioned in the second and fourth quadrants. In an exemplary embodiment, the third direction DR3 may be a clockwise direction, and the fourth direction DR4 may be a counterclockwise direction. In another exemplary embodiment, the third direction DR3 may be a counterclockwise direction, and the fourth direction DR4 may be a clockwise direction.

In this case, the lines may be routed between the first sensor electrodes SE1 such that the lines connected to each of the first sensor electrodes SE1 (e.g., each of the first Tx electrode T1 and the first Rx electrode R1) do not intersect each other. Accordingly, the lines may be integrally formed on the same layer as the first sensor electrodes SE1 to form the touch sensor TS of a single layer structure.

In addition, when the electrode patterns forming the same first Rx electrode R1 are arranged side by side in a boundary area between adjacent quadrants, the electrode patterns may be integrally connected to each other to be formed as substantially one electrode pattern or to be formed as two electrode patterns separated from each other. For example, when the lines of the first sensor electrodes SE1 are routed through a boundary area between the third and fourth quadrants, the Rx electrode pattern forming the same first Rx electrode R1 may be integrally connected to be formed as a single electrode pattern in a boundary area between the first and second quadrants, a boundary area between the second and third quadrants, and a boundary area between the fourth and first quadrants. In addition, two Rx electrode patterns forming the same first Rx electrode R1 may be separated from each other in a boundary area between the third and fourth quadrants.

The second sensor electrodes SE2 may include the second Tx electrodes T2 and the second Rx electrodes R2 that are regularly disposed in the second sensing area SA2. For example, the second Tx electrodes T2 and the second Rx electrodes R2 may be alternately or sequentially disposed in a radial direction in the second sensing area SA2.

Partial ring-shaped second sensing nodes Nc may be formed in the second sensing area SA2 by the electrode patterns of the second Tx electrodes T2 and the electrode patterns of the second Rx electrodes R2 adjacent to each other. For example, in the ring-shaped area surrounding the first sensing area SA1, the second sensing nodes Nc of a regular size may be dispersed and arranged.

According to an exemplary embodiment, the second Tx electrodes T2 may have substantially the same or similar areas, and the second Rx electrodes R2 may have substantially the same or similar areas. Accordingly, a capacitance of the second sensing nodes Nc may be substantially uniform.

In addition, the second sensing nodes Nc may be formed to have substantially the same or similar capacitance as the first sensing nodes Na and Nb. To this end, as the radius of concentric circles forming a circumference of the first and second sensing nodes Na, Nb, and Nc increases, each ring-shaped area may be divided into a larger number of first sensing nodes a and Nb or second sensing nodes Nc. Accordingly, in the sensing area SA as a whole, the first and second sensing nodes Na, Nb, and Nc may have substantially the same or similar areas, and the capacitance formed in the first and second sensing nodes Na, Nb, and Nc may become substantially uniform.

In an exemplary embodiment, the second Tx electrodes T2 may be divided and disposed in each quadrant of the second sensing area SA2, and each of the second Rx electrodes R2 may include at least one electrode pattern disposed in each of the first to fourth quadrants. Accordingly, positions of each of the second sensing nodes Nc may be defined. For example, a quadrant in which each of the second sensing nodes Nc is positioned may be divided by the second Tx electrodes T2, and the positions (for example, coordinates) of each of the second sensing nodes Nc may be determined in detail in a corresponding quadrant by the second Rx electrodes R2.

The second sensor electrodes SE2 may include second partial ring-shaped Rx electrodes R2[1] to R2[6] dispersed and disposed in ring-shaped area spaced apart from the first sensing area SA1 by a predetermined distance, and second Tx electrodes T2[1] to T2[4] disposed in a ring-shaped area inside and/or outside the second partial ring-shaped Rx electrodes R2[1] to R2[6].

Each of the second partial ring-shaped Rx electrodes R2[1] to R2[6] and the second Tx electrodes T2[1] to T2[4] may include a single partial ring-shaped electrode pattern or a plurality of partial ring-shaped electrode patterns. In addition, each of the second Tx electrodes T2[1] to T2[4] may be divided and disposed in a predetermined quadrant, and the second partial ring-shaped Rx electrodes R2[1] to R2[6] may be divided into a plurality of electrode patterns such that at least one is arranged in each quadrant according to a predetermined rule. In FIG. 4A, among the electrode patterns forming the second Tx electrodes T2[1] to T2[4] and the second partial ring-shaped Rx electrodes R2[1] to R2[6], the electrode patterns denoted by the same reference numeral may be connected to each other to form one second Tx electrode T2 or one second Rx electrode R2.

The second Tx electrodes T2[1] to T2[4] may include a second-first Tx electrode T2[1] positioned in a first quadrant of the second sensing area SA2, a second-second Tx electrode T2[2] positioned in a second quadrant of the second sensing area SA2, a second-third Tx electrode T2[3] positioned in a third quadrant of the second sensing area SA2, and a second-fourth Tx electrode T2[4] positioned in a fourth quadrant of the second sensing area SA2. Each of the second-first to second-fourth Tx electrodes T2[1] to T2[4] may include a single partial ring-shaped electrode pattern or a plurality of partial ring-shaped electrode patterns. For example, each of the second-first to second-fourth Tx electrodes T2[1] to T2[4] may be disposed in each TX partial ring area positioned inside and outside the second partial ring-shaped Rx electrodes R2[1] to R2[6] divided into two electrode patterns and disposed in a corresponding quadrant.

The second partial ring-shaped Rx electrodes R2[1] to R2[6] may include a plurality of electrode patterns, each of which is dispersed in the first to fourth quadrants of the second sensing area SA2. For example, each of the second partial ring-shaped Rx electrodes R2[1] to R2[6] may include a first electrode pattern disposed in the first quadrant, a second electrode pattern disposed in the second quadrant, a third electrode pattern disposed in the third quadrant, and a fourth electrode pattern disposed in the fourth quadrant. The first to fourth electrode patterns forming the same second Rx electrode R2 may be connected to each other by an integrated type or non-integrated type line.

According to an exemplary embodiment, the second partial ring-shaped Rx electrodes R2[1] to R2[6] may be regularly arranged along a direction defined for each quadrant in each ring-shaped area. For example, the second partial ring-shaped Rx electrodes R2[1] to R2[6] may be sequentially arranged along the clockwise direction (referred to as the third direction DR3) in each Rx partial ring area positioned in the first and third quadrants and may be sequentially arranged along the counterclockwise direction (referred to as the fourth direction DR4) in each Rx partial ring area positioned in the second and fourth quadrants. In this case, the lines may be routed such that the lines connected to each of the second sensor electrodes SE2 (e.g., each of the second Tx electrode T2 and the second Rx electrode R2) do not intersect each other.

In addition, when the electrode patterns forming the same second Rx electrode R2 are arranged side by side in a boundary area between adjacent quadrants, the electrode patterns may be integrally connected to each other to be formed as substantially one electrode pattern or to be formed as two electrode patterns separated from each other. For example, when the lines of the second sensor electrodes SE2 are routed through a boundary area between the third and fourth quadrants, the Rx electrode pattern forming the same second Rx electrode R2 may be integrally connected to be formed as a single electrode pattern in a boundary area between the first and second quadrants, a boundary area between the second and third quadrants, and a boundary area between the fourth and first quadrants. In addition, two Rx electrode patterns forming the same second Rx electrode R2 may be separated from each other in a boundary area between the third and fourth quadrants.

For example, in the entire sensing area SA, with respect to the electrode patterns of the first and second Tx electrodes T1 and T2 disposed in each Tx ring area, each line integrally connected to the electrode pattern of the corresponding first or second Tx electrode T1 or T2 may be formed in a separation space secured between the first or second Rx electrodes R1 or R2 positioned inside and/or outside a corresponding Rx ring area of a corresponding Tx ring area, and the line may extend to an outside of the sensing area SA through the boundary area between the third and fourth quadrants. In addition, with respect to the electrode patterns of the first and second Rx electrodes R1 and R2 disposed in each Rx ring area, each line integrally connected to the first or second Rx electrode R1 or R2 may be formed in a separation space secured between the first or second Tx electrodes T1 or T2 positioned inside and/or outside a corresponding Rx ring area, and the line may be withdrawn to the outside of the sensing area SA through the boundary area between the third and fourth quadrants. In this case, between the sensor electrodes (e.g., the first Tx electrodes T1, the first Rx electrodes R1, the second Tx electrodes T2 and/or the second Rx electrodes R2), the lines may be formed so as not to intersect each other. Accordingly, lines may be formed integrally with each sensor electrode and/or electrode pattern.

Therefore, according to an exemplary sensor pattern structure, the touch sensor TS of a single layer may be implemented. Accordingly, the manufacturing process of the touch sensor TS may be simplified, and manufacturing cost may be reduced. In addition, the thickness of the touch sensor TS may be reduced, and the sensing sensitivity of the touch sensor TS may be improved.

Further, the touch sensor TS is not limited to having a single layer structure. For example, in another exemplary embodiment, at least some lines may be disposed on a layer different from the first and/or second sensor electrodes SE1 and SE2 and may be connected to a corresponding sensor electrode through a contact hole. In this case, the pattern structure and/or arrangement sequence of at least some sensor electrodes may be variously changed according to exemplary embodiments. For example, in another exemplary embodiment, even in the boundary area between the third and fourth quadrants, the Rx electrode pattern forming one first or second Rx electrode R1 or R2 may not be divided into a plurality of patterns.

Accordingly, FIG. 4A discloses an exemplary embodiment in which the second Tx electrodes T2 are disposed in an outermost area of the sensing area SA, but this may be variously changed according to exemplary embodiments. For example, in another exemplary embodiment, as shown in FIG. 4B, additional Rx electrodes R2[7] and R2[8] may be further disposed in the outermost area of the sensing area SA. Accordingly, the sensitivity in the edge portion of the touch sensor TS may be enhanced and improved.

Specifically, in an exemplary embodiment of FIG. 4B, the second sensor electrodes SE2 may further include a ring-shaped or partial ring-shaped outermost Rx electrodes R2[7] and R2[8] disposed in the outermost area of the sensing area SA to surround the second Tx electrodes T2. For example, the second sensor electrodes SE2 may include a second-seventh Rx electrode R2[7] and a (2-8)-th Rx electrode R2[8] divided into a plurality of electrode patterns so as to be uniformly dispersed in each quadrant, and each of which has a partial ring shape. When an edge reinforcement structure as in the exemplary embodiment of FIG. 4B is employed, performance of the touch sensor TS may be improved in a driving mode (for example, the wheel mode) in which the sensing sensitivity of the edge portion is important.

According to the exemplary embodiment of FIGS. 4A and 4B, the first and second sensor electrodes SE1 and SE2 are designed as curved patterns such as a concentric generally circular-shaped electrode pattern having the same center as the generally circular-shaped sensing area SA or a partial ring-shaped electrode pattern having a concentric circular arc. Accordingly, even though the touch sensor TS has the generally circular-shaped sensing area SA, the sensor area loss in the edge portion of the touch sensor TS may be prevented or minimized. In addition, even though the sensing area SA is changed to have an elliptical shape or the like, the sensor area loss in the edge portion of the touch sensor TS may be prevented or minimized by applying substantially the same principle. Accordingly, the SNR of the touch sensor TS in the entire sensing area SA including the edge portion may be improved. Therefore, even in the wheel mode or the like, sufficient touch sensing sensitivity may be obtained even with a low sampling rate of the touch sensor TS. Accordingly, the power consumption of the touch sensor TS may be reduced or minimized.

In addition, according to the exemplary embodiment of FIGS. 4A and 4B, first and second sensing areas SA1 and SA2 may be independently driven by diving the sensing area SA into the first sensing area SA1 and the second sensing area SA2 and separating the first and second sensor electrodes SE1 and SE2 respectively disposed in the first and second sensing areas SA1 and SA2 from each other. Accordingly, in a predetermined driving mode, the power efficiency of the touch sensor TS may be increased by partially or entirely driving the sensing area SA.

For example, in the first mode (e.g., standby mode), the first sensor electrodes SE1 may be driven so that only the first sensing area SA1 is activated, and in the second mode (e.g., wheel mode), the second sensor electrodes SE2 may be driven so that only the second sensing area SA2 is activated. For example, the first sensor electrodes SE1 or the second sensor electrodes SE2 may be selectively driven. Accordingly, the power consumption of the touch sensor TS may be reduced by preventing or minimizing unnecessary power consumption.

In addition, when the touch input is to be detected in the entire sensing area SA (for example, substantially the entire screen), the sensing area SA is substantially completely activated by driving all first and second sensor electrodes SE1 and SE2. Accordingly, the touch input in the entire sensing area SA may be detected.

Figure 5A:
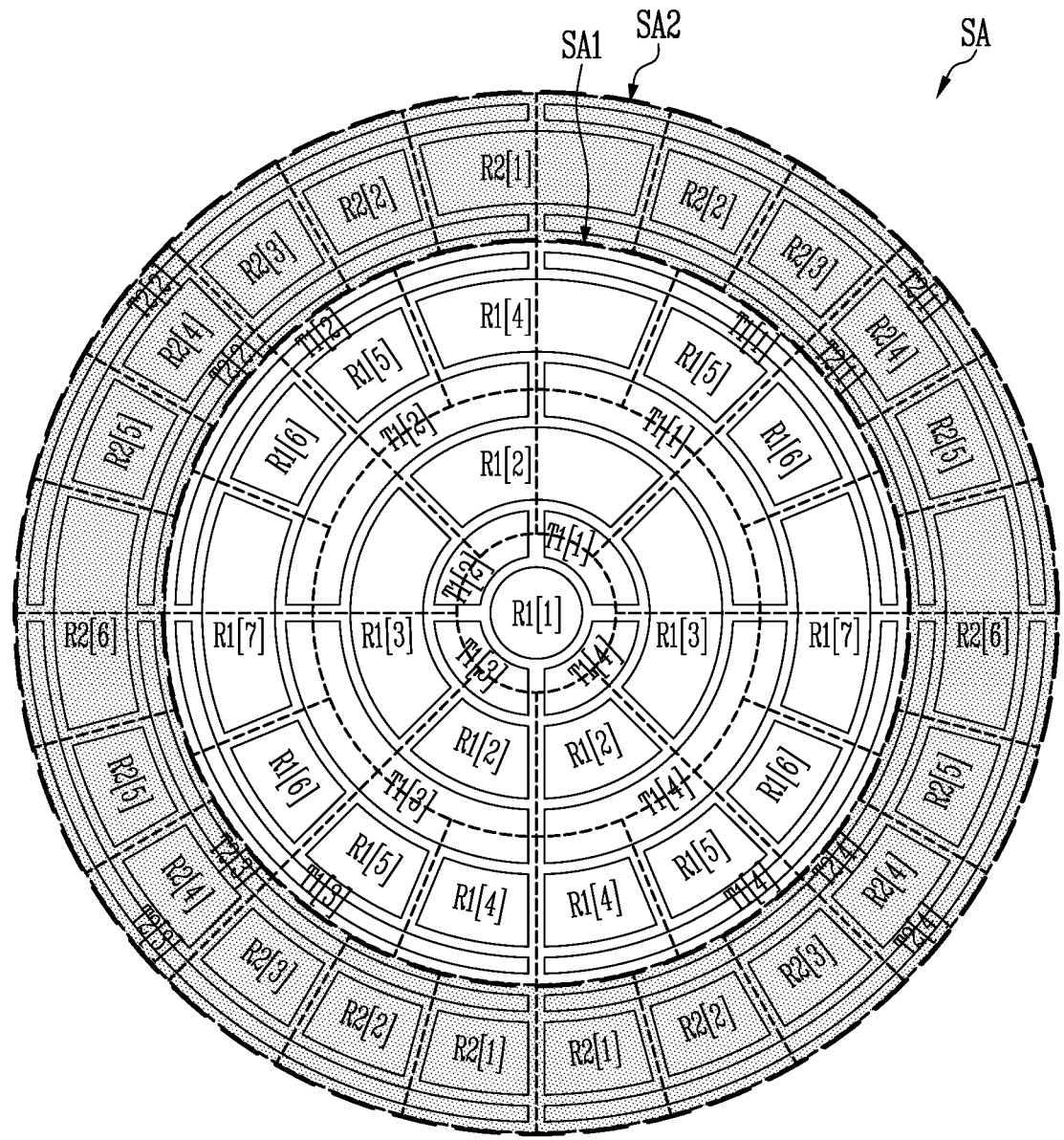
FIGS. 5A and 5B are plan views of the first and second sensor electrodes of the touch sensor of FIGS. 4A and 4B illustrating exemplary embodiments of a method of activating and deactivating the sensing area when the sensing area is driven in a first mode.
Figure 5B:
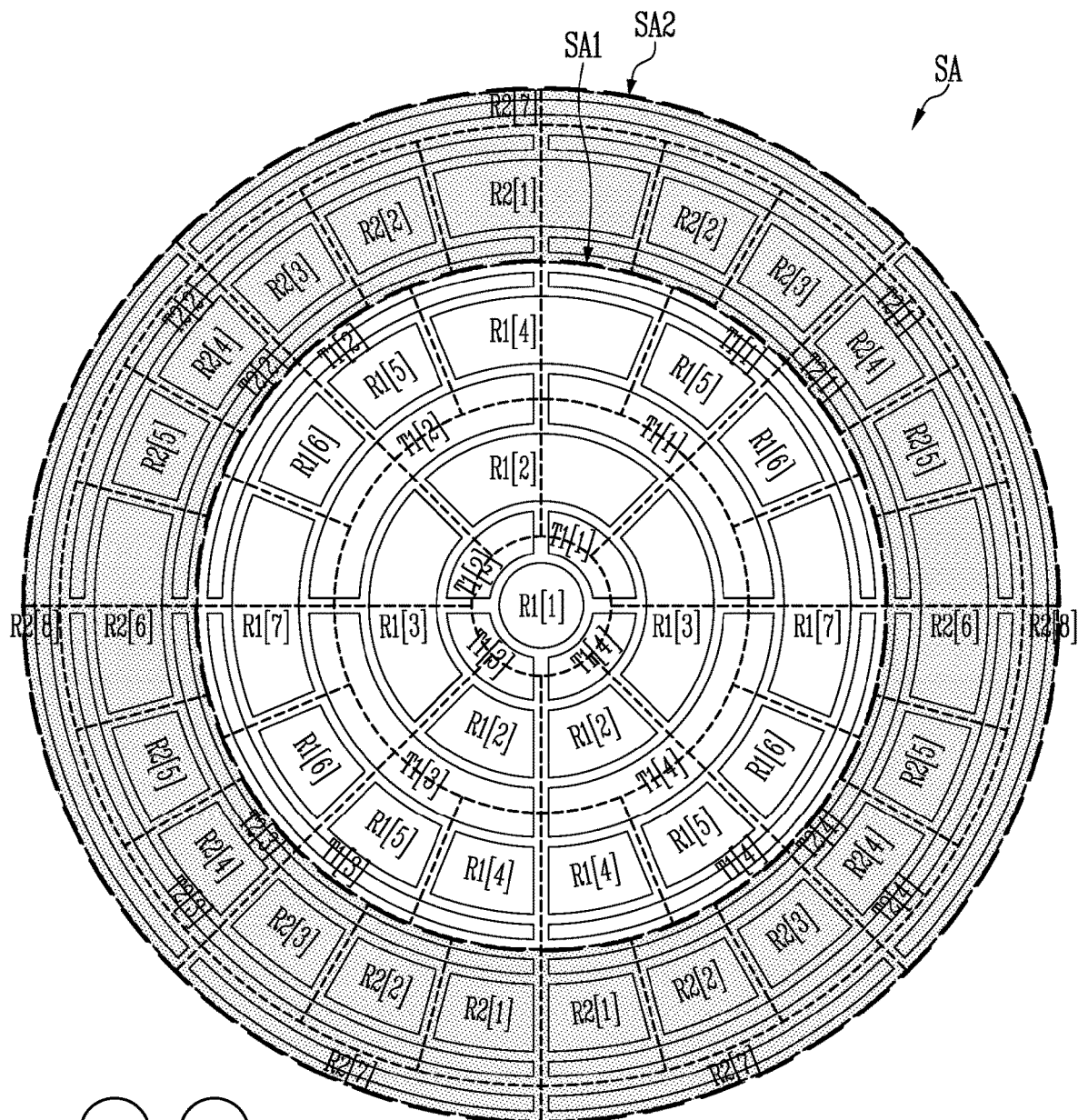

FIGS. 5A and 5B are plan views of the first and second sensor electrodes of the touch sensor of FIGS. 4A and 4B illustrating exemplary embodiments of a method of activating and deactivating the sensing area when the sensing area is driven in a first mode. FIGS. 5A and 5B respectively illustrate an example of sensor electrodes activated when the sensing area SA according to the exemplary embodiment of FIGS. 4A and 4B is driven in the first mode. According to an exemplary embodiment, the first mode may be the standby mode.

Referring to FIGS. 5A and 5B, in the first mode, the first sensor electrodes SE1 disposed in the first sensing area SA1 are activated. For example, in the first mode, at least some of the first sensor electrodes SE1 may be driven to detect the touch input generated in the first sensing area SA1.

In an exemplary embodiment, during a period in which the touch sensor TS is driven in the first mode, all first sensor electrodes SE1 (e.g., all of the first Tx electrodes T1 and the first Rx electrodes R1) may be activated to detect the touch input generated in the first sensing area SA1.

For example, during the period in which the touch sensor TS is driven in the first mode, the second Tx electrodes T2 and the second Rx electrodes R2 may be deactivated. Accordingly, during the period in which the first mode is executed, the second sensing area SA2 may maintain a deactivated state.

According to an exemplary embodiment, the first mode may be the standby mode, and may be a partial driving mode for determining whether a touch operation is started by determining whether there is the touch input generated in the first sensing area SA1. For example, in the first mode, presence or absence of the touch input to the first sensing area SA1 may be monitored while repeatedly charging/discharging at least some of the first sensor electrodes SE1.

During the period in which the first mode is driven, when the touch input is detected by an operation such as knock or click to the first sensing area SA1, a wake-up signal may be generated to drive the touch sensor TS. For example, when the wake-up signal is generated, the driving mode may be switched to the third mode for activating the entire sensing area SA, for example, a normal touch mode.

In a device such as a watch, the device may be driven in the standby mode for a considerable period. Therefore, when waiting for the touch input by partially driving only the first sensing area SA1 during a period in which the device is driven in the standby mode, power consumed in charging/discharging the sensor electrodes may be effectively reduced compared to when waiting for the touch input by driving the entire sensing area SA. Accordingly, the power consumption of the touch sensor TS may be reduced.

FIGS. 5C to 5H are timing diagrams illustrating exemplary embodiments of a method of driving the first and second sensor electrodes of the touch sensor of FIGS. 5A and 5B. FIGS. 5C to 5H illustrate various exemplary embodiments of a method of driving the first sensor electrodes SE1 activated in the exemplary embodiment of FIGS. 5A and 5B. For example, FIGS. 5C to 5H illustrate an exemplary embodiment of the driving signal supplied to the sensing area SA in each exemplary embodiment.

Referring to FIGS. 5C to 5H, during the period in which the touch sensor TS is driven in the first mode, the touch input to the first sensing area SA1 may be detected in the mutual capacitive sensing method or the self-capacitive sensing method using the first Tx electrodes T1 and the first Rx electrodes R1. For example, when the touch input is detected using all first Tx electrodes T1 and first Rx electrodes R1, whether the touch input is generated and a position of the touch input may be detected. Each exemplary embodiment will be described in detail as follows.

Figure 5C:
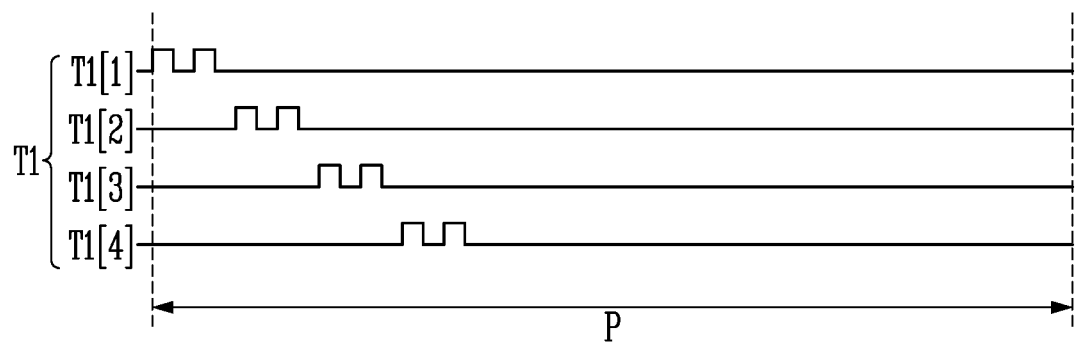
FIGS. 5C to 5H are timing diagrams illustrating exemplary embodiments of a method of driving the first and second sensor electrodes of the touch sensor of FIGS. 5A and 5B.

Referring to FIGS. 5A to 5C, during the period in which the touch sensor TS is driven in the first mode, the touch input to the first sensing area SA1 may be detected in the mutual capacitive sensing method using the first Tx electrodes T1 and the first Rx electrodes R1. For example, when the touch sensor TS is driven in the first mode according to a predetermined frequency, during each unit period P (e.g., one cycle) of the period in which the first mode is executed, the driving signal may be sequentially supplied to the first Tx electrodes T1, and whether the touch input to the first sensing area SA1 is generated may be monitored based on the sensing signal output from the first Rx electrodes R1 by the driving signal. According to an exemplary embodiment, one or more sampling pulses (for example, two sampling pulses) may be supplied to each first Tx electrode T1 during each unit period P. The number of the sampling pulses may be variously set in consideration of the SNR or the like of the touch sensor TS.

In an exemplary embodiment, a waveform of the driving signal shown in FIG. 5C may be the same as or different from a waveform (in FIG. 6C) of the drive signal supplied to the first Tx electrodes T1 in order to detect the touch input to the first sensing area SA1 in a self-capacitive sensing method using the first Tx electrodes T1 during the period in which the touch sensor TS is driven in the first mode. For example, as shown in FIGS. 5C and 6C, in the first mode, the sampling pulse supplied to the first Tx electrodes T1 when driving the first sensing area SA1 in the mutual capacitive sensing method using the first Tx electrodes T1 and the first Rx electrodes R1 may be the same as the sampling pulse supplied to the first Tx electrodes T1 when driving the first sensing area SA1 in the self-capacitive sensing method using the first Tx electrodes T1. Referring to FIGS. 5C and 6C, a label is added to indicate a waveform of the driving signal supplied when driving the first sensing area SA1 in different methods. However, exemplary embodiments are not limited thereto. For example, in another exemplary embodiment, in the first mode, the number of sampling pulses when driving the first sensing area SA1 in the mutual capacitive sensing method using the first Tx electrodes T1 and the first Rx electrodes R1 may be different from the number of sampling pulses supplied to the first Tx electrodes T1 when driving the first sensing area SA1 in the self-capacitive sensing method using the first Tx electrodes T1.

Referring to FIGS. 5A to 5C, when the first sensor electrodes SE1 are driven in the mutual capacitive sensing method in a state in which the second sensor electrodes SE2 are deactivated in the first mode, the standby mode power consumption of the touch sensor TS may be effectively reduced compared to a case where all sensor electrodes SE1 and SE2 are driven in the mutual capacitive sensing method. For example, compared to the exemplary embodiment of FIG. 3 in which the first and second electrodes ET1 and ET2 are required to be entirely driven regardless of the driving mode, in the exemplary embodiment of FIGS. 5A to 5C, the charge/discharge power consumption ratio of the touch sensor TS in the first mode may be reduced to approximately half (for example, about 52%). However, a power consumption reduction effect may vary according to an area ratio of the first and second sensing areas SA1 and SA2, the charge/discharge power consumption of the first and second sensor electrodes SE1 and SE2, or the like.

Referring to FIGS. 5A, 5B, and 5D to 5H, during the period in which the touch sensor TS is driven in the first mode, the touch input to the first sensing area SA1 may be detected in the self-capacitive sensing method using the first Tx electrodes T1 and the first Rx electrodes R1. This will be described in detail as follows.

Figure 5D:
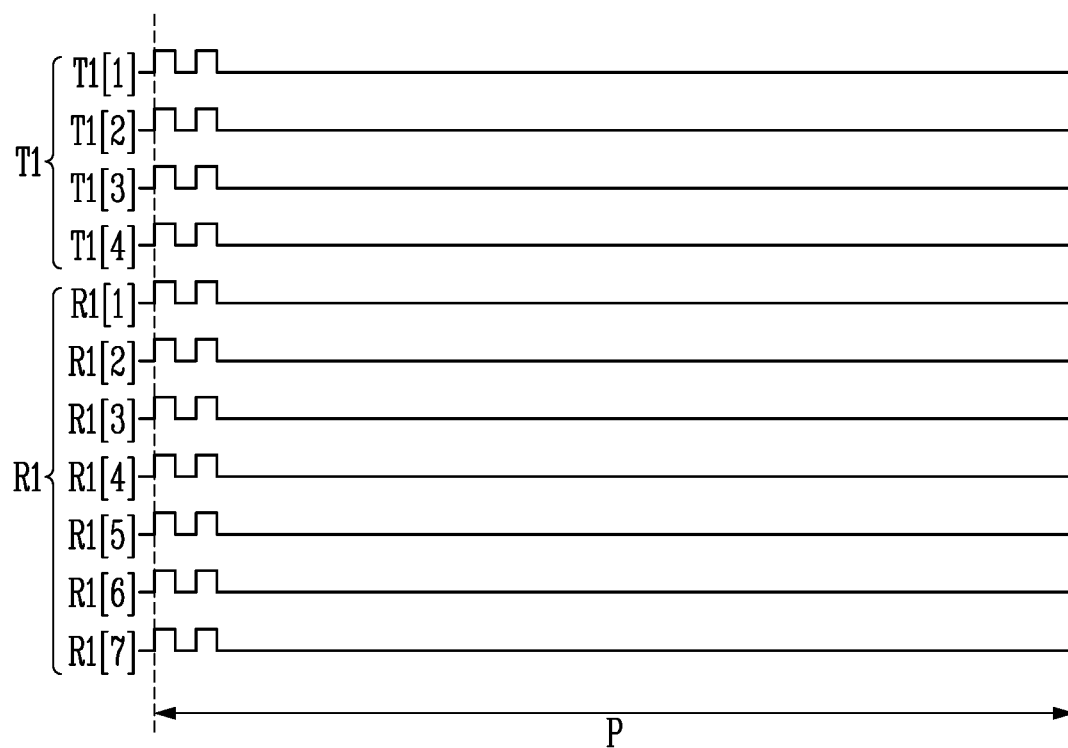

Referring to FIGS. 5A, 5B, and 5D, the driving signal may be simultaneously supplied to the first Tx electrodes T1 and the first Rx electrodes R1 during each unit period P of the period in which the first mode is executed. In addition, whether the touch input to the first sensing area SA1 is generated may be monitored based on the sensing signal output from each of the first Tx electrodes T1 and the first Rx electrodes R1.

Figure 5E:
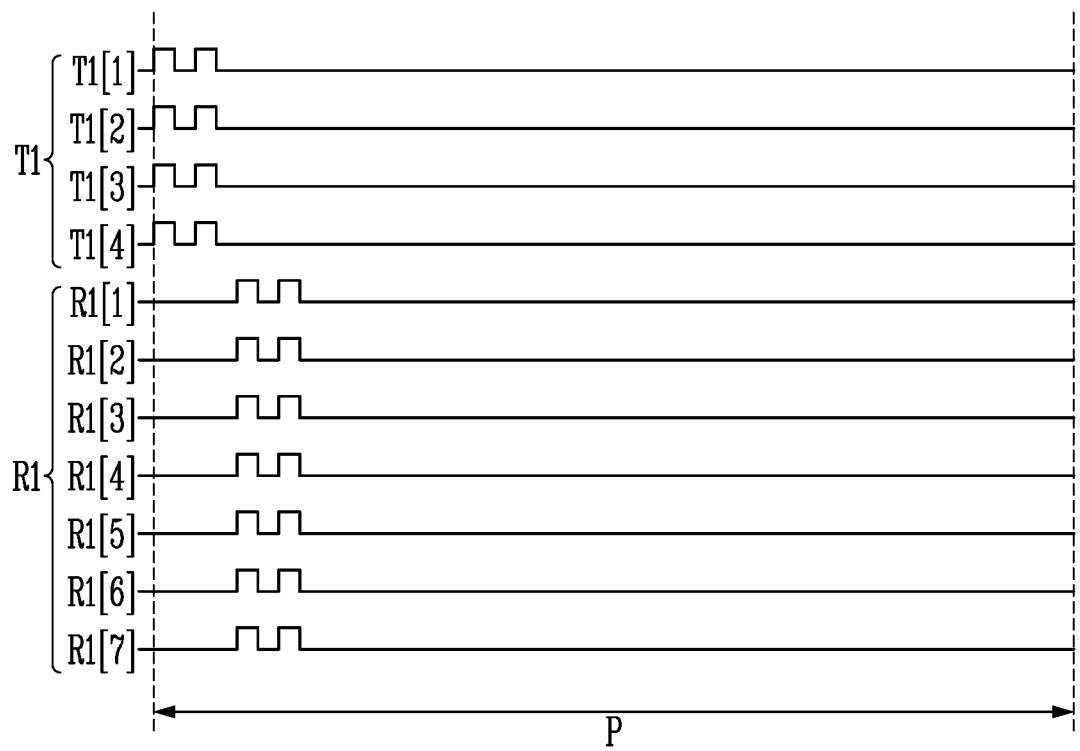

Referring to FIGS. 5A, 5B, and 5E, after simultaneously supplying the driving signal to the first Tx electrodes T1 during each unit period P of the period in which the first mode is executed, the driving signal may be simultaneously supplied to the first Rx electrodes R1. In addition, whether the touch input to the first sensing area SA1 is generated may be monitored based on the sensing signal output from each of the first Tx electrodes T1 and the first Rx electrodes R1.

Figure 5F:
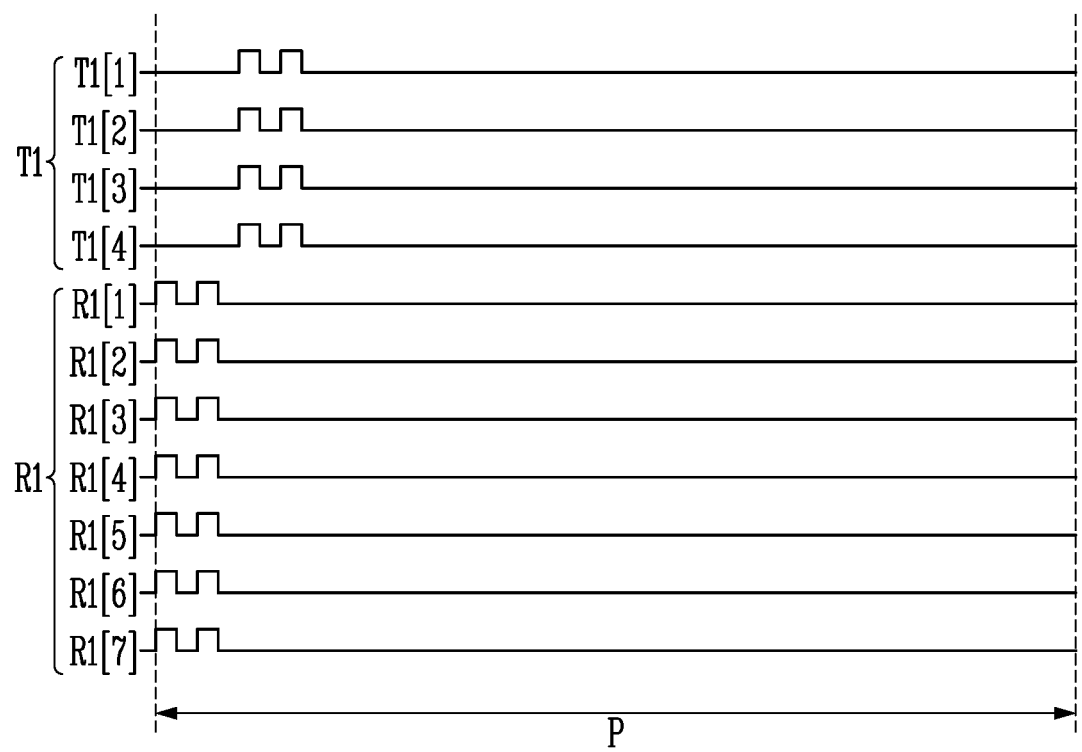

Referring to FIGS. 5A, 5B, and 5F, after simultaneously supplying the driving signal to the first Rx electrodes R1 during each unit period P of the period in which the first mode is executed, the driving signal may be simultaneously supplied to the first Tx electrodes T1. In addition, whether the touch input to the first sensing area SA1 is generated may be monitored based on the sensing signal output from each of the first Tx electrodes T1 and the first Rx electrodes R1.

Figure 5G:
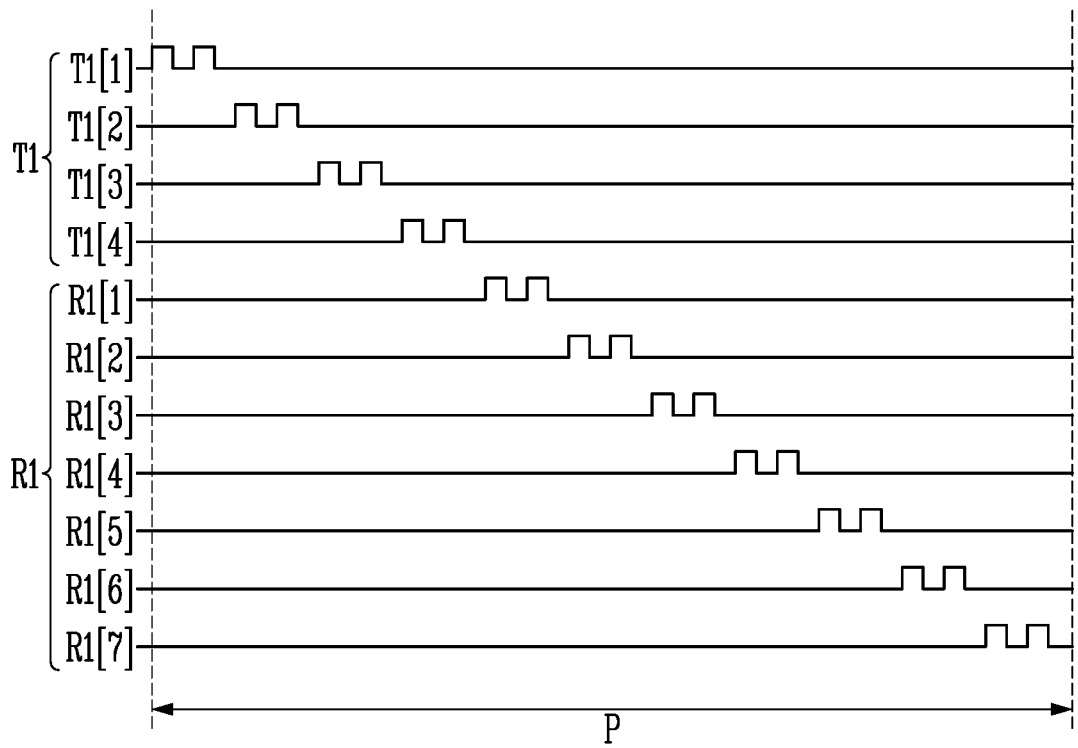

Referring to FIGS. 5A, 5B, and 5G, after sequentially supplying the driving signal to the first Tx electrodes T1 during each unit period P of the period in which the first mode is executed, the driving signal may be sequentially supplied to the first Rx electrodes R1. In addition, whether the touch input to the first sensing area SA1 is generated may be monitored based on the sensing signal output from each of the first Tx electrodes T1 and the first Rx electrodes R1.

Figure 5H:
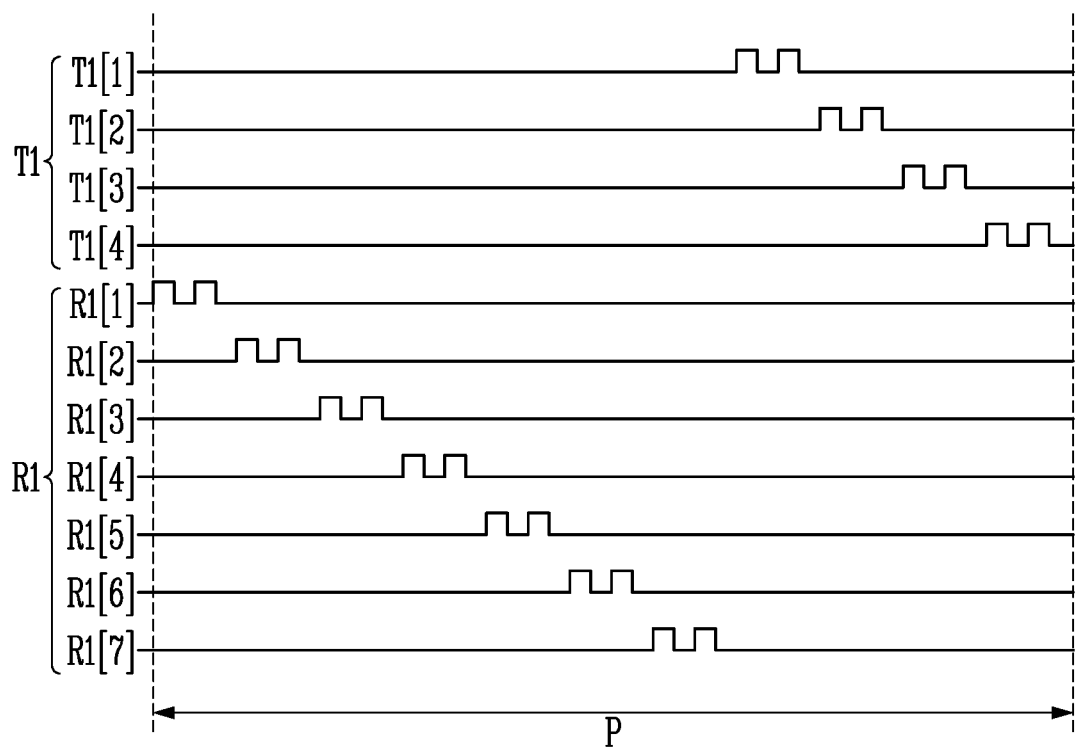

Referring to FIG. 5H, after sequentially supplying the driving signal to the first Rx electrodes R1 during each unit period P of the period in which the first mode is executed, the driving signal may be sequentially supplied to the first Tx electrodes T1. In addition, whether the touch input to the first sensing area SA1 is generated may be monitored based on the sensing signal output from each of the first Tx electrodes T1 and the first Rx electrodes R1.

Referring to FIGS. 5A, 5B, and 5D to 5H, when the first sensor electrodes SE1 are driven in the self-capacitive sensing method in a state in which the second sensor electrodes SE2 are deactivated in the first mode, the standby power consumption of the touch sensor TS may be effectively reduced compared to a case where all sensor electrodes SE1 and SE2 are driven in the mutual capacitive sensing method or the self-capacitive sensing method. For example, compared to the exemplary embodiment of FIG. 3 in which the first and second electrodes ET1 and ET2 are required to be entirely driven regardless of the driving mode, in the exemplary embodiment of FIGS. 5A, 5B, and 5D to 5H, a charge/discharge power consumption ratio of the touch sensor TS in the first mode may be reduced. A power consumption reduction effect may vary according to the charge/discharge power consumption of the first sensor electrodes SE1 driven in each exemplary embodiment.

Figure 6A:
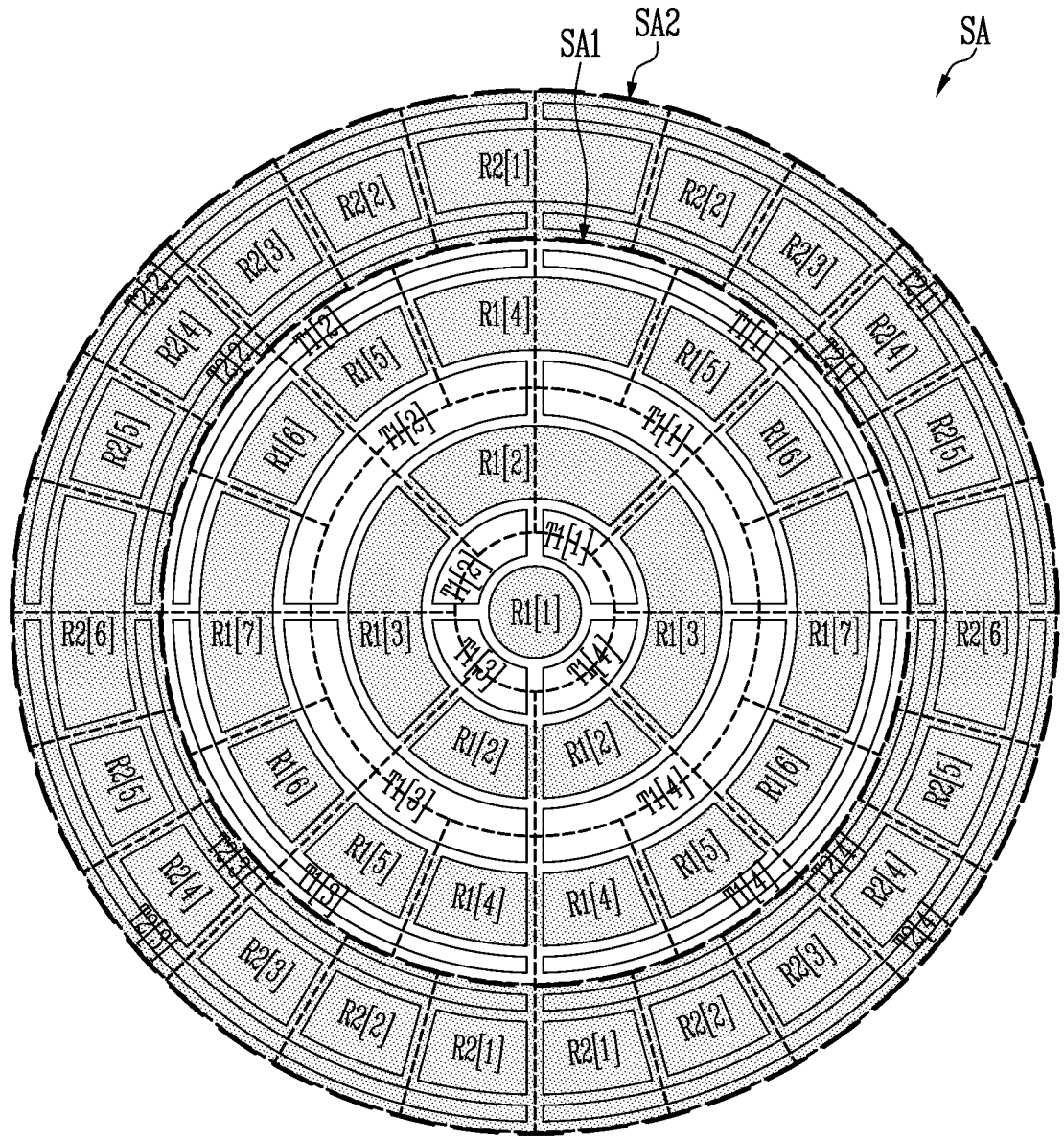
FIGS. 6A and 6B are plan views of the first and second sensor electrodes of the touch sensor of the panel unit of FIGS. 4A and 4B illustrating the other exemplary embodiments of a method of activating or deactivating the sensing area when the sensing area is driven in a first mode.
Figure 6B:
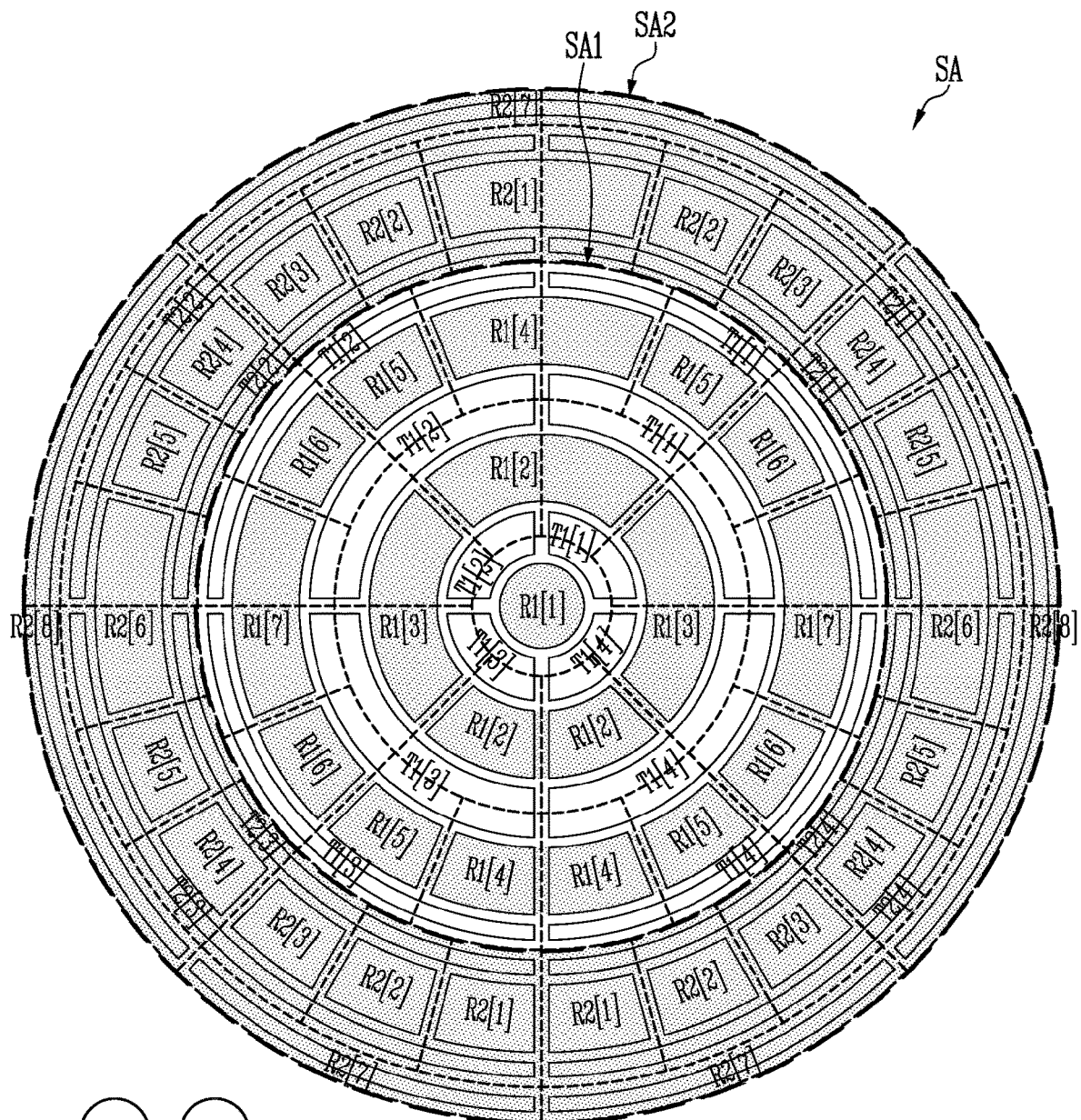
Figure 6C:
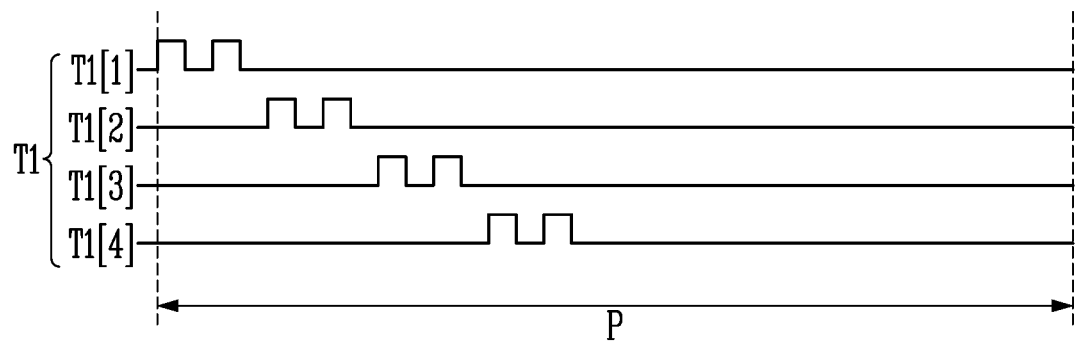
FIGS. 6C and 6D are timing diagrams illustrating exemplary embodiments of a method of driving the first and second sensor electrodes of the touch sensor of FIGS. 6A and 6B.

FIGS. 6A and 6B are plan views of the first and second sensor electrodes of the touch sensor of the panel unit of FIGS. 4A and 4B illustrating the other exemplary embodiments of a method of activating or deactivating the sensing area when the sensing area is driven in a first mode. FIGS. 6A and 6B respectively illustrate another example of the sensor electrodes activated when the sensing area SA according to the exemplary embodiment of FIGS. 4A and 4B is driven in the first mode. In describing the exemplary embodiment of FIGS. 6A and 6B, detailed description of a configuration similar or identical to that of the above-described exemplary embodiment (for example, the exemplary embodiment of FIGS. 5A and 5B) will be omitted for descriptive convenience.

Referring to FIGS. 6A and 6B, in the first mode, only some of the first sensor electrodes SE1 may be activated to detect the touch input generated in the first sensing area SA1. For example, in the first mode, whether the touch input to the first sensing area SA1 is generated may be detected in the self-capacitive sensing method using the first Tx electrodes T1.

In the above-described exemplary embodiment, the remaining first sensor electrodes SE1 (e.g., the first Rx electrodes R1) of the first sensing area SA1 and the second sensor electrodes SE2 (e.g., the second Tx electrodes T2 and the second Rx electrodes R2) of the second sensing area SA2 may be deactivated. Accordingly, during the period in which the first mode is executed, the first sensing area SA1 may be activated by the first Tx electrodes T1, and the second sensing area SA2 may maintain a deactivated state.

When only the first Tx electrodes T1 are driven, since whether the touch input to at least first sensing area SA1 is generated may be detected, a touch detection operation required in the standby mode may be sufficiently performed. In addition, also in the above-described exemplary embodiment, when the touch sensor TS is driven in the first mode, only the first sensing area SA1 of the sensing area SA may be selectively driven, and thus the power consumed in charging/discharging the sensor electrodes may be reduced. Accordingly, the power consumption of the touch sensor TS may be reduced.

Figure 6D:
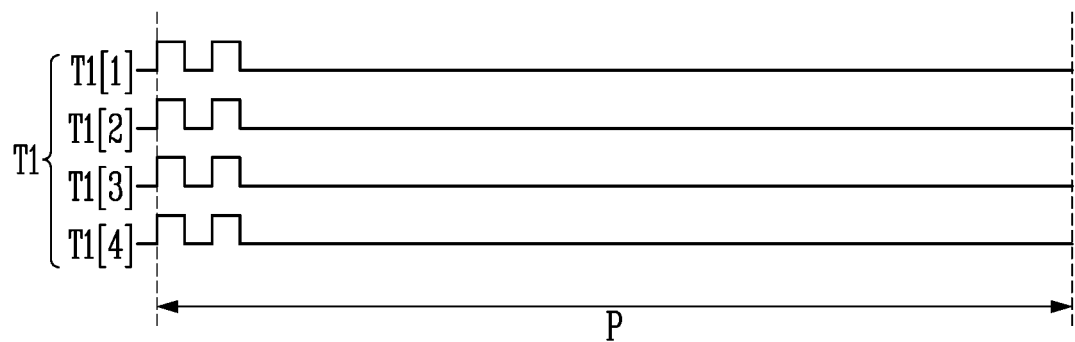

FIGS. 6C and 6D are timing diagrams illustrating exemplary embodiments of a method of driving the first and second sensor electrodes of the touch sensor of FIGS. 6A and 6B. FIGS. 6C and 6D illustrate different exemplary embodiments of a method of driving the first Tx electrodes T1 activated in the exemplary embodiment of FIGS. 6A and 6B. For example, FIGS. 6C and 6D illustrate an exemplary embodiment of the driving signal supplied to the sensing area SA in each exemplary embodiment. In describing the exemplary embodiment of FIGS. 6C and 6D, detailed description of a configuration similar to that of the above-described exemplary embodiment (for example, the exemplary embodiment of FIGS. 5C to 5G) will be omitted for descriptive convenience.

Referring to FIGS. 6A to 6D, during each unit period P of the period in which the first mode is executed, the driving signal may be sequentially or simultaneously supplied to the first Tx electrodes T1. In addition, whether the touch input to the first sensing area SA1 is generated may be monitored based on the sensing signal output from each of the first Tx electrodes T1.

Referring to FIGS. 6A to 6D, when only the first Tx electrodes T1 are driven in the self-capacitive sensing method in the first mode, standby mode power consumption of the touch sensor TS may be effectively reduced compared to a case where all sensor electrodes SE1 and SE2 are driven in the mutual capacitive sensing method or the self-capacitive sensing method. For example, compared to the exemplary embodiment of FIG. 3 in which the first and second electrodes ET1 and ET2 are required to be entirely driven regardless of the driving mode, in the exemplary embodiment of FIGS. 6A to 6D, a charge/discharge power consumption ratio of the touch sensor TS in the first mode may be reduced to approximately half (for example, about 52%). However, a power consumption reduction effect may vary according to the charge/discharge power consumption of the first Tx electrode T1 to the charge/discharge power consumption of the entire sensor electrodes, or the like.

Figure 7A:
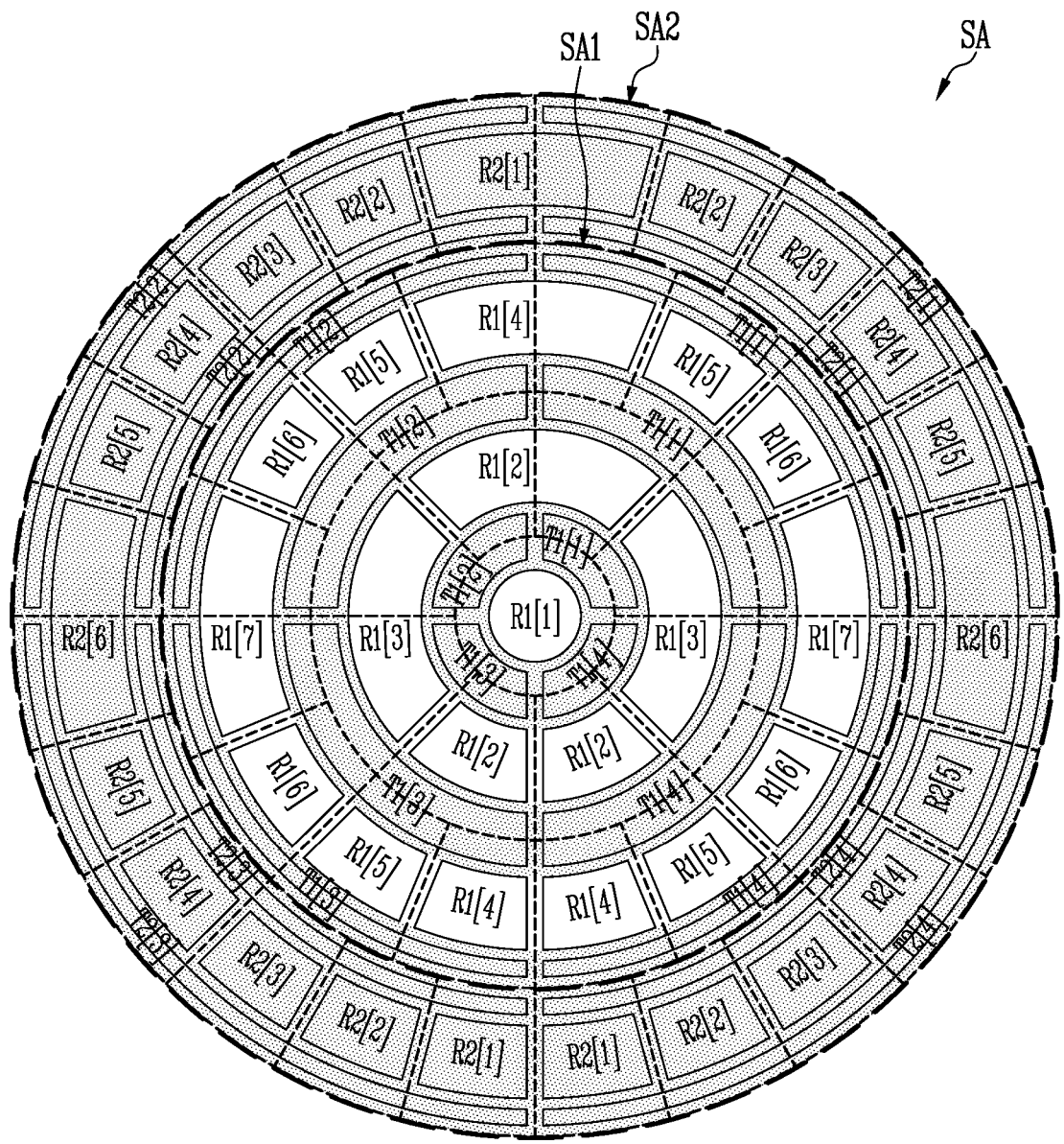
FIGS. 7A and 7B are plan views of the first and second sensor electrodes of the touch sensor of FIGS. 4A and 4B illustrating the other exemplary embodiments of a method of activating and deactivating the sensing area when the sensing area is driven in a first mode.
Figure 7B:
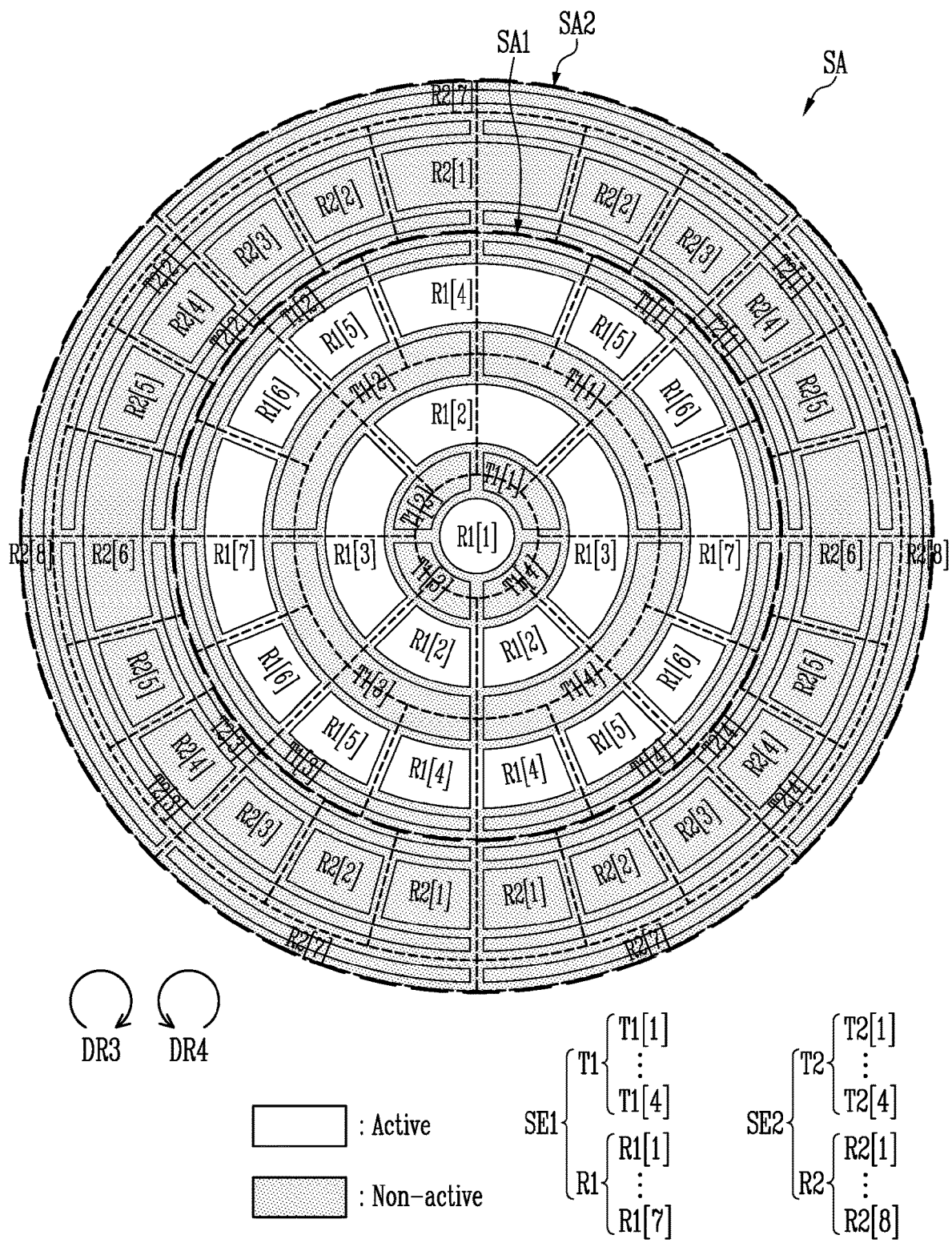

FIGS. 7A and 7B are plan views of the first and second sensor electrodes of the touch sensor of FIGS. 4A and 4B illustrating the other exemplary embodiments of a method of activating and deactivating the sensing area when the sensing area is driven in a first mode. FIGS. 7A and 7B respectively illustrate still another example of the sensor electrodes activated when the sensing area SA according to the exemplary embodiment of FIGS. 4A and 4B is driven in the first mode. In describing the exemplary embodiment of FIGS. 7A and 7B, detailed description of a configuration similar or identical to that of the above-described exemplary embodiment will be omitted for descriptive convenience.

Referring to FIGS. 7A and 7B, in the first mode, whether the touch input to the first sensing area SA1 is generated may be detected in the self-capacitive sensing method using some of the first sensor electrodes SE1, e.g., the first Rx electrodes R1.

In the above-described exemplary embodiment, the remaining first sensor electrodes SE1 (e.g., the first Tx electrodes T1) of the first sensing area SA1 and the second sensor electrodes SE2 (e.g., the second Tx electrodes T2 and the second Rx electrodes R2) of the second sensing area SA2 may be deactivated. Accordingly, during the period in which the first mode is executed, the first sensing area SA1 may be activated by the first Rx electrodes R1, and the second sensing area SA2 may maintain a deactivated state.

When only the first Rx electrodes R1 are driven, since whether the touch input to the first sensing area SA1 is generated may be detected, a touch detection operation required in the standby mode may be sufficiently performed. In addition, also in the above-described exemplary embodiment, when the touch sensor TS is driven in the first mode, only the first sensing area SA1 of the sensing area SA may be selectively driven, and thus the power consumed in charging/discharging the sensor electrodes may be reduced. Accordingly, the power consumption of the touch sensor TS may be reduced.

Figure 7C:
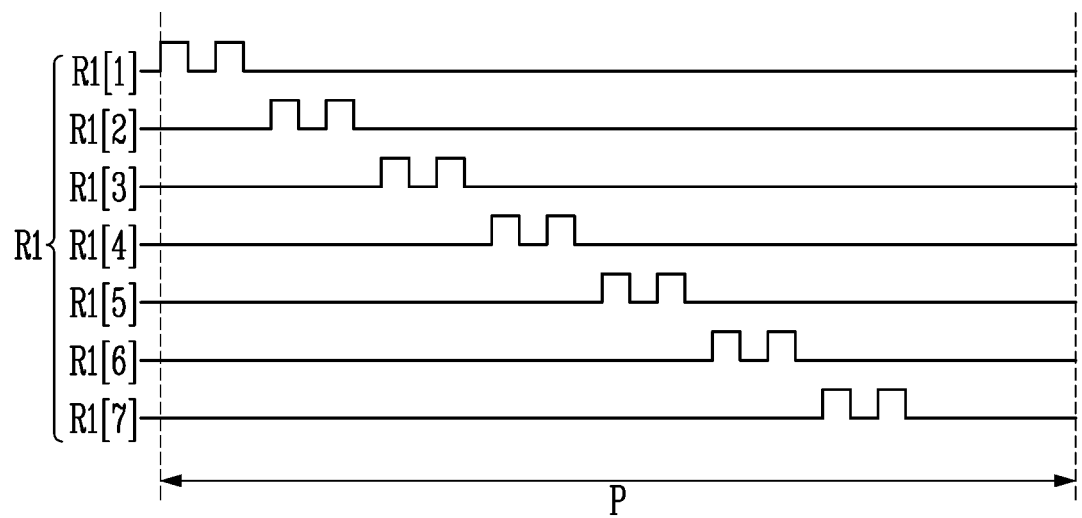
FIGS. 7C and 7D are timing diagrams illustrating exemplary embodiments of a method of driving the first and second sensor electrodes of the touch sensor of FIGS. 7A and 7B.
Figure 7D:

FIGS. 7C and 7D are timing diagrams illustrating exemplary embodiments of a method of driving the first and second sensor electrodes of the touch sensor of FIGS. 7A and 7B. FIGS. 7C and 7D illustrate different exemplary embodiments of a method of driving the first Rx electrodes R1 activated in the exemplary embodiment of FIGS. 7A and 7B. For example, FIGS. 7C and 7D illustrate an exemplary embodiment of the driving signal supplied to the sensing area SA in each exemplary embodiment. In describing the exemplary embodiment of FIGS. 7C and 7D, detailed description of a configuration substantially similar to that of the above-described exemplary embodiments will be omitted for descriptive convenience.

Referring to FIGS. 7A to 7D, during each unit period P of the period in which the first mode is executed, the driving signal may be sequentially or simultaneously supplied to the first Rx electrodes R1. In addition, whether the touch input to the first sensing area SA1 is generated may be monitored based on the sensing signal output from each of the first Rx electrodes R1.

Referring to FIGS. 7A to 7D, when only the first Rx electrodes R1 are driven in the self-capacitive sensing method in the first mode, standby mode power consumption of the touch sensor TS may be effectively reduced compared to a case where all sensor electrodes SE1 and SE2 are driven in the self-capacitive sensing method or the mutual capacitive sensing method. For example, compared to the exemplary embodiment of FIG. 3, in the exemplary embodiment of FIGS. 7A to 7D, a charge/discharge power consumption ratio of the touch sensor TS in the first mode may be reduced to approximately 68%. However, a power consumption reduction effect may vary according to the charge/discharge power consumption of the first Rx electrode R1 to the charge/discharge power consumption of the entire sensor electrodes, or the like.

Figure 8A:
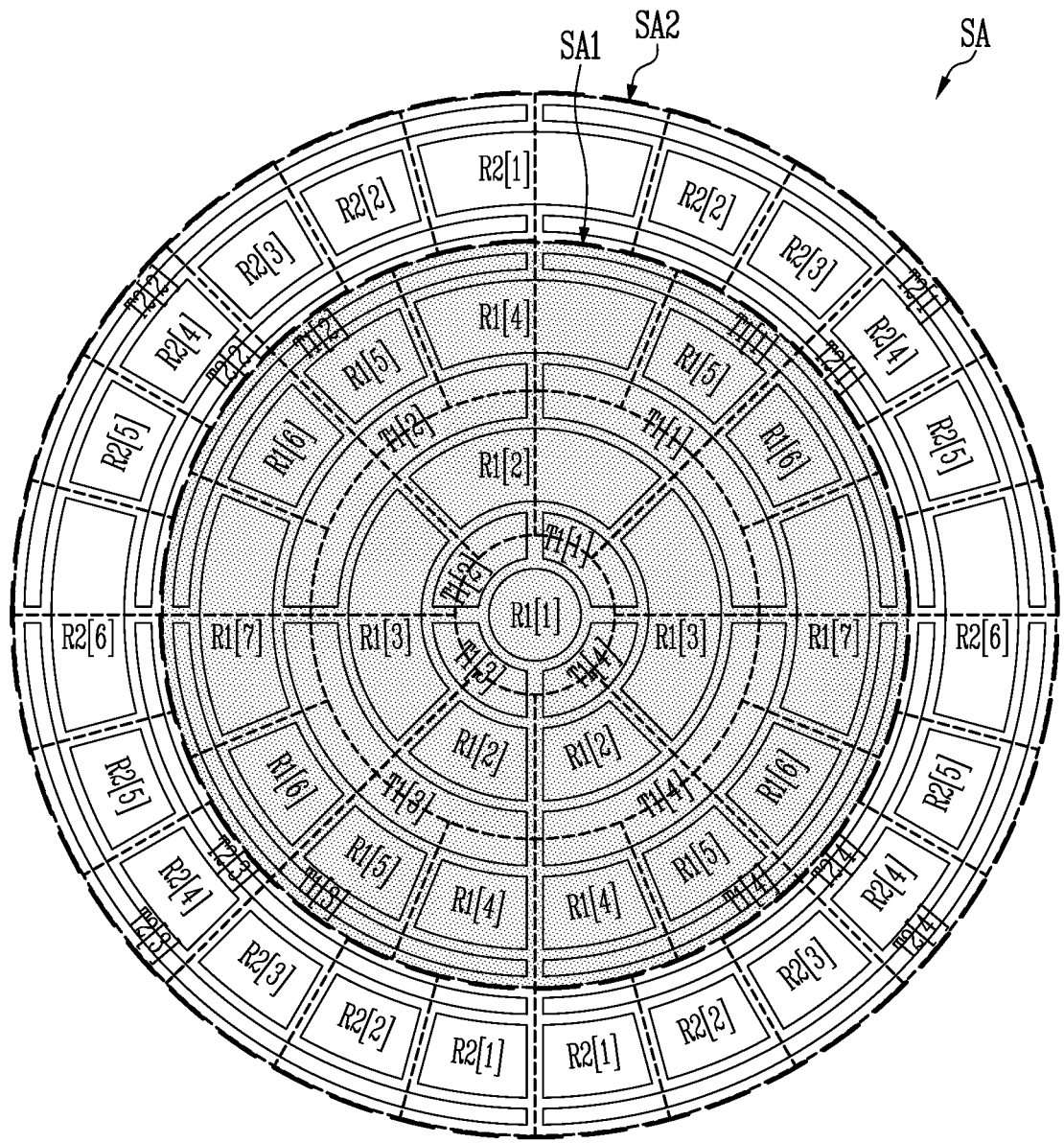
FIGS. 8A and 8B are plan views of the first and second sensor electrodes of the touch sensor of FIGS. 4A and 4B illustrating exemplary embodiments of a method of activating and deactivating the sensing area when the sensing area is driven in a second mode.
Figure 8B:
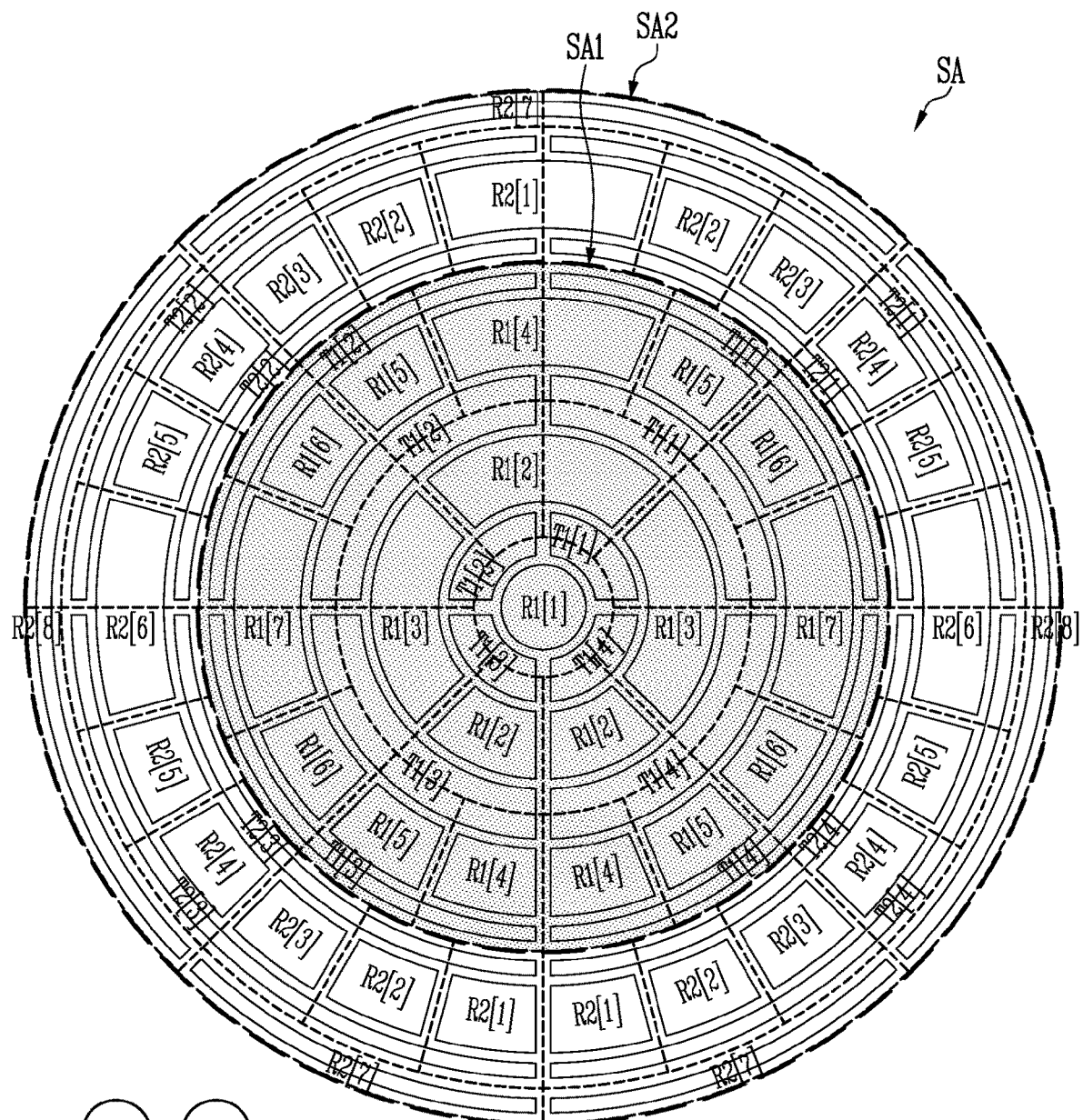

FIGS. 8A and 8B are plan views of the first and second sensor electrodes of the touch sensor of FIGS. 4A and 4B illustrating exemplary embodiments of a method of activating and deactivating the sensing area when the sensing area is driven in a second mode. FIGS. 8A and 8B respectively illustrate an example of the sensor electrodes activated when the sensing area SA according to the exemplary embodiment of FIGS. 4A and 4B is driven in the second mode. According to an exemplary embodiment, the second mode may be the wheel mode.

Referring to FIGS. 8A and 8B, in the second mode, the second sensor electrodes SE2 disposed in the second sensing area SA2 are activated. For example, in the second mode, the second sensor electrodes SE2 may be driven to detect the touch input generated in the second sensing area SA2. To this end, in the second mode, the second Tx electrodes T2 and the second Rx electrodes R2 may be activated.

For example, during a period in which the touch sensor TS is driven in the second mode, the first Tx electrodes T1 and the first Rx electrodes R1 may be deactivated. Accordingly, during the period in which the second mode is executed, the first sensing area SA1 may maintain a deactivated state.

According to an exemplary embodiment, the second mode may be the wheel mode (also referred to as a "wheel operation mode"), and may be a partial driving mode for executing a predetermine operation selected in the wheel mode by determining presence or absence of the touch input generated with respect to the second sensing area SA2 and a position thereof. For example, in the second mode, an operation of a display device such as a watch may be controlled while executing a touch and moving (or dragging) operation with respect to the edge portion of the sensing area SA corresponding to the second sensing area SA2. To this end, in the second mode, the presence and absence of the touch input to the second sensing area SA2 and the position thereof may be monitored while repeatedly charging/discharging the second sensor electrodes SE2.

A display device such as a watch may include a non-quadrangle sensing area SA including a generally circular shape, and may support a wheel mode for rotating a border of the display area DA. In the wheel mode, a device may be controlled to execute an operation selected by a user, by detecting the touch input to the edge portion of the sensing area SA corresponding to the border of the display area DA, e.g., the second sensing area SA2. For example, in the wheel mode, the touch input to the second sensing area SA2 is required to be detected, and to this end, sufficient touch sensitivity is required to be secured to the second sensing area SA2.

For example, when the sensor electrodes are formed as in the exemplary embodiment of FIGS. 4A and 4B, the sensor area loss in the edge portion may be prevented or minimized, and thus a high SNR may be secured also in the edge portion. Accordingly, sufficient touch sensing sensitivity required for a wheel operation may be obtained even with a low sampling rate in the second mode. For example, in executing the wheel operation by driving the sensing area SA of FIGS. 4A and 4B in the second mode as shown in FIGS. 8A and 8B, the touch sensing sensitivity required for the wheel operation may be obtained even though sample is progressed approximately ¼ compared to the exemplary embodiment of FIG. 3. Accordingly, the power consumption of the touch sensor TS may be reduced.

In addition, by partially driving only the second sensing area SA2 during the period in which the touch sensor TS is driven in the second mode, power consumed in charging/discharging the sensor electrodes may be effectively reduced compared to when waiting for the touch input by driving the entire sensing area SA. Accordingly, the power consumption of the touch sensor TS may be more effectively reduced.

FIGS. 8C to 8H are timing diagrams illustrating exemplary embodiments of a method of driving the first and second sensor electrodes of the touch sensor of FIGS. 8A and 8B. FIGS. 8C to 8H illustrate various exemplary embodiments of a method of driving the second sensor electrodes SE2 activated in the exemplary embodiment of FIGS. 8A and 8B. For example, FIGS. 8C to 8H illustrate an exemplary embodiment of the driving signal supplied to the sensing area SA in each exemplary embodiment.

Referring to FIGS. 8A to 8H, during the period in which the touch sensor TS is driven in the second mode, the touch input to the second sensing area SA2 may be detected in the mutual capacitive sensing method or the self-capacitive sensing method using the second Tx electrodes T2 and the second Rx electrodes R2. For example, as the second Tx electrodes T2 and the second Rx electrodes R2 are activated, during the period in which the second mode is executed, whether the touch input to the second sensing area SA2 is generated and the position thereof may be detected. Each exemplary embodiment will be described in detail as follows.

Figure 8C:
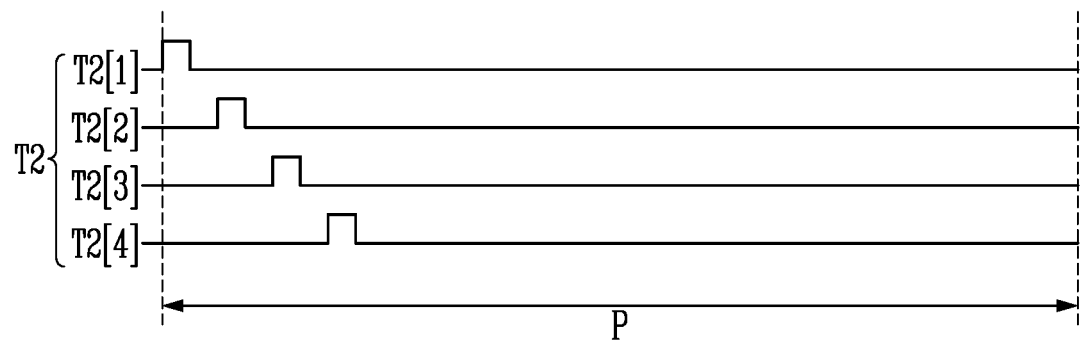

Referring to FIGS. 8A to 8C, during the period in which the touch sensor TS is driven in the second mode, the touch input to the second sensing area SA2 may be detected in the mutual capacitive sensing method using the second Tx electrodes T2 and the second Rx electrodes R2. For example, when the touch sensor TS is driven in the second mode according to a predetermined frequency, during each unit period P of the period in which the second mode is executed, the driving signal may be sequentially supplied to the second Tx electrodes T2, and whether the touch input to the second sensing area SA2 is generated and the position of the touch input may be monitored based on the sensing signal output from the second Rx electrodes R2 by the driving signal.

According to an exemplary embodiment, one or more sampling pulses may be supplied to each second Tx electrode T2 during each unit period P, and the number of sampling pulses may be variously set in consideration of the SNR or the like of the touch sensor TS. For example, in the exemplary embodiment of FIG. 3, four sampling pulses are supplied to each Tx electrode (for example, each first electrode ET1 dispersed throughout the sensing area SA) during each unit period P. However, in the exemplary embodiment of FIGS. 8A to 8C, even though only one sampling pulse is supplied to each second Tx electrode T2 during each unit period P, touch sensing sensitivity similar to the touch sensing sensitivity obtained through four sampling pulses in the exemplary embodiment of FIG. 3 may be obtained.

In the exemplary embodiment of FIGS. 8A to 8C, compared to the exemplary embodiment of FIG. 3, there is no sensor area loss in the edge portion, and only the second sensor electrodes SE2 required for the wheel operation may be selectively driven in the second mode. Therefore, the power consumption of the touch sensor TS may be effectively reduced. For example, according to the exemplary embodiment of FIGS. 8A to 8C, a charge/discharge power consumption ratio of the touch sensor TS in the second mode may be reduced by about 12% of that of the exemplary embodiment of FIG. 3.

In addition, by driving only the second sensor electrodes SE2 of the second sensing area SA2 during the period in which the touch sensor TS is driven in the second mode, power consumed in charging/discharging the sensor electrodes may be effectively reduced compared to when waiting for the touch input by driving the entire sensing area SA. Accordingly, the power consumption of the touch sensor TS may be more effectively reduced. However, a power consumption reduction effect may vary according to the charge/discharge power consumption of the second sensor electrodes SE2 to charge/discharge power consumption of the entire sensor electrodes, or the like.

Referring to FIGS. 8A, 8B, and 8D to 8H, during the period in which the touch sensor TS is driven in the second mode, the touch input to the second sensing area SA2 may be detected in the self-capacitive sensing method using the second Tx electrodes T2 and the second Rx electrodes R2. For example, in the exemplary embodiment of FIGS. 8D to 8H, the driving signal is supplied to all second sensor electrodes SE2 disposed in the second sensing area SA2. For example, during the period in which the second mode is executed, in a case of a pattern structure of FIG. 8A, the second-first to second-fourth Tx electrodes T2[1] to T2[4] and the second-first to second-sixth Rx electrodes R2[1] to R2[6] are driven, and in a case of a pattern structure of FIG. 8B, the second-first to second-fourth Tx electrodes T2[1] to T2[4] and second-first to second-eighth Rx electrodes R2[1] to R2[8] are driven. Each exemplary embodiment of FIGS. 8D to 8H will be described in detail as follows.

Figure 8D:
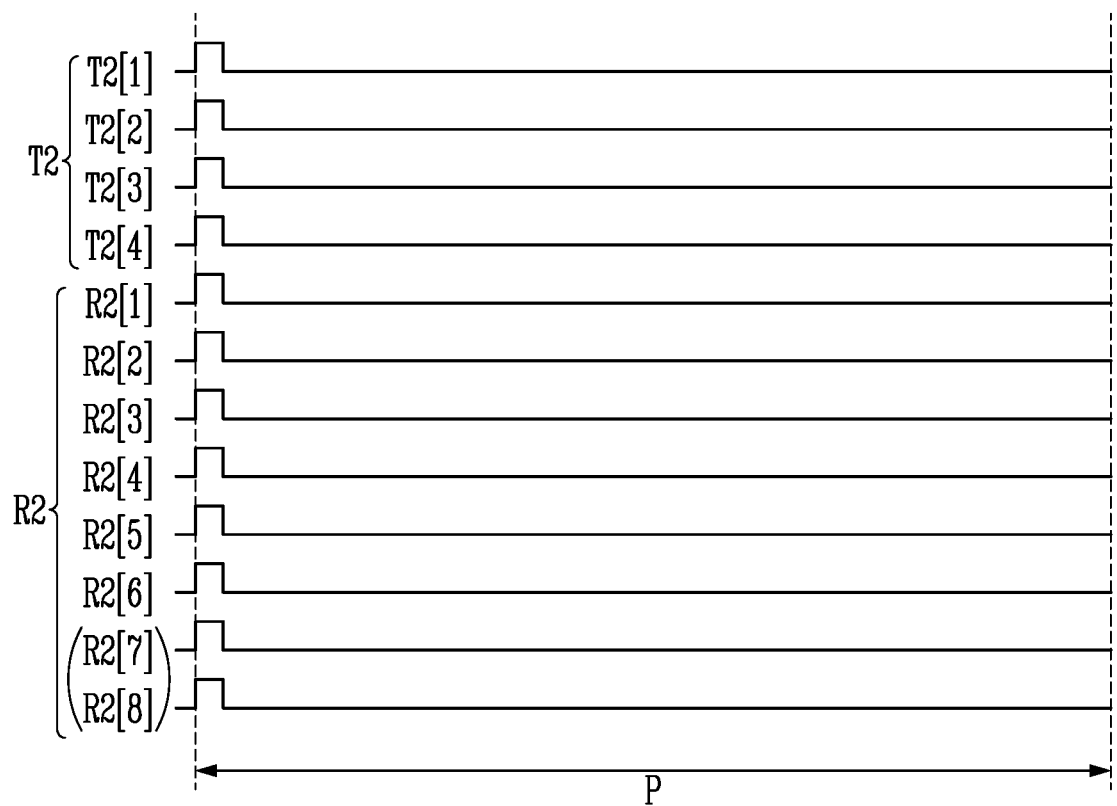

Referring to FIGS. 8A, 8B, and 8D, the driving signal may be simultaneously supplied to the second Tx electrodes T2 and the second Rx electrodes R2 during each unit period P of the period in which the second mode is executed. In addition, whether the touch input to the second sensing area SA2 is generated and the position of the touch input may be monitored based on the sensing signal output from each of the second Tx electrodes T2 and the second Rx electrodes R2.

Figure 8E:
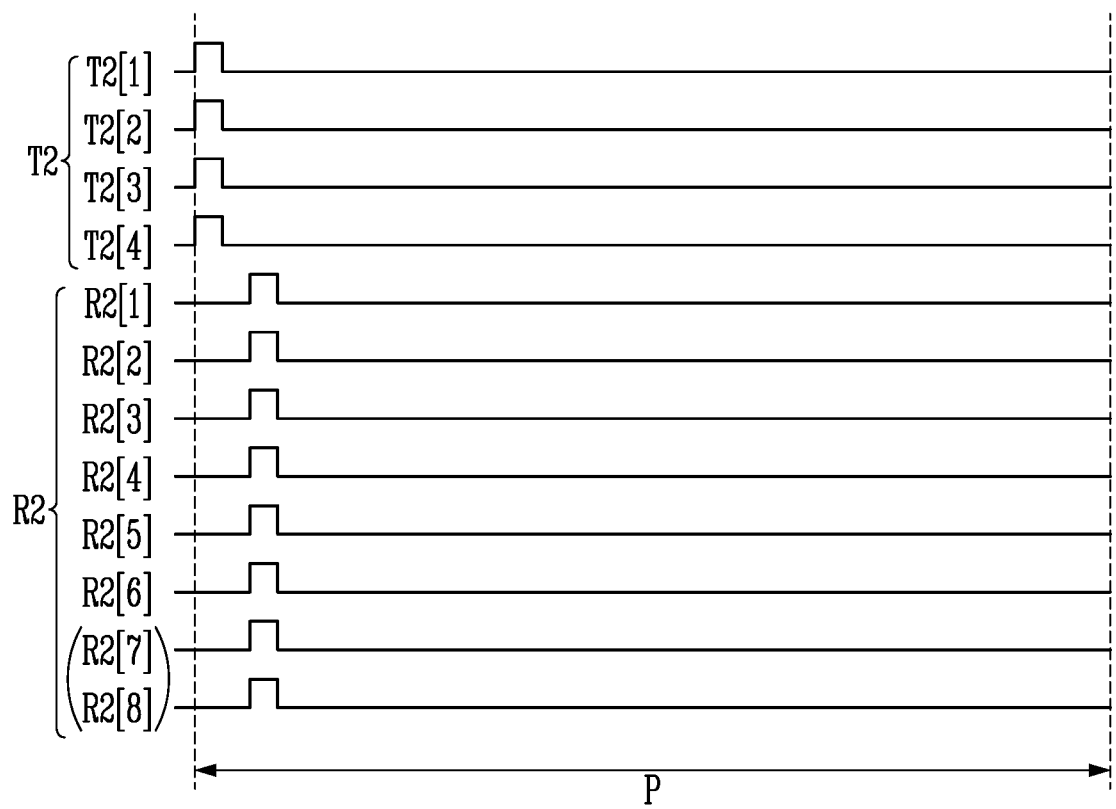

Referring to FIGS. 8A, 8B, and 8E, after simultaneously supplying the driving signal to the second Tx electrodes T2 during each unit period P of the period in which the second mode is executed, the driving signal may be simultaneously supplied to the second Rx electrodes R2. In addition, whether the touch input to the second sensing area SA2 is generated and the position of the touch input may be monitored based on the sensing signal output from each of the second Tx electrodes T2 and the second Rx electrodes R2.

Figure 8F:
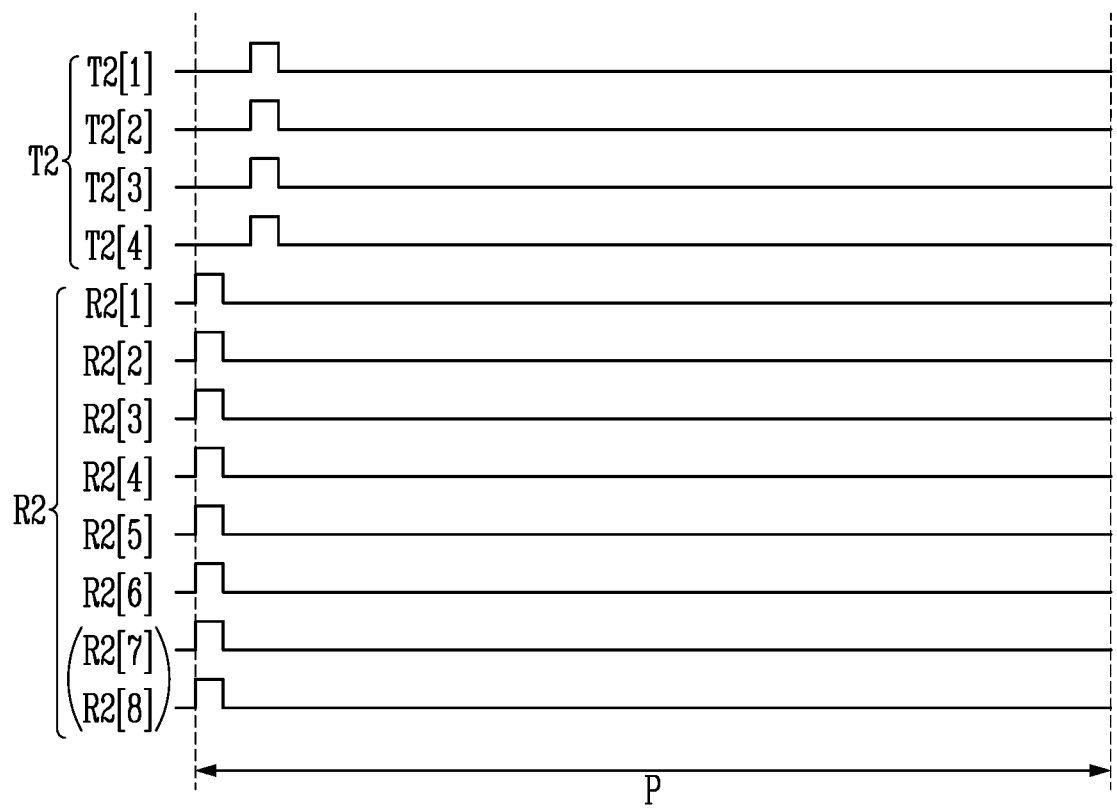

Referring to FIGS. 8A, 8B, and 8F, after simultaneously supplying the driving signal to the second Rx electrodes R2 during each unit period P of the period in which the second mode is executed, the driving signal may be simultaneously supplied to the second Tx electrodes T2. In addition, whether the touch input to the second sensing area SA2 is generated and the position of the touch input may be monitored based on the sensing signal output from each of the second Tx electrodes T2 and the second Rx electrodes R2.

Referring to FIGS. 8A, 8B, and 8G, after sequentially supplying the driving signal the second Tx electrodes T2 during each unit period P of the period in which the second mode is executed, the driving signal may be sequentially supplied to the second Rx electrodes R2. In addition, whether the touch input to the second sensing area SA2 is generated and the position of the touch input may be monitored based on the sensing signal output from each of the second Tx electrodes T2 and the second Rx electrodes R2.

Figure 8H:
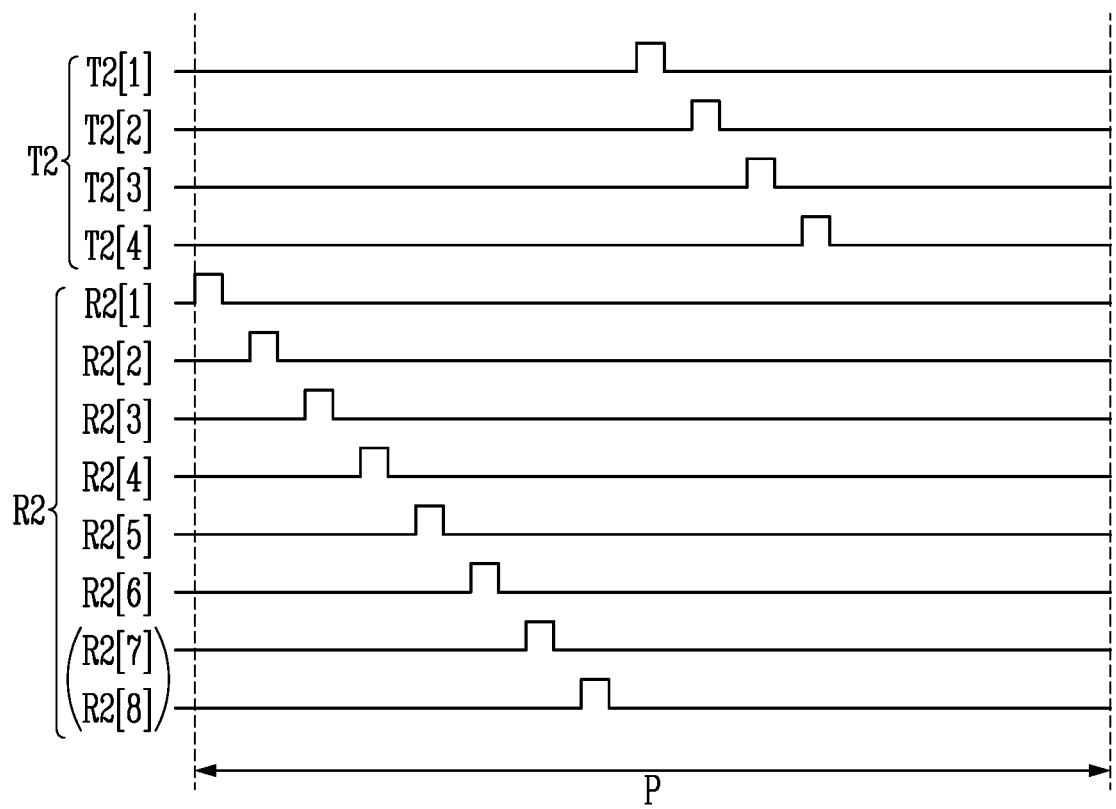

Referring to FIGS. 8A, 8B, and 8H, after sequentially supplying the driving signal to the second Rx electrodes R2 during each unit period P of the period in which the second mode is executed, the driving signal may be sequentially supplied to the second Tx electrodes T2. In addition, whether the touch input to the second sensing area SA2 is generated and the position of the touch input may be monitored based on the sensing signal output from each of the second Tx electrodes T2 and the second Rx electrodes R2.

Referring to FIGS. 8A, 8B, and 8D to 8H, in the second mode, when the second sensor electrodes SE2 are driven by the self-capacitive sensing method in a state in which the first sensor electrodes SE1 are deactivated, wheel mode power consumption may be effectively reduced compared to a case where all first and second sensor electrodes SE1 and SE2 are driven in the mutual capacitive sensing method or the self-capacitive sensing method. In addition, since there is substantially no sensor area loss in the edge portion, the power consumption of the touch sensor TS may be more effectively reduced by lowering the sampling rate.

For example, according to the exemplary embodiment of FIGS. 8A and 8D to 8H, the charge/discharge power consumption ratio of the touch sensor TS in the second mode may be reduced by about 15% of that of the exemplary embodiment of FIG. 3. In addition, according to the exemplary embodiment of FIGS. 8B and 8D to 8H, the charge/discharge power consumption ratio of the touch sensor TS in the second mode may be reduced by about 18% of that of the exemplary embodiment of FIG. 3. However, the power consumption reduction effect may vary according to the charge/discharge power consumption of the second sensor electrodes SE2 to the charge/discharge power consumption of the entire sensor electrodes.

FIGS. 5A to 8H disclose exemplary embodiments in which the sensing area SA is partially driven by selectively activating the first sensing area SA1 or the second sensing areas SA1 and SA2 in correspondence with the first mode or the second mode. However, the operation of the touch sensor TS is not limited to the partial driving mode. For example, the touch sensor TS may also be driven in the third mode (for example, a full-driving mode or the normal mode) in which the entire sensing area SA is activated. In this case, the touch input may be detected in the entire sensing area SA by simultaneously or sequentially driving the first and second sensor electrodes SE1 and SE2.

According to an exemplary embodiment, in the third mode, the driving signal may be supplied to each of the first and second Tx electrodes T1 and T2, and whether the touch input to the entire sensing area SA is generated and the position of the touch input may be detected in the mutual capacitive sensing method based on the sensing signal output from the first and second Rx electrodes R1 and R2. Here, the first Tx electrodes T1 and the second Tx electrodes T2 may be simultaneously or sequentially driven for each group. In addition, the first Tx electrodes T1 and the second Tx electrodes T2 may be sequentially driven within each group. For example, in an exemplary embodiment, the driving signal may be sequentially supplied to the second Tx electrodes T2 while sequentially supplying the driving signal to the first Tx electrodes T1. In another exemplary embodiment, after sequentially supplying the driving signal to the first Tx electrodes T1, the driving signal may be sequentially supplied to the second Tx electrodes T2. Alternatively, after sequentially supplying the driving signal to the second Tx electrodes T2, the driving signal may be sequentially supplied to the first Tx electrodes T1.

However, the driving method of the touch sensor TS in the third mode is not limited to the mutual capacitive sensing method. For example, in another exemplary embodiment, in the third mode, the touch input to the entire sensing area SA may be detected by driving the first and second sensor electrodes SE1 and SE2 in the self-capacitive sensing method. In this case, the first and second Tx electrodes T1 and T2 and the first and second Rx electrodes R1 and R2 may be simultaneously or sequentially driven for each group, and/or may be simultaneously or sequentially driven within each group. In addition, the touch input may be detected based on the sensing signal output from each of the first and second Tx electrodes T1 and T2 and the first and second Rx electrodes R1 and R2.

In the above-described exemplary embodiments, the numbers assigned to each of the Tx electrodes and the Rx electrodes, or a driving sequence according thereto are for convenience of description, and exemplary embodiments are not limited thereto. For example, the driving sequence and/or an arrangement sequence of the Tx electrodes and Rx electrodes may be variously changed according to the exemplary embodiments.

Figure 9A:
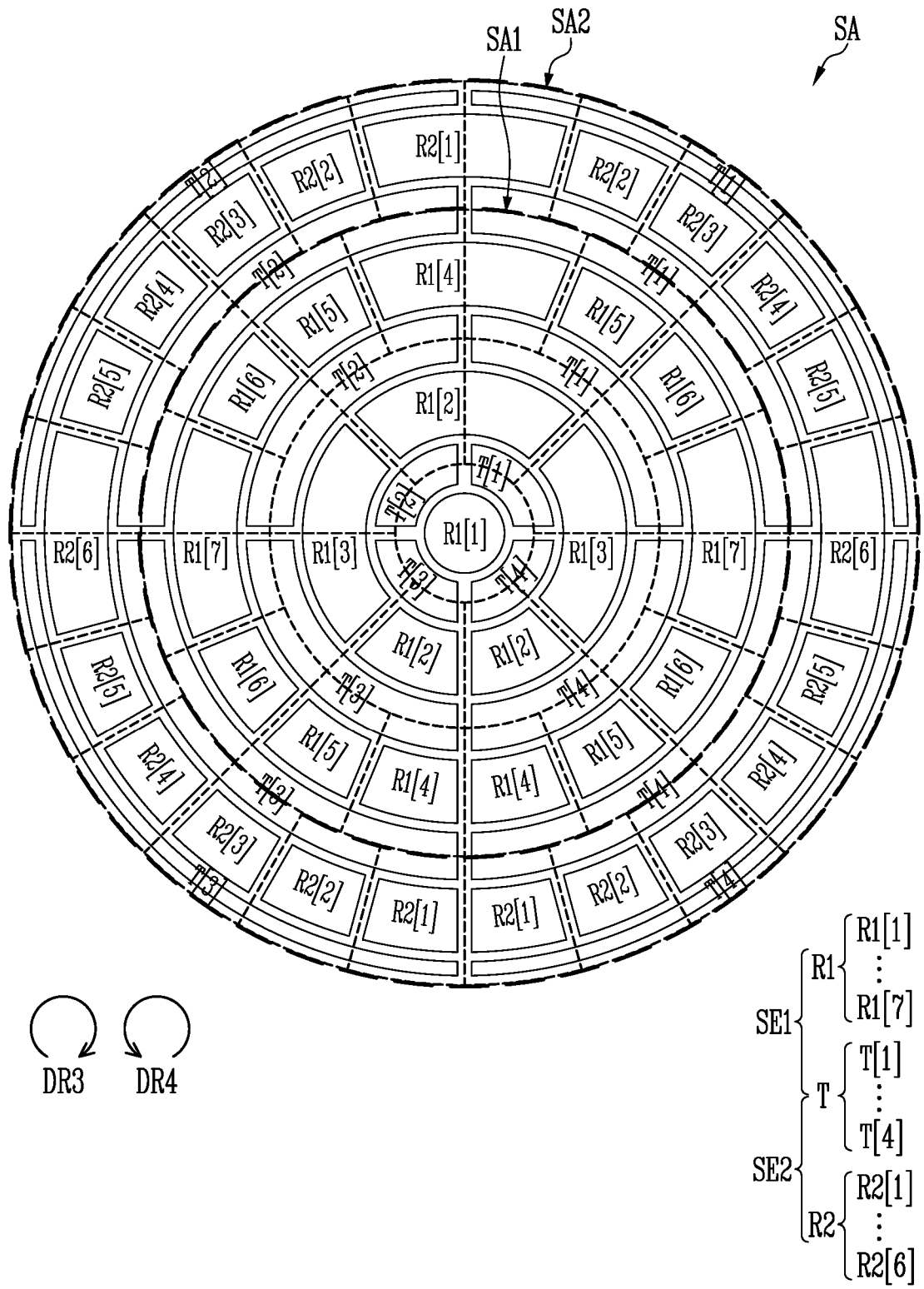
FIGS. 9A and 9B are plan views of the other exemplary embodiments of the first and second sensor electrodes of the touch sensor of the panel unit of FIG. 1B in the sensing area.
Figure 9B:
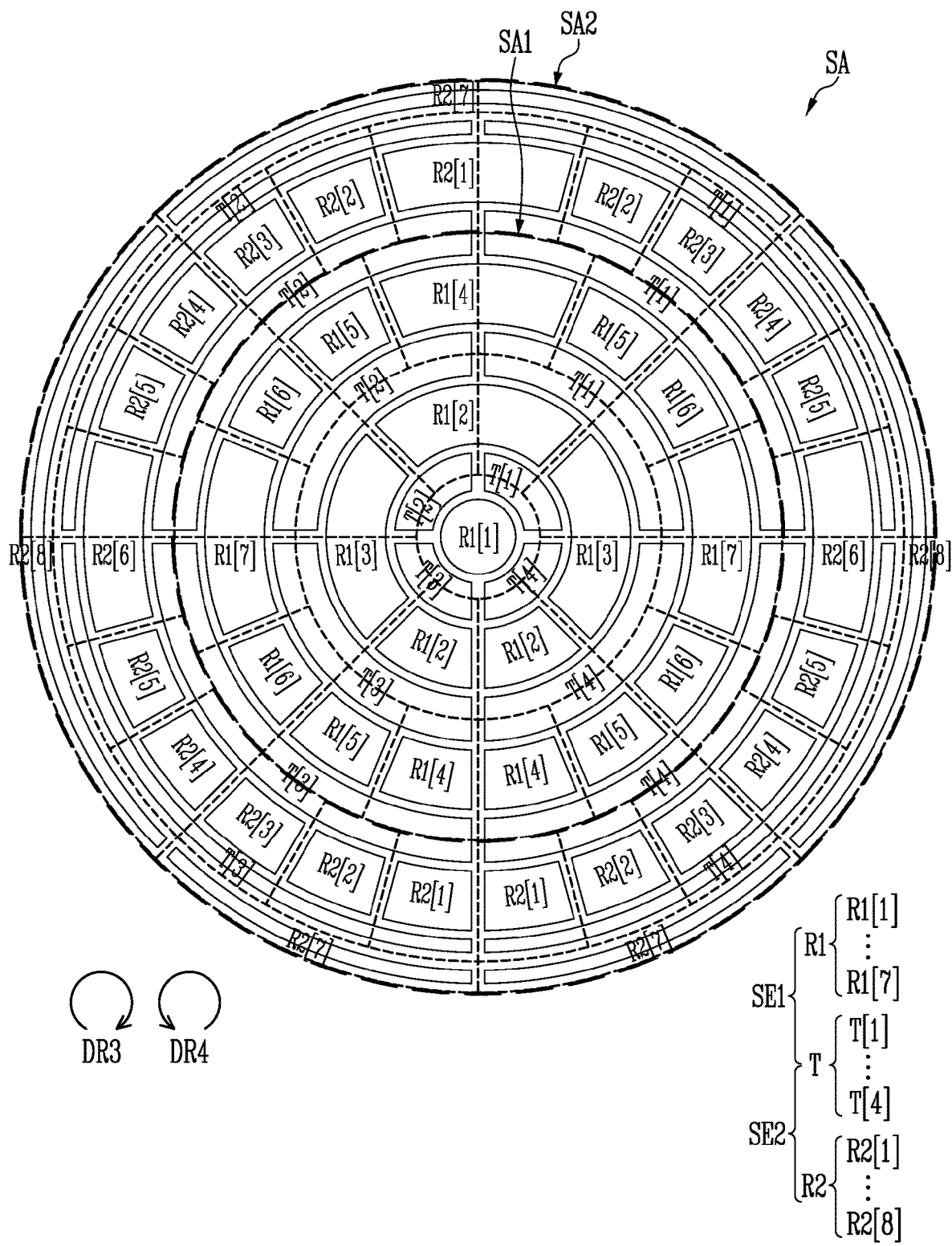

FIGS. 9A and 9B are plan views of the other exemplary embodiments of the first and second sensor electrodes of the touch sensor of the panel unit of FIG. 1B in the sensing area. FIGS. 9A and 9B respectively illustrate the touch sensor TS according to an exemplary embodiment, and particularly illustrate different exemplary embodiments of the structure of the sensor pattern disposed in the sensing area SA. In the exemplary embodiment of FIGS. 9A and 9B, detailed description of a configuration similar or identical to that of the above-described exemplary embodiment (for example, the exemplary embodiment of FIGS. 4A and 4B) will be omitted for descriptive convenience.

Referring to FIGS. 9A and 9B, the Tx electrodes T are not separated for each of the first sensing area SA1 and the second sensing area SA2, and may be designed as an integrated type. For example, in the sensing area SA including the first and second sensing areas SA1 and SA2, Tx electrode patterns positioned in the same quadrant may be integrally or non-integrally connected to each other to form a single Tx electrode T.

Specifically, Tx electrode patterns positioned in the first quadrant of the first and second sensing areas SA1 and SA2 may be connected to each other to form a Tx electrode T[1] of a first channel, and Tx electrode patterns positioned in the second quadrant of the first and second sensing areas SA1 and SA2 may be connected to each other to form a Tx electrode T[2] of a second channel. Similarly, Tx electrode patterns positioned in the third quadrant of the first and second sensing areas SA1 and SA2 may be connected to each other to form a Tx electrode T[3] of a third channel, and Tx electrode patterns positioned in the fourth quadrant of the first and second sensing areas SA1 and SA2 may be connected to each other to form a Tx electrode T[4] of a fourth channel.

The Tx electrodes T may form the first sensor electrodes SE1 together with the first Rx electrodes R1 and may form the second sensor electrodes SE2 together with the second Rx electrodes R2.

Figure 10A:
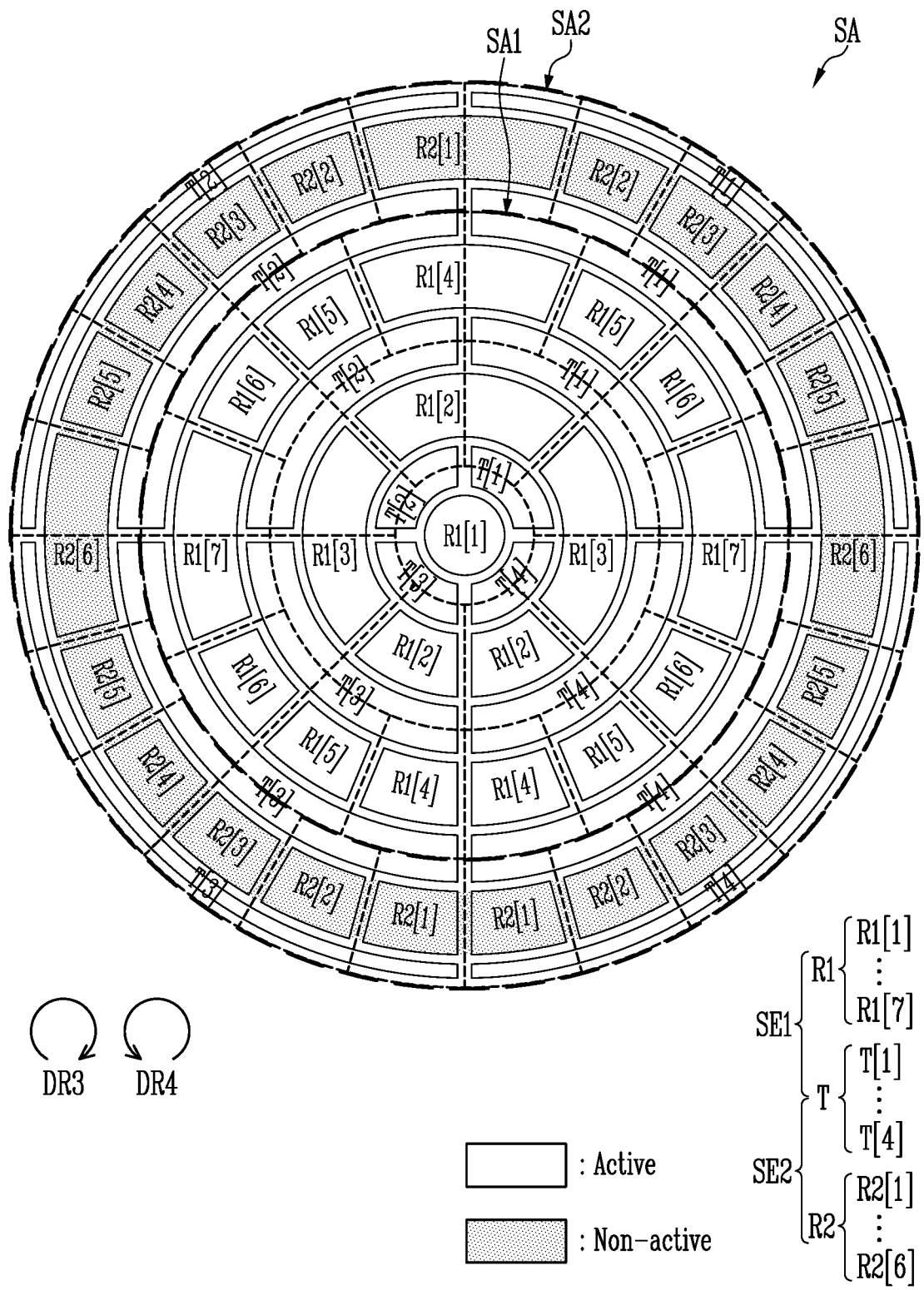
FIGS. 10A and 10B are plan views of the first and second sensor electrodes of the touch sensor of FIGS. 9A and 9B illustrating exemplary embodiments of a method of activating and deactivating the sensing area when the sensing area is driven in the first mode.
Figure 10B:
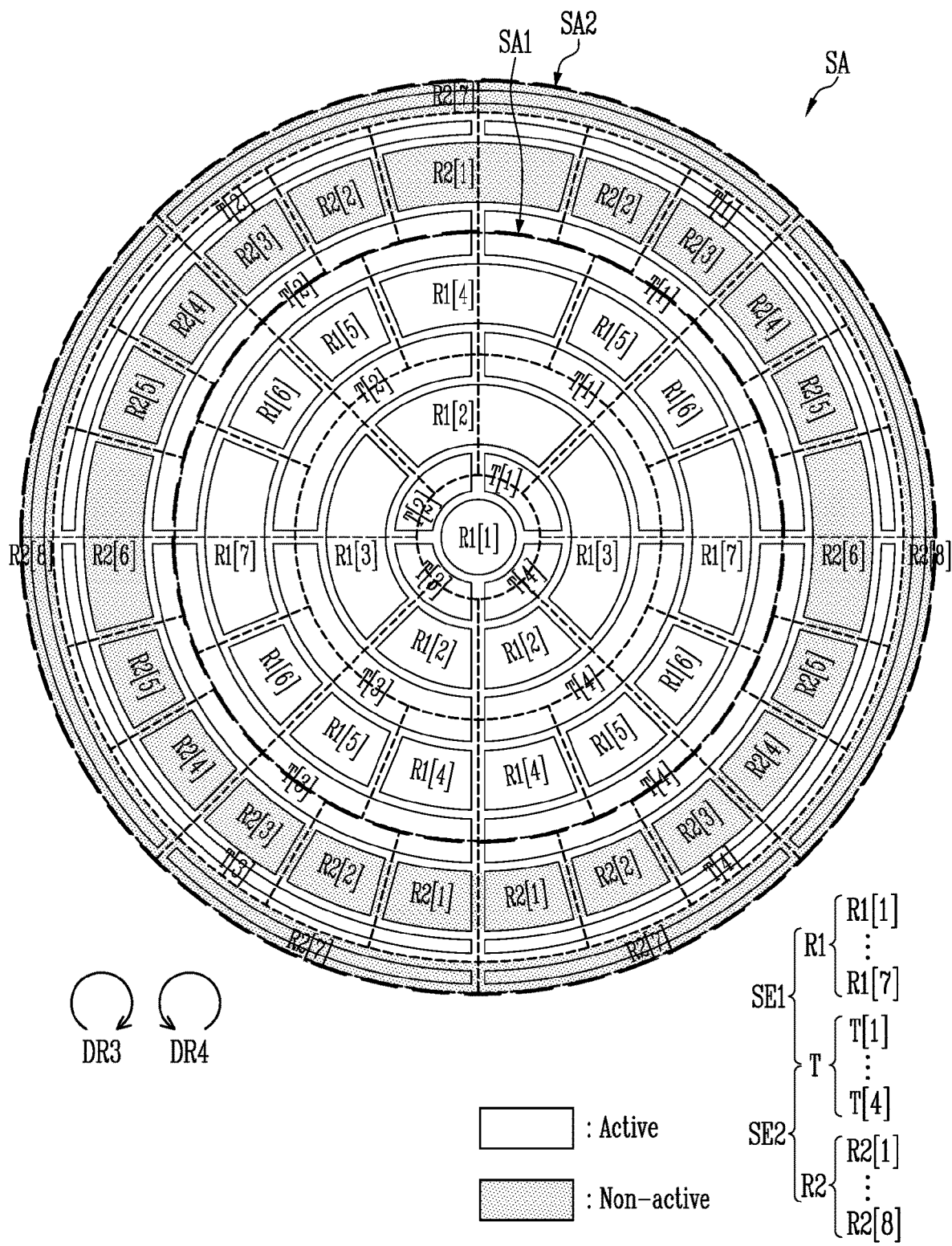

FIGS. 10A and 10B are plan views of the first and second sensor electrodes of the touch sensor of FIGS. 9A and 9B illustrating exemplary embodiments of a method of activating and deactivating the sensing area when the sensing area is driven in the first mode. FIGS. 10A and 10B respectively illustrate an example of the sensor electrodes activated when the sensing area SA according to the exemplary embodiment of FIGS. 9A and 9B is driven in the first mode.

Referring to FIGS. 10A and 10B, in the first mode, the first sensor electrodes SE1 disposed in the first sensing area SA1 are activated. For example, in the first mode, at least some of the first sensor electrodes SE1 may be driven to detect the touch input generated in the first sensing area SA1.

In an exemplary embodiment, during the period in which the touch sensor TS is driven in the first mode, all first sensor electrodes SE1, e.g., all Tx electrodes T and first Rx electrodes R1 may be activated to detect touch input generated in the first sensing area SA1.

FIGS. 10C to 10H are timing diagrams illustrating exemplary embodiments of a method of driving the first and second sensor electrodes of the touch sensor of FIGS. 10A and 10B. FIGS. 10C to 10H illustrate various exemplary embodiments of a method of driving the first sensor electrodes SE1 activated in the exemplary embodiment of FIGS. 10A and 10B. For example, FIGS. 10C to 10H illustrate an exemplary embodiment of the driving signal supplied to the sensing area SA in each exemplary embodiment.

Referring to FIGS. 10A to 10H, during the period in which the touch sensor TS is driven in the first mode, the touch input to the first sensing area SA1 may be detected in the mutual capacitive sensing method or the self-capacitive sensing method using the Tx electrodes T and the first Rx electrodes R1. For example, when the touch input is detected using all first Tx electrodes T and first Rx electrodes R, whether the touch input is generated and the position of the touch input may be detected. Each exemplary embodiment will be described in detail as follows.

Figure 10C:
FIGS. 10C to 10H are timing diagrams illustrating exemplary embodiments of a method of driving the first and second sensor electrodes of the touch sensor of FIGS. 10A and 10B.

Referring to FIGS. 10A to 10C, during the period in which the touch sensor TS is driven in the first mode, the touch input to the first sensing area SA1 may be detected in the mutual capacitive sensing method using the Tx electrodes T and the first Rx electrodes R1. For example, when the touch sensor TS is driven in the first mode according to a predetermined frequency, during each unit period P of the period in which the first mode is executed, the driving signal may be sequentially supplied to the Tx electrodes T, and whether the touch input to the first sensing area SA1 is generated may be monitored based on the sensing signal output from the first Rx electrodes R1 by the driving signal. According to an exemplary embodiment, one or more sampling pulses may be supplied to each Tx electrode T1 during each unit period P, and the number of sampling pulses may be variously set in consideration of the SNR or the like of the touch sensor TS.

In an exemplary embodiment, a waveform of the driving signal shown in FIG. 10C may be the same as or different from a waveform (in FIG. 12C) of the drive signal supplied to the Tx electrodes T1 in order to detect the touch input to the second sensing area SA2 in the mutual capacitive sensing method using the Tx electrodes T during the period in which the touch sensor TS is driven in the second mode. For example, referring to FIGS. 10C and 12C, the sampling pulse supplied to the Tx electrodes T when driving the first sensing area SA1 in the mutual capacitive sensing method using the Tx electrodes T and the first Rx electrodes R1 in the first mode may be the same as the sampling pulse supplied to the Tx electrodes T when driving the second sensing area SA2 in the mutual capacitive sensing method using the Tx electrodes T and the second Rx electrodes R2 in the second mode. Referring to FIGS. 10C and 12C, a label is added to indicate a waveform of the driving signal supplied in each of the first mode and the second mode. However, exemplary embodiments are not limited thereto. For example, in another exemplary embodiment, the number of sampling pulses supplied to the Tx electrodes T when driving the first sensing area SA1 in the mutual capacitive sensing method using the Tx electrodes T and the first Rx electrodes R1 in the first mode may be different from the number of sampling pulses supplied to the Tx electrodes T when driving the second sensing area SA2 in the mutual capacitive sensing method using the Tx electrodes T and the second Rx electrodes R2 in the second mode.

Referring to FIGS. 10A, 10B, and 10D to 10H, during the period in which the touch sensor TS is driven in the first mode, the touch input to the first sensing area SA1 may be detected in the self-capacitive sensing method using the Tx electrodes T and the first Rx electrodes R1. This will be described in detail as follows.

Figure 10D:
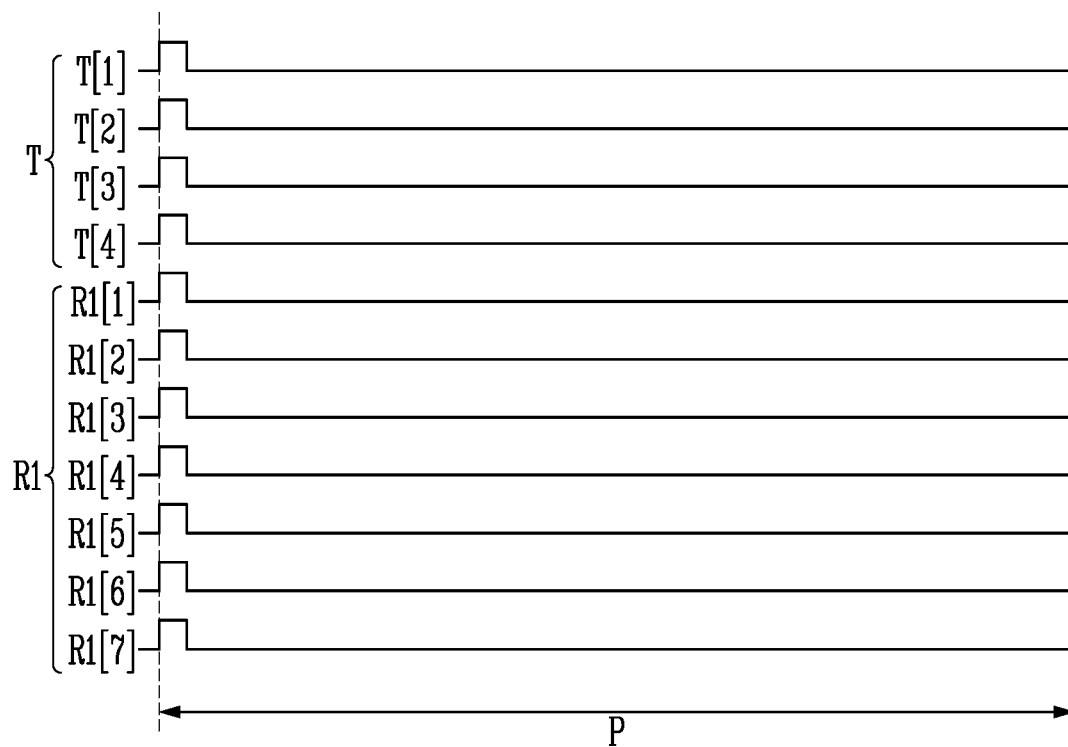

Referring to FIGS. 10A, 10B, and 10D, the driving signal may be simultaneously supplied to the Tx electrodes T and the first Rx electrodes R1 during each unit period P of the period in which the first mode is executed. In addition, whether the touch input to the first sensing area SA1 is generated may be monitored based on the sensing signal output from each of the Tx electrodes T and the first Rx electrodes R1.

Figure 10E:
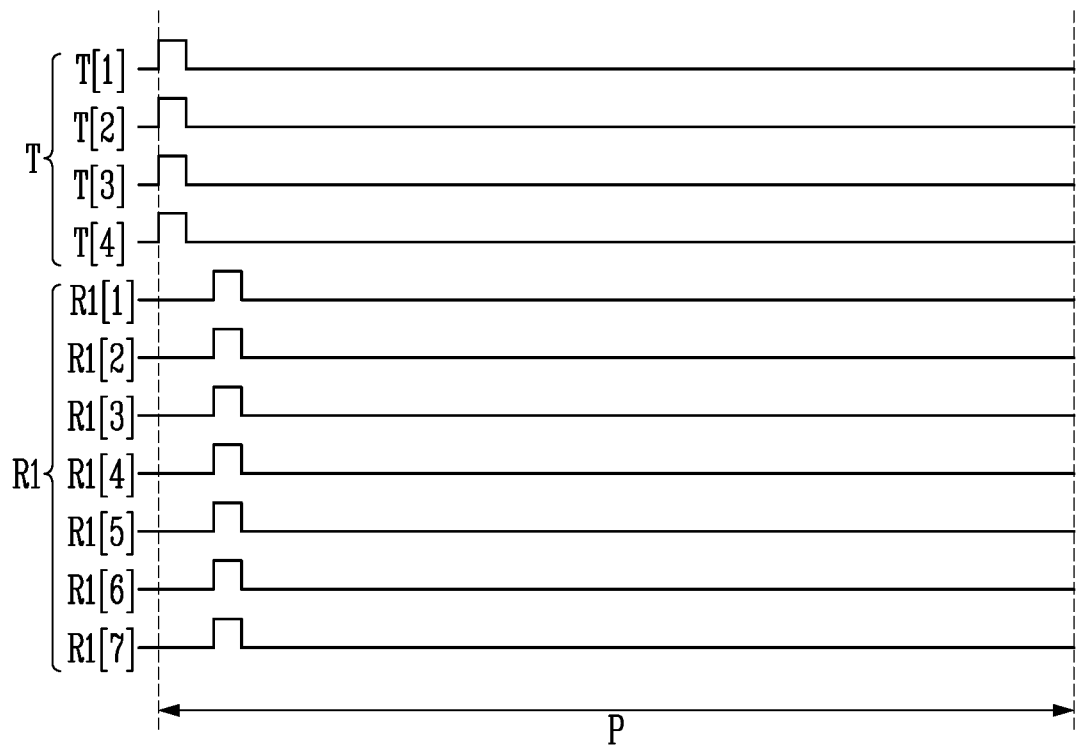

Referring to FIGS. 10A, 10B, and 10E, after simultaneously supplying the driving signal to the Tx electrodes T during each unit period P of the period in which the first mode is executed, the driving signal may be simultaneously supplied to the first Rx electrodes R1. In addition, whether the touch input to the first sensing area SA1 is generated may be monitored based on the sensing signal output from each of the Tx electrodes T and the first Rx electrodes R1.

Figure 10F:
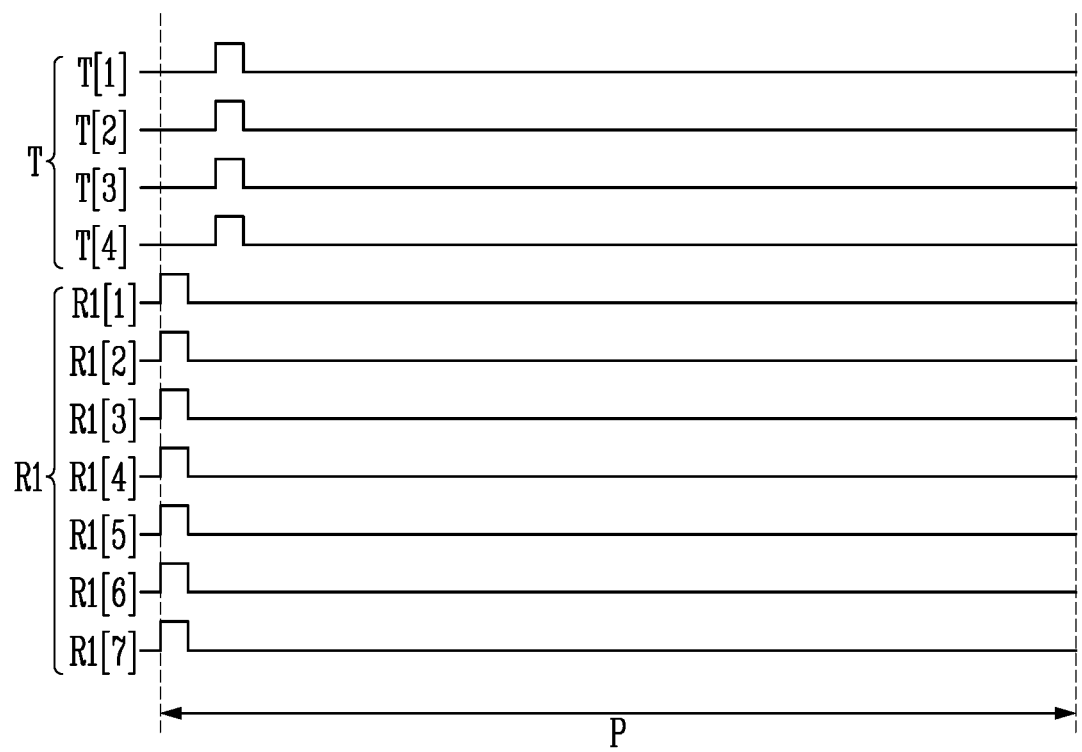

Referring to FIGS. 10A, 10B, and 10F, after simultaneously supplying the driving signal to the first Rx electrodes R1 during each unit period P of the period in which the first mode is executed, the driving signal may be simultaneously supplied to the Tx electrodes T. In addition, whether the touch input to the first sensing area SA1 is generated may be monitored based on the sensing signal output from each of the Tx electrodes T and the first Rx electrodes R1.

Figure 10G:
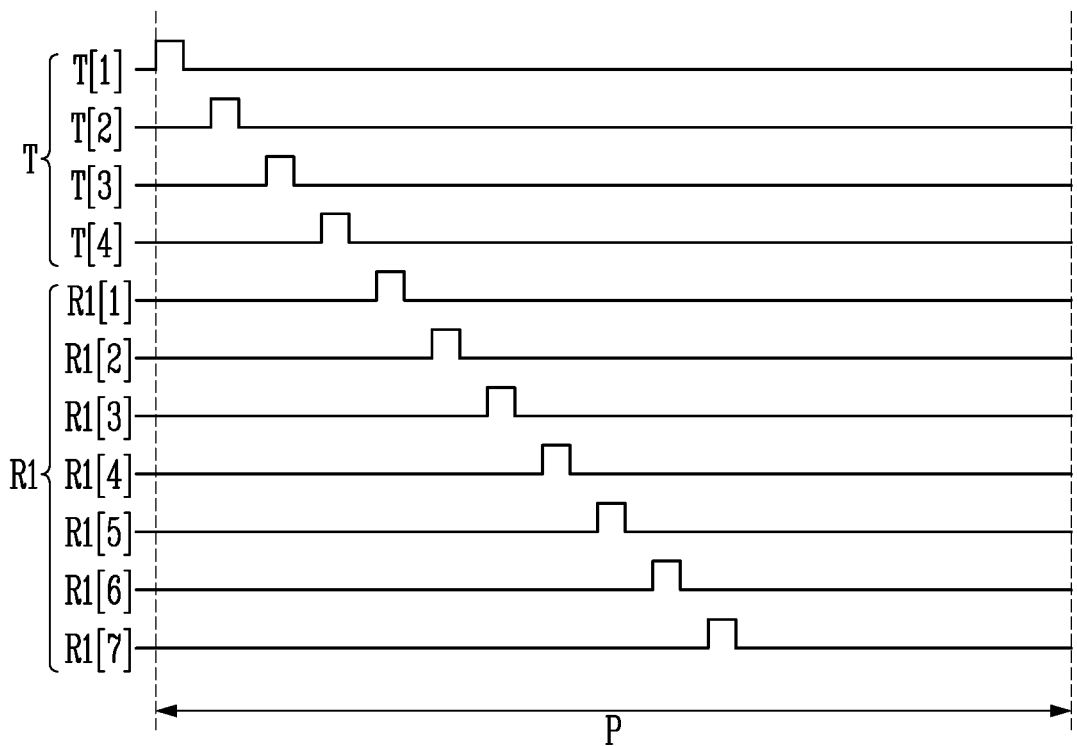

Referring to FIGS. 10A, 10B, and 10G, after sequentially supplying the driving signal to the Tx electrodes T during each unit period P of the period in which the first mode is executed, the driving signal may be sequentially supplied to the first Rx electrodes R1. In addition, whether the touch input to the first sensing area SA1 is generated may be monitored based on the sensing signal output from each of the Tx electrodes T and the first Rx electrodes R1.

Figure 10H:
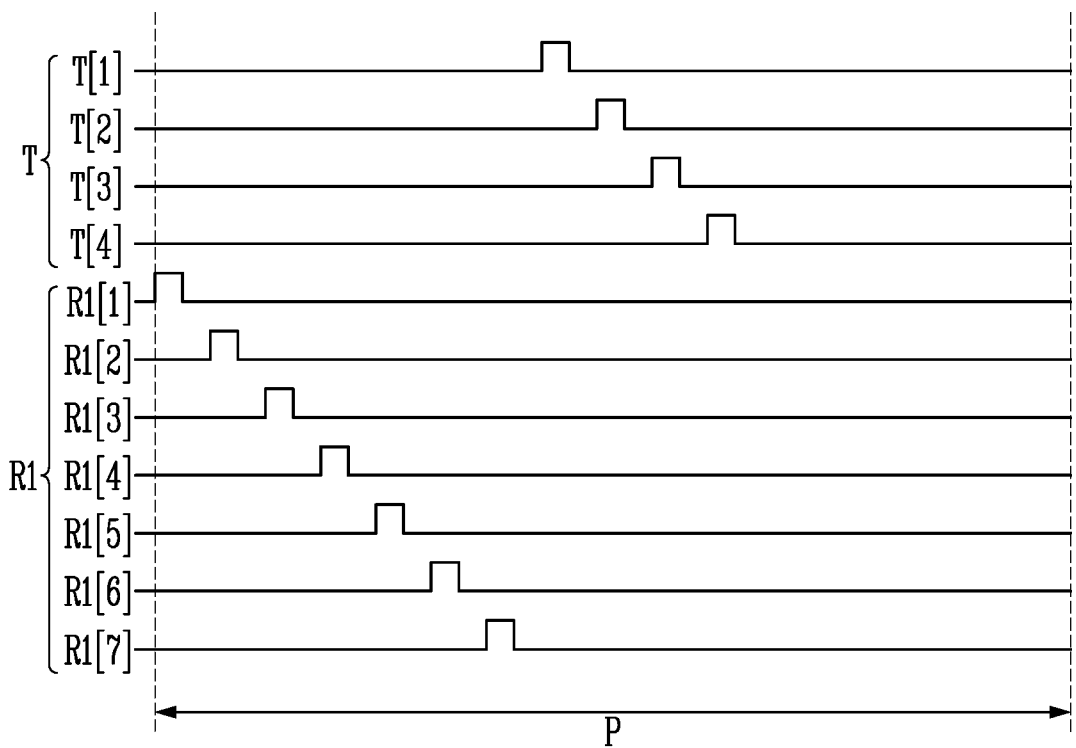

Referring to FIGS. 10A, 10B, and 10H, after sequentially supplying the driving signal to the first Rx electrodes R1 during each unit period P of the period in which the first mode is executed, the driving signal may be sequentially supplied to the Tx electrodes T. In addition, whether the touch input to the first sensing area SA1 is generated may be monitored based on the sensing signal output from each of the Tx electrodes T2 and the first Rx electrodes R1.

Referring to FIGS. 10A, 10B, and 10D to 10H, when the Tx electrodes T and the first Rx electrodes R1 are driven in the self-capacitive sensing method in a state in which the second Rx electrodes R2 are deactivated in the first mode, the standby mode power consumption of the touch sensor TS may be reduced compared to a case where all sensor electrodes SE1 and SE2 (e.g., the Tx electrodes T, and the first and second Rx electrodes R1 and R2) are driven in the self-capacitive sensing method. For example, compared to the exemplary embodiment of FIG. 3, in the exemplary embodiment of FIGS. 10A, 10B, and 10D to 10H, a charge/discharge power consumption ratio of the touch sensor TS in the first mode may be reduced.

Figure 11A:
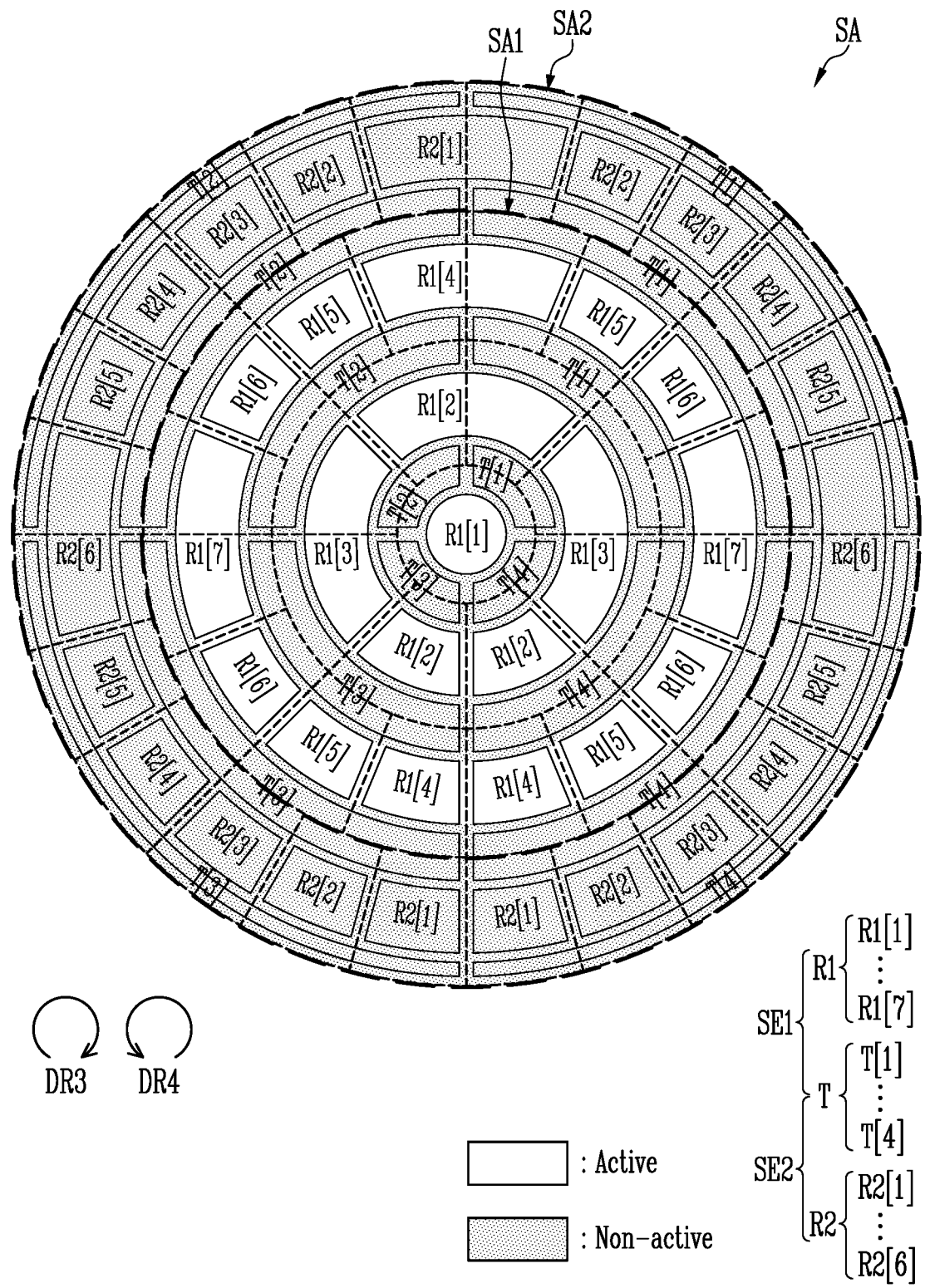
FIGS. 11A and 11B are plan views of the first and second sensor electrodes of the touch sensor of FIGS. 9A and 9B illustrating the other exemplary embodiments of a method of activating and deactivating the sensing area when the sensing area is driven in the first mode.
Figure 11B:
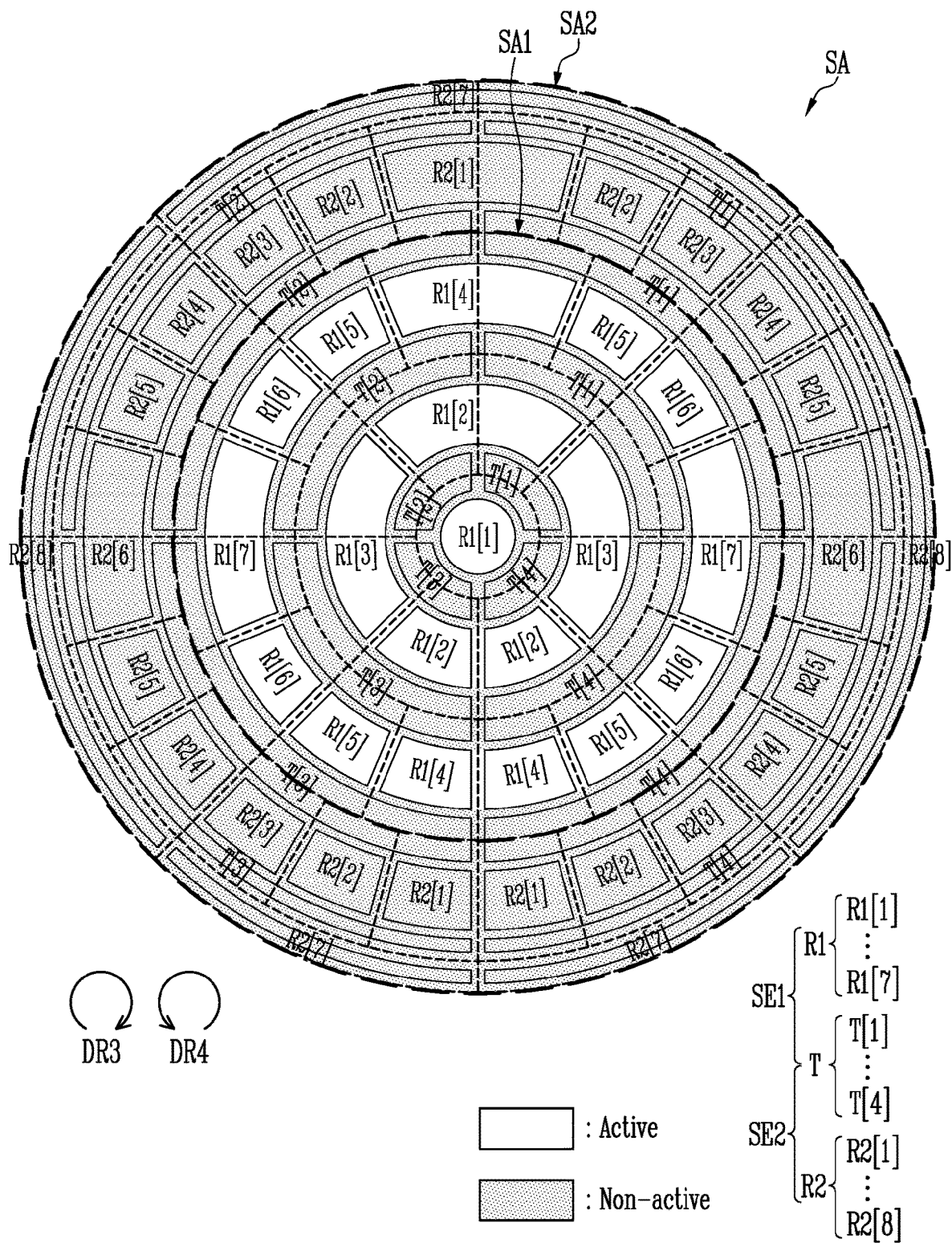

FIGS. 11A and 11B are plan views of the first and second sensor electrodes of the touch sensor of FIGS. 9A and 9B illustrating the other exemplary embodiments of a method of activating and deactivating the sensing area when the sensing area is driven in the first mode. FIGS. 11A and 11B respectively illustrate another example of the sensor electrodes activated when the sensing area SA according to the exemplary embodiment of FIGS. 9A and 9B is driven in the first mode.

Referring to FIGS. 11A and 11B, in the first mode, whether the touch input to the first sensing area SA1 is generated may be detected in the self-capacitive sensing method using some of the first sensor electrodes SE1, in particular, the first Rx electrodes R1.

In the above-described exemplary embodiment, the Tx electrodes T2 and the second Rx electrodes R2 may be deactivated. Accordingly, during the period in which the first mode is executed, the first sensing area SA1 may be activated by the first Rx electrodes R1, and the second sensing area SA2 may maintain a deactivated state.

When only the first Rx electrodes R1 are driven, since whether the touch input to the first sensing area SA1 is generated may be detected, a touch detection operation required in the standby mode may be sufficiently performed. In addition, when the touch sensor TS is driven in the first mode, only the first sensing area SA1 of the sensing area SA may be selectively driven, and thus the power consumed in charging/discharging the sensor electrodes may be effectively reduced. Accordingly, the power consumption of the touch sensor TS may be reduced.

In an exemplary embodiment, the activated first Rx electrodes R1 may be driven in the same method as the exemplary embodiment of FIGS. 7C and 7D.

For example, referring to FIGS. 7C and 7D, during each unit period P of the period in which the first mode is executed, the driving signals may be sequentially or simultaneously supplied to the first Rx electrodes R1. In addition, whether the touch input to the first sensing area SA1 is generated may be monitored based on the sensing signal output from each of the first Rx electrodes R1. Accordingly, the power consumption of the touch sensor TS may be reduced compared to the exemplary embodiment of FIG. 3. For example, compared to the touch sensor TS according to the exemplary embodiment of FIG. 3, in the exemplary embodiment of FIGS. 11A and 11B, the charge/discharge power consumption in the first mode may be reduced by about 68% of that of the exemplary embodiment of FIG. 3.

Figure 12A:
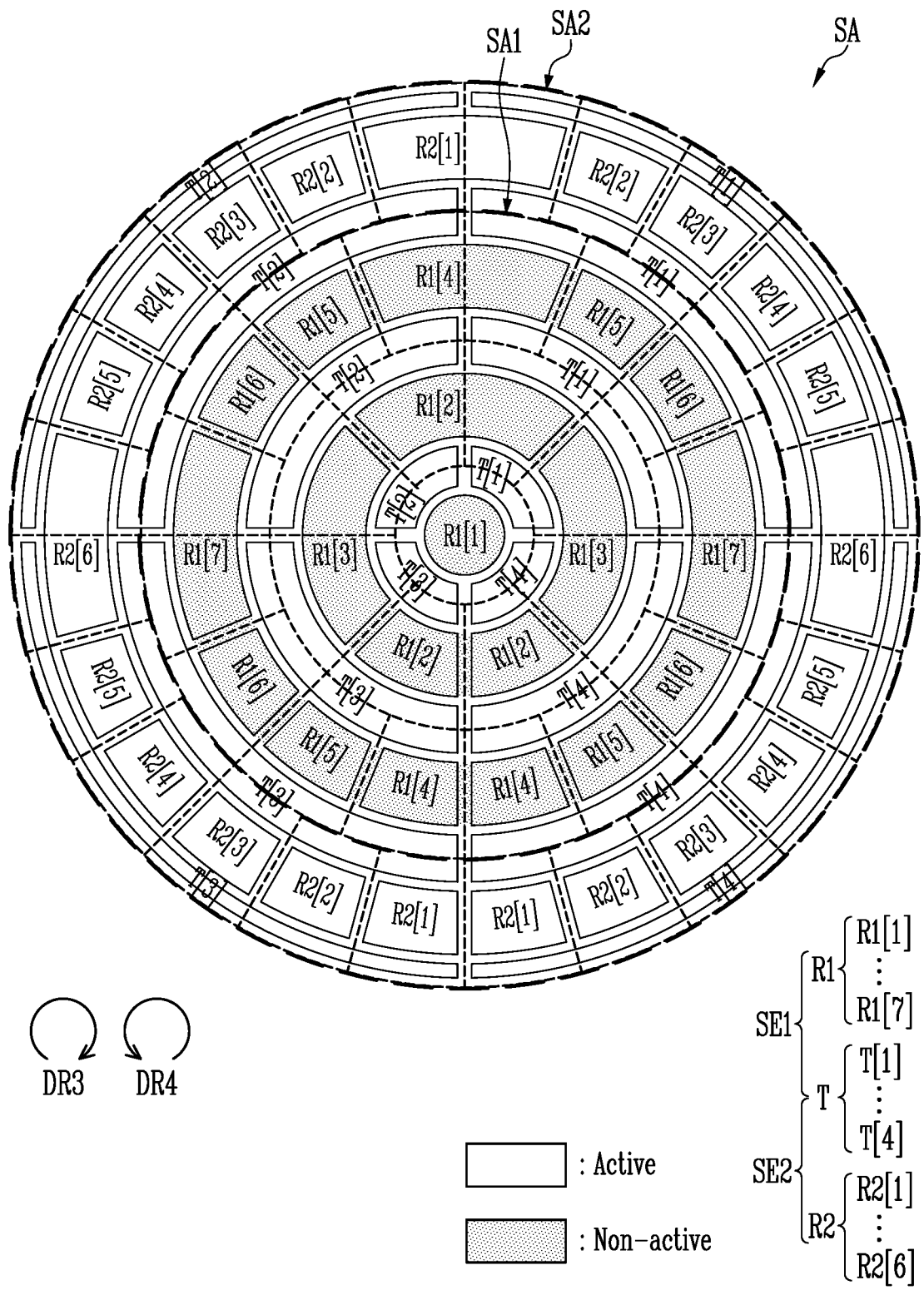
FIGS. 12A and 12B are plan views of the first and second sensor electrodes of the touch sensor of FIGS. 9A and 9B illustrating exemplary embodiments of a method of activating and deactivating the sensing area when the sensing area is driven in a second mode.
Figure 12B:
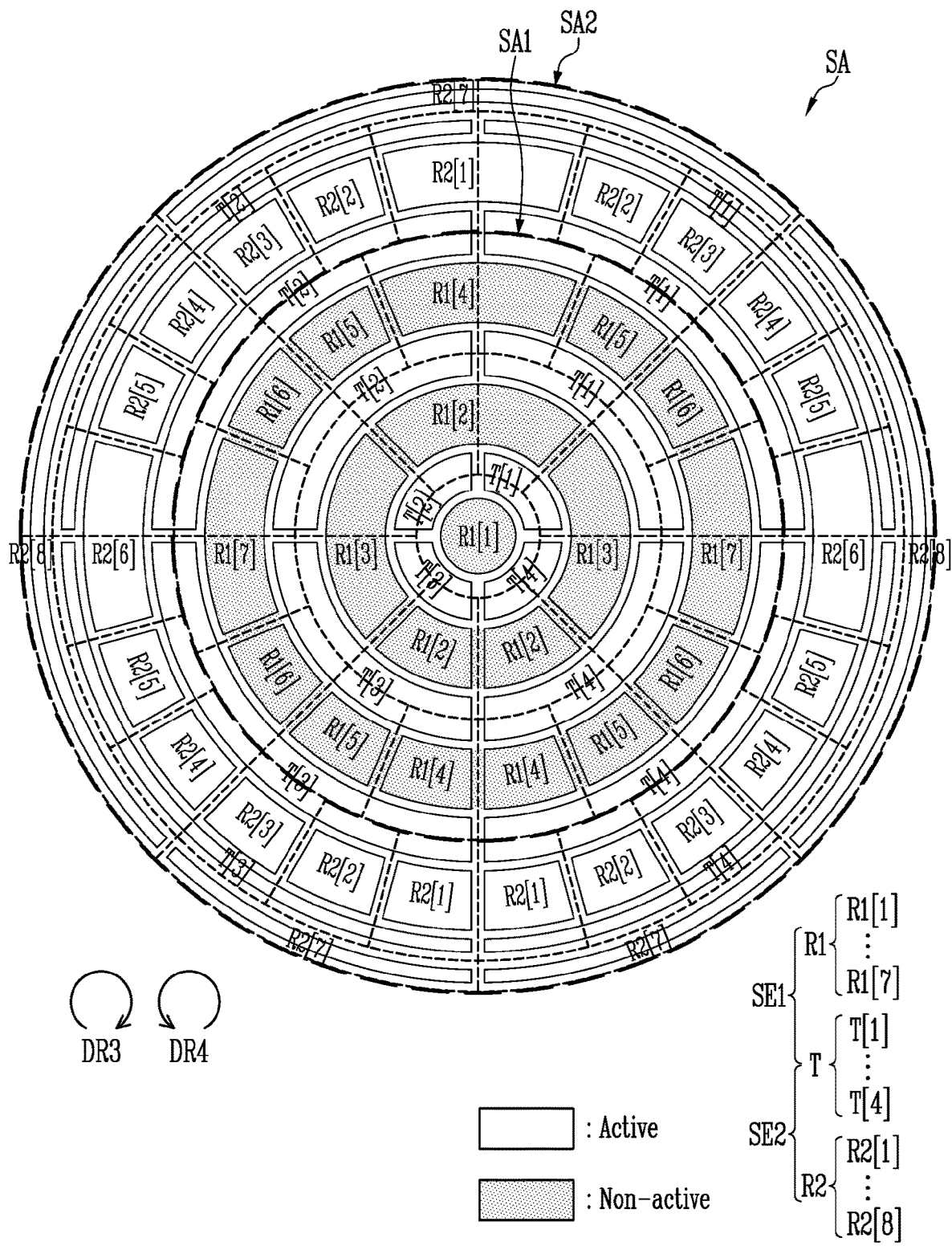

FIGS. 12A and 12B are plan views of the first and second sensor electrodes of the touch sensor of FIGS. 9A and 9B illustrating exemplary embodiments of a method of activating and deactivating the sensing area when the sensing area is driven in a second mode. FIGS. 12A and 12B respectively illustrate an example of the sensor electrodes activated when the sensing area SA according to the exemplary embodiment of FIGS. 9A and 9B is driven in the second mode. In the exemplary embodiment of FIGS. 12A and 12B, detailed description of a configuration similar or identical to that of the above-described exemplary embodiment (for example, the exemplary embodiment of FIGS. 8A and 8B) will be omitted for descriptive convenience.

Referring to FIGS. 12A and 12B, in the second mode, the second sensor electrodes SE2 disposed in the second sensing area SA2 are activated. For example, in the second mode, the second sensor electrodes SE2 may be driven to detect the touch input generated in the second sensing area SA2. To this end, in the second mode, all Tx electrodes T and the second Rx electrodes R2 may be activated. For example, during the period in which the touch sensor TS is driven in the second mode, the first Rx electrodes R1 may be deactivated.

According to an exemplary embodiment, the second mode may be the wheel mode, and may be a partial driving mode for executing a predetermine operation selected in the wheel mode by determining presence or absence of the touch input generated with respect to the second sensing area SA2 and a position thereof. To this end, in the second mode, the presence and absence of the touch input to the second sensing area SA2 and the position thereof may be monitored while repeatedly charging/discharging the second sensor electrodes SE2.

When the sensor electrodes are formed as the exemplary embodiment of FIGS. A and 9B, the sensor area loss in the edge portion may be prevented or minimized. Accordingly, sufficient touch sensing sensitivity required for a wheel operation may be obtained even with a lower sampling rate in the second mode. For example, in executing the wheel operation by driving the sensing area SA of FIGS. 9A and 9B in the second mode as shown in FIGS. 12A and 12B, the touch sensing sensitivity required for the wheel operation may be obtained even though the sampling rate is about ¼ of that of the exemplary embodiment of FIG. 3. Accordingly, the power consumption of the touch sensor TS may be reduced.

FIGS. 12C to 12H are timing diagrams illustrating exemplary embodiments of a method of driving the first and second sensor electrodes of the touch sensor of FIGS. 12A and 12B. FIGS. 12C to 12H illustrate various exemplary embodiments of a method of driving the second sensor electrodes SE2 activated in the exemplary embodiment of FIGS. 12A and 12B. For example, FIGS. 12C to 12H illustrate an exemplary embodiment of the driving signal supplied to the sensing area SA in each exemplary embodiment. In the exemplary embodiment of FIGS. 12C to 12H, detailed description of a configuration similar or identical to that of the above-described exemplary embodiment (for example, the exemplary embodiment of FIGS. 8C to 8H) will be omitted for descriptive convenience.

Referring to FIGS. 12A to 12H, during the period in which the touch sensor TS is driven in the second mode, the touch input to the second sensing area SA2 may be detected in the mutual capacitive sensing method or the self-capacitive sensing method using the Tx electrodes T and the second Rx electrodes R2 disposed in the second sensing area SA2. For example, as all Tx electrodes T and second Rx electrodes R2 are activated, during the period in which the second mode is executed, whether the touch input to the second sensing area SA2 is generated and the position thereof may be detected. Each exemplary embodiment will be described in detail as follows.

Referring to FIGS. 12A to 12C, during the period in which the touch sensor TS is driven in the second mode, the touch input to the second sensing area SA2 may be detected in the mutual capacitive sensing method using the Tx electrodes T and the second Rx electrodes R2. For example, when the touch sensor TS is driven in the second mode according to a predetermined frequency, during each unit period P of the period in which the second mode is executed, the driving signal may be sequentially supplied to the Tx electrodes T, and whether the touch input to the second sensing area SA2 is generated and the position of the touch input may be monitored based on the sensing signal output from the second Rx electrodes R2 by the driving signal.

According to an exemplary embodiment, one or more sampling pulses may be supplied to each Tx electrode T during each unit period P, and the number of sampling pulses may be variously set in consideration of the SNR or the like of the touch sensor TS. For example, in the exemplary embodiment of FIG. 3, four sampling pulses are supplied to each Tx electrode T during each unit period P. However, in the exemplary embodiment of FIGS. 12A to 12C, even though only one sampling pulse is supplied to each Tx electrode T during each unit period P, touch sensing sensitivity similar to the touch sensing sensitivity obtained through four sampling pulses in the exemplary embodiment of FIG. 3 may be obtained.

In the exemplary embodiment of FIGS. 12A to 12C, differently from the embodiment of FIG. 3, and thus the power consumption of the touch sensor TS may be reduced through reduction of the sampling rate. For example, according to the exemplary embodiment of FIGS. 12A to 12C, a charge/discharge power consumption ratio of the touch sensor TS in the second mode may be reduced by about 25% of that of the exemplary embodiment of FIG. 3.

Referring to FIGS. 12A, 12B, and 12D to 12H, during the period in which the touch sensor TS is driven in the second mode, the touch input to the second sensing area SA2 may be detected in the self-capacitive sensing method using the Tx electrodes T and the second Rx electrodes R2. In particular, in the exemplary embodiment of FIGS. 12D to 12H, the driving signal is supplied to all second sensor electrodes SE2 disposed in the second sensing area SA2. For example, during the period in which the second mode is executed, in a case of a pattern structure of FIG. 12A, four Tx electrodes T[1] to T[4] and the second-first to second-sixth Rx electrodes R2[1] to R2[6] are driven, and in a case of a pattern structure of FIG. 12B, the four Tx electrodes T[1] to T[4] and the second-first to second-eighth Rx electrodes R2[1] to R2[8] are driven. Each exemplary embodiment of FIGS. 12D to 12H will be described in detail as follows.

Referring to FIGS. 12A, 12B, and 12D, the driving signal may be simultaneously supplied to the Tx electrodes T and the second Rx electrodes R2 during each unit period P of the period in which the second mode is executed. In addition, whether the touch input to the second sensing area SA2 is generated and the position of the touch input may be monitored based on the sensing signal output from each of the Tx electrodes T and the second Rx electrodes R2.

Figure 12E:
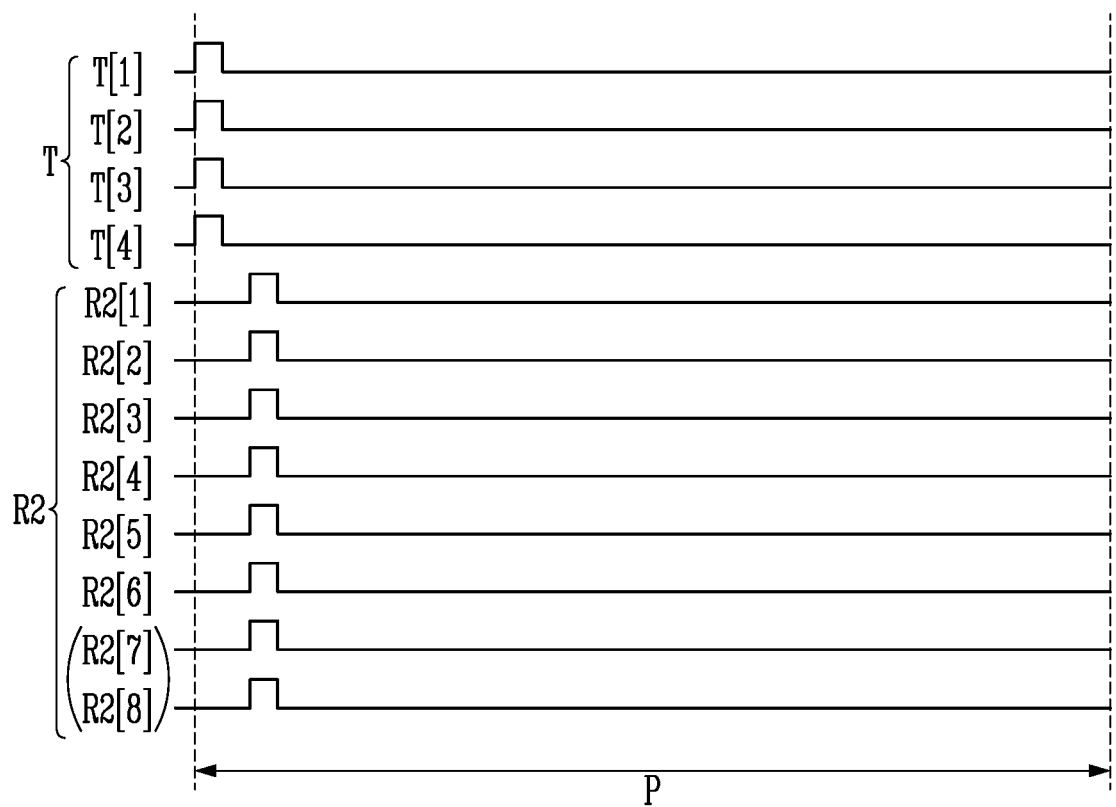

Referring to FIGS. 12A, 12B, and 12E, after simultaneously supplying the driving signal to the Tx electrodes T during each unit period P of the period in which the second mode is executed, the driving signal may be simultaneously supplied to the second Rx electrodes R2. In addition, whether the touch input to the second sensing area SA2 is generated and the position of the touch input may be monitored based on the sensing signal output from each of the Tx electrodes T and the second Rx electrodes R2.

Figure 12F:
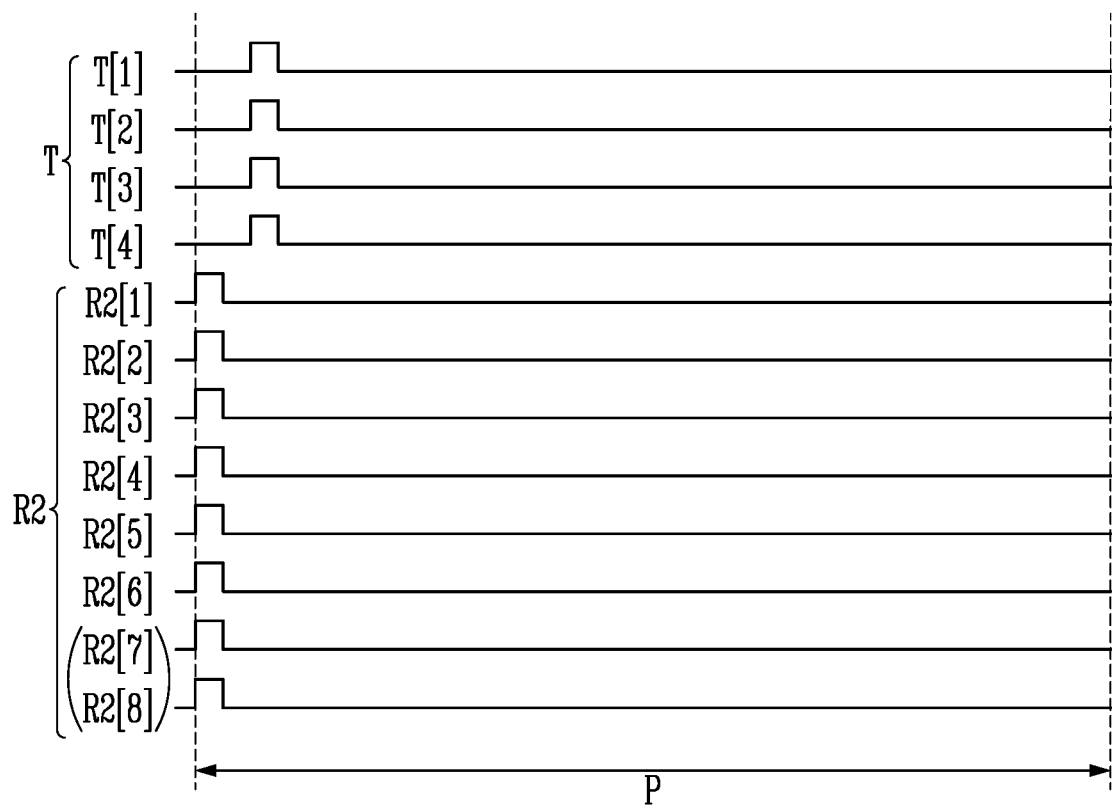

Referring to FIGS. 12A, 12B, and 12F, after simultaneously supplying the driving signal to the second Rx electrodes R2 during each unit period P of the period in which the second mode is executed, the driving signal may be simultaneously supplied to the Tx electrodes T. In addition, whether the touch input to the second sensing area SA2 is generated and the position of the touch input may be monitored based on the sensing signal output from each of the Tx electrodes T and the second Rx electrodes R2.

Figure 12G:
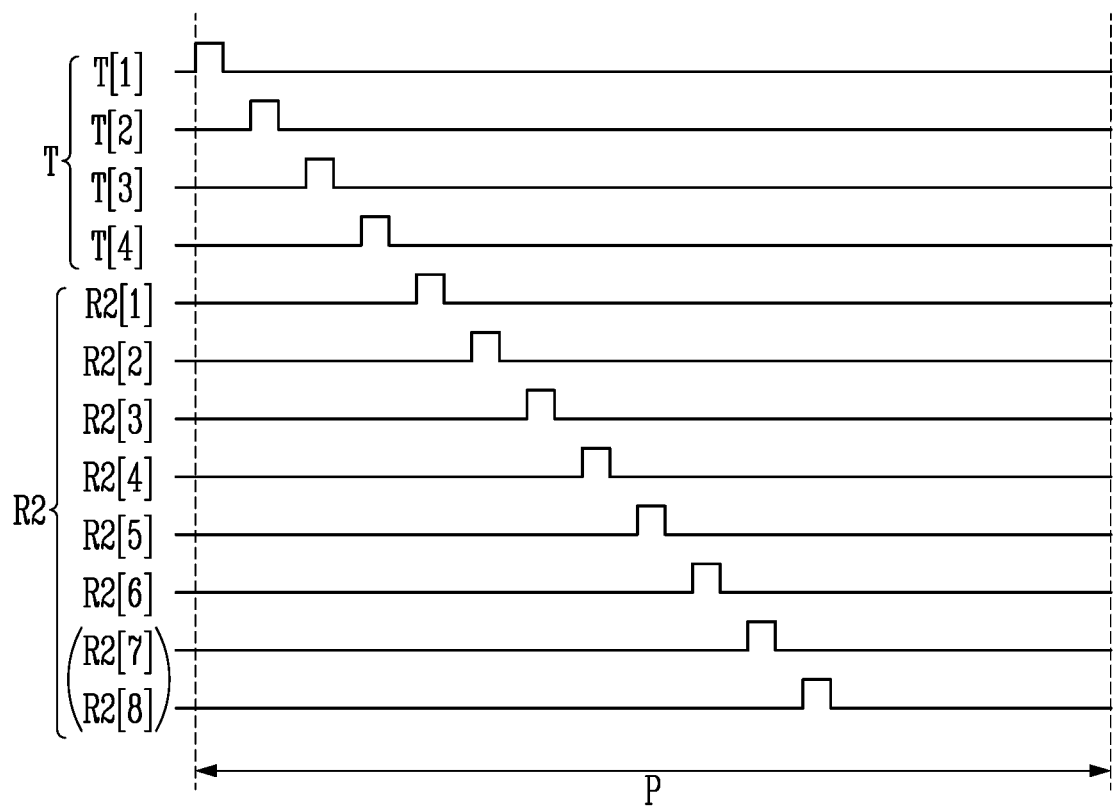

Referring to FIGS. 12A, 12B, and 12G, after sequentially supplying the driving signal to the Tx electrodes T during each unit period P of the period in which the second mode is executed, the driving signal may be sequentially supplied to the second Rx electrodes R2. In addition, whether the touch input to the second sensing area SA2 is generated and the position of the touch input may be monitored based on the sensing signal output from each of the Tx electrodes T and the second Rx electrodes R2.

Figure 12H:
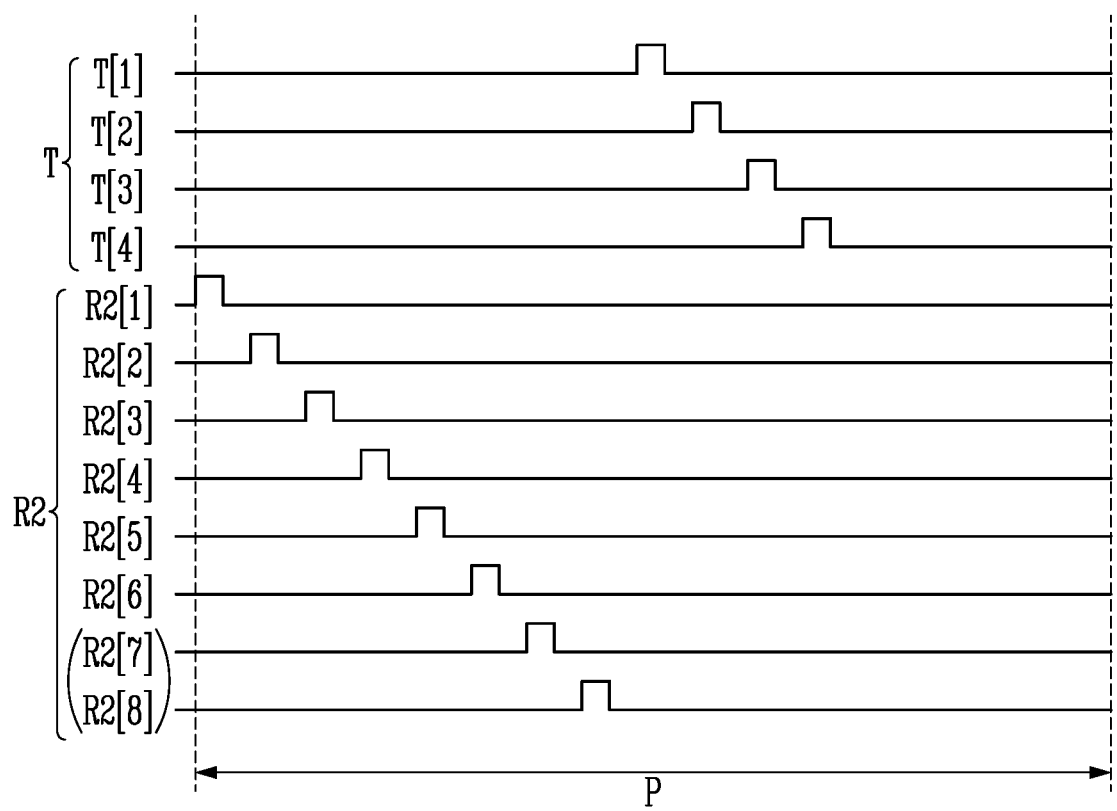

Referring to FIGS. 12A, 12B, and 12H, after sequentially supplying the driving signal to the second Rx electrodes R2 during each unit period P of the period in which the second mode is executed, the driving signal may be sequentially supplied to the Tx electrodes T. In addition, whether the touch input to the second sensing area SA2 is generated and the position of the touch input may be monitored based on the sensing signal output from each of the Tx electrodes T and the second Rx electrodes R2.

Referring to FIGS. 12A, 12B, and 12D to 12H, in the second mode, when the second sensor electrodes SE2 are driven by the self-capacitive sensing method in a state in which the first sensor electrodes SE1 are deactivated, wheel mode power consumption may be effectively reduced compared to a case where all sensor electrodes (e.g., the Tx electrodes T, and the first and second Rx electrodes R1 and R2) are driven in the self-capacitive sensing method. In addition, since there is substantially no sensor area loss in the edge portion, the power consumption of the touch sensor TS may be more effectively reduced by lowering the sampling rate.

For example, according to the exemplary embodiment of FIGS. 12A and 12C to 12H, the charge/discharge power consumption ratio of the touch sensor TS in the second mode may be reduced by about 21% of that of the exemplary embodiment of FIG. 3. In addition, according to the exemplary embodiment of FIGS. 12B and 12C to 12H, the charge/discharge power consumption ratio of the touch sensor TS in the second mode may be reduced by about 25% of that of the exemplary embodiment of FIG. 3. However, the power consumption reduction effect may vary according to the charge/discharge power consumption of the Tx electrodes T and the second Rx electrodes R2 to the charge/discharge power consumption of the entire sensor electrodes.

FIGS. 10A to 12H disclose exemplary embodiments in which the sensing area SA is partially driven in correspondence with the first mode or the second mode. However, the operation of the touch sensor TS is not limited to the partial driving mode. For example, the touch sensor TS may also be driven in the third mode in which the entire sensing area SA is activated. In this case, the touch input may be detected in the entire sensing area SA by simultaneously or sequentially driving the Tx electrodes T, the first Rx electrodes R1, and the second Rx electrodes R2.

According to an exemplary embodiment, in the third mode, the driving signal may be supplied to the Tx electrodes T, and whether the touch input to the entire sensing area SA is generated and the position of the touch input may be detected in the mutual capacitive sensing method based on the sensing signal output from the first and second Rx electrodes R1 and R2.

However, the driving method of the touch sensor TS in the third mode is not limited to the mutual capacitive sensing method. For example, in another exemplary embodiment, in the third mode, the touch input to the entire sensing area SA may be detected by driving the first and second sensor electrodes SE1 and SE2 in the self-capacitive sensing method. In this case, the Tx electrodes T and the first and second Rx electrodes R1 and R2 may be simultaneously or sequentially driven for each group, and/or may be simultaneously or sequentially driven within each group. In addition, the touch input may be detected based on the sensing signal output from each of the Tx electrodes T and the first and second Rx electrodes R1 and R2.

According to various exemplary embodiments as described above, only a portion of the sensing area SA may be partially driven according to a predetermined driving mode. For example, in the first mode, whether the touch input to the first sensing area SA1 is generated may be detected by driving at least some of the first sensor electrodes SE1 (e.g., the first Tx electrodes T1 (or the Tx electrodes T) and/or the first Rx electrodes R1 disposed in the first sensing area SA1 of the center portion in the mutual or self-capacitive sensing method. Accordingly, an operation such as knock or click provided to the first sensing area SA1 during the period in which the first mode is executed may be detected. At this time, at least some of the second sensor electrodes SE2 (for example, at least second Rx electrodes R2) positioned at the edge portion may maintain a deactivated state.

In addition, in the second mode, whether the touch input to the second sensing area SA2 is generated and the position of the touch input may be detected by driving at least some of the second sensor electrodes SE2 disposed (e.g., the second Tx electrodes T2 or the Tx electrodes T) and/or the second Rx electrodes R2 disposed in the second sensing area SA2 of the edge portion in the mutual or self-capacitive sensing method. Accordingly, the wheel operation provided to the second sensing area SA2 during the period in which the second mode is executed may be detected. At this time, at least some (for example, at least first Rx electrodes R1) of the first sensor electrodes SE1 positioned at the center portion may maintain a deactivated state.

As described above, in a situation in which detection of the touch input is required for only a portion of the sensing area SA, the sensing area SA may be partially driven by activating sensor electrodes in a corresponding area. Accordingly, unnecessary power consumption may be prevented or minimized, and the power consumption of the touch sensor TS may be reduced.

For example, the first and second sensor electrodes SE1 and SE2 may be independently driven, the entire sensing area SA may be activated by driving all first and second sensor electrodes SE1 and SE2. For example, in the third mode, such as the normal mode, a touch input function may be provided in the entire sensing area SA by simultaneously or sequentially driving the first and second sensor electrodes SE1 and SE2.

In addition, according to principles and various exemplary embodiments of the invention, by designing the first and second sensor electrodes SE1 and SE2 in curved patterns that may be optimized for the generally circular-shaped sensing area SA, the sensor area loss in the edge portion may be prevented or minimized. Accordingly, sensing sensitivity may be improved by improving the SNR of the touch sensor TS. In addition, as the SNR of the touch sensor TS is improved, the sampling rate for detecting the touch input may be reduced. In this case, the power consumption of the touch sensor TS may be further reduced.

Although certain exemplary embodiments and implementations have been described herein, other exemplary embodiments and modifications will be apparent from this description. Accordingly, the inventive concepts are not limited to such exemplary embodiments, but rather to the broader scope of the appended claims and various obvious modifications and equivalent arrangements as would be apparent to a person of ordinary skill in the art.

What is claimed is:

1. A touch sensor comprising:
   a sensing area including a first sensing area and a second sensing area positioned outwardly therefrom in an edge portion;
   first sensor electrodes disposed in the first sensing area; and
   second sensor electrodes disposed in the second sensing area, the second sensor electrodes being configured to be separately activated from the first sensor electrodes,
   wherein the first sensor electrodes are drivable to detect a touch input generated in the first sensing area in a first mode and the second sensor electrodes are drivable to detect a touch input generated in the second sensing area in a second mode,
   wherein the first sensor electrodes comprise first electrodes and second electrodes disposed in the first sensing area,
   wherein the second sensor electrodes comprise third electrodes and fourth electrodes disposed in the second sensing area,
   wherein the sensing area has a generally circular shape,
   wherein the first sensing area comprises a concentric area having a radius smaller than a radius of the sensing area having the generally circular shape,
   wherein the second sensing area comprises an annular area surrounding the first sensing area,
   wherein first sensing nodes are formed in the first sensing area by the first electrodes and the second electrodes adjacent to each other, wherein second sensing nodes are formed in the second sensing area by the third electrodes and the fourth electrodes adjacent to each other, and wherein as a radius of concentric circles forming circumferences of the first sensing nodes and the second sensing nodes increases, the annular area is divided into a larger number of the first sensing nodes or the second sensing nodes, so that the first and second sensing nodes have substantially a same area, and a capacitance formed in the first and second sensing nodes becomes substantially uniform.

2. The touch sensor of claim 1, wherein the second sensing area is deactivated in the first mode, and the first sensing area is deactivated in the second mode.

3. The touch sensor of claim 1, wherein the first electrodes and the second electrodes in the first sensing area are separated from the third electrodes and the fourth electrodes of the second sensing area, and wherein:

the first electrodes in the first sensing area and the third electrodes in the second sensing area are driving electrodes, and the second electrodes in the first sensing area and the fourth electrodes in the second sensing area are sensing electrodes.

4. The touch sensor of claim 1, wherein:

the first electrodes are disposed in quadrants of the first sensing area and the first electrodes in a same quadrant are connected to each other to form a single first electrode, and the third electrodes are disposed in quadrants of the second sensing area and the third electrodes in a same quadrant of the second sensing area are connected to each other to form a single third electrode.

5. The touch sensor of claim 1, wherein in the first mode, a mutual capacitive sensing method or a self-capacitive sensing method using the first electrodes and the second electrodes in the first sensing area detects whether a touch input is received in the first sensing area.

6. The touch sensor of claim 1, wherein in the first mode, a self-capacitive sensing method using the first electrodes in the first sensing area detects whether a touch input is received in the first sensing area.

7. The touch sensor of claim 1, wherein in the first mode, a self-capacitive sensing method using the second electrodes in the first sensing area detects whether a touch input is received in the first sensing area.

8. The touch sensor of claim 1, wherein in the second mode, a mutual capacitive sensing method using the third electrodes and the fourth electrodes in the second sensing area detects whether a touch input is received in the second sensing area.

9. The touch sensor of claim 1, wherein in the second mode, a self-capacitive sensing method using the third electrodes and the fourth electrodes in the second sensing area detects whether a touch input is received and its position in the second sensing area.

10. The touch sensor of claim 1, wherein the first sensor electrodes in the first sensing area comprise:

a generally circular-shaped center electrode positioned at a center of the first sensing area;

first partial annular-shaped electrodes including a single electrode pattern or a plurality of electrode patterns dispersed in at least one annular-shaped area disposed at a predetermined distance and/or interval from the generally circular-shaped center electrode, with each of the plurality of electrode patterns having a partial annular shape; and second partial annular-shaped electrodes disposed in an annular-shaped area between the generally circular-shaped center electrode and the first partial annular-shaped electrodes and/or an annular-shaped area between the first partial annular-shaped electrodes, the second partial annular-shaped electrodes having radii different from that of the first partial annular-shaped electrodes.

11. The touch sensor of claim 10, wherein the second partial annular-shaped electrodes comprise:

a first-first electrode positioned in a first quadrant of the first sensing area and including a single electrode pattern or a plurality of electrode patterns having a partial annular shape;

a first-second electrode positioned in a second quadrant of the first sensing area and including a single electrode pattern or a plurality of electrode patterns having a partial annular shape;

a first-third electrode positioned in a third quadrant of the first sensing area and including a single electrode pattern or a plurality of electrode patterns having a partial annular shape; and a first-fourth electrode positioned in a fourth quadrant of the first sensing area and including a single electrode pattern or a plurality of electrode patterns having a partial annular shape.

12. The touch sensor of claim 11, wherein each of the first partial annular-shaped electrodes comprises a plurality of electrode patterns dispersed in the first to fourth quadrants of the first sensing area, the first partial annular-shaped electrodes are sequentially arranged in a clockwise direction in the first and third quadrants of the first sensing area, and the first partial annular-shaped electrodes are sequentially arranged in a counterclockwise direction in the second and fourth quadrants of the first sensing area.

13. The touch sensor of claim 10, wherein the second sensor electrodes comprise:

third partial annular-shaped electrodes including a single electrode pattern or a plurality of electrode patterns dispersed in an annular-shaped area spaced a predetermined distance from the first sensing area, each of the plurality of electrode patterns having a partial annular shape; and fourth partial annular-shaped electrodes disposed in an annular-shaped area of an inside and/or an outside of the second partial annular-shaped electrodes.

14. The touch sensor of claim 13, wherein the fourth partial annular-shaped electrodes comprise:

a second-first electrode positioned in a first quadrant of the second sensing area and including a single electrode pattern or a plurality of electrode patterns having a partial annular shape;

a second-second electrode positioned in a second quadrant of the second sensing area and including a single electrode pattern or a plurality of electrode patterns having a partial annular shape;

a second-third electrode positioned in a third quadrant of the second sensing area and including a single electrode pattern or a plurality of electrode patterns having a partial annular shape; and a second-fourth electrode positioned in a fourth quadrant of the second sensing area and including a single electrode pattern or a plurality of electrode patterns having a partial annular shape.

15. The touch sensor of claim 14, wherein each of the third partial annular-shaped electrodes comprises a plurality of electrode patterns dispersed in the first to fourth quadrants of the second sensing area, the third partial annular-shaped electrodes are sequentially arranged in a clockwise direction in the first and third quadrants of the second sensing area, and the third partial annular-shaped electrodes are sequentially arranged in a counterclockwise direction in the second and fourth quadrants of the second sensing area.

16. The touch sensor of claim 13, wherein the second sensor electrodes further comprise an annular-shaped or partial annular-shaped outermost electrode disposed in an outermost area of the sensing area to surround the fourth partial annular-shaped electrodes.

17. A method of driving a touch sensor having a first sensing area and a second sensing area disposed in an edge portion outwardly from the first sensing area, the method comprising:

in a first mode, driving at least some of first sensor electrodes in the first sensing area in a mutual or self-capacitive sensing method to detect whether a touch input is received in the first sensing area; and in a second mode, driving at least some of second sensor electrodes in the second sensing area in a mutual or self-capacitive sensing method to detect whether a touch input is received and its position in the second sensing area, wherein the first sensor electrodes comprise first electrodes and second electrodes disposed in the first sensing area, wherein the second sensor electrodes comprise third electrodes and fourth electrodes disposed in the second sensing area, wherein a sensing area has a generally circular shape, the sensing area includes the first sensing area and the second sensing area, wherein the first sensing area comprises a concentric area having a radius smaller than a radius of the sensing area having the generally circular shape, wherein the second sensing area comprises an annular area surrounding the first sensing area, wherein first sensing nodes are formed in the first sensing area by the first electrodes and the second electrodes adjacent to each other, wherein second sensing nodes are formed in the second sensing area by the third electrodes and the fourth electrodes adjacent to each other, and wherein as a radius of concentric circles forming circumferences of the first sensing nodes and the second sensing nodes increases, the annular area is divided into a larger number of the first sensing nodes or the second sensing nodes, so that the first and second sensing nodes have substantially a same area, and a capacitance formed in the first and second sensing nodes becomes substantially uniform.

18. The method of claim 17, wherein in the first mode, the first electrodes and the second electrodes detect whether the touch input is received in the first sensing area.

19. The method of claim 17, wherein in the first mode, the self-capacitive sensing method uses the first electrodes to detect whether the touch input is received in the first sensing area.

20. The method of claim 17, wherein in the first mode, the self-capacitive sensing method uses the second electrodes to detect whether the touch input is received in the first sensing area.

21. The method of claim 17, wherein in the second mode, the mutual capacitive sensing method uses the third electrodes and the fourth electrodes to detect whether the touch input is received in the second sensing area.

22. The method of claim 21, wherein in the second mode, the self-capacitive sensing method uses the third electrodes and the fourth electrodes to detect whether the touch input is received and its position in the second sensing area.

23. The method of claim 17, wherein the first mode is a standby mode and the second mode is in active mode.

24. The method of claim 23, wherein the second sensing area is deactivated in the first mode, and the first sensing area is deactivated in the second mode.

25. The method of claim 23, further comprising, in a third mode, activating substantially all the first and second sensor electrodes in the first and second sensing areas.

* * * * *